United States Patent
Eddaoudi et al.

(10) Patent No.: US 12,505,962 B2
(45) Date of Patent: Dec. 23, 2025

(54) CONDUCTIVE TWO-DIMENSIONAL (2D) COVALENT ORGANIC FRAMEWORKS (COFS) AND METHOD OF MAKING AN ELECTRODE MATERIAL

(71) Applicant: King Abdullah University of Science and Technology, Thuwal (SA)

(72) Inventors: Mohamed Eddaoudi, Thuwal (SA); Jiangtao Jia, Thuwal (SA); Sharath Kandambeth, Thuwal (SA); Osama Shekhah, Thuwal (SA); Husam Alshareef, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 153 days.

(21) Appl. No.: 17/928,382

(22) PCT Filed: Jun. 1, 2021

(86) PCT No.: PCT/IB2021/054811
§ 371 (c)(1),
(2) Date: Nov. 29, 2022

(87) PCT Pub. No.: WO2021/245559
PCT Pub. Date: Dec. 9, 2021

(65) Prior Publication Data
US 2023/0197361 A1 Jun. 22, 2023

Related U.S. Application Data

(60) Provisional application No. 63/033,083, filed on Jun. 1, 2020.

(51) Int. Cl.
*H01G 11/48* (2013.01)
*C07D 487/12* (2006.01)
(Continued)

(52) U.S. Cl.
CPC .......... *H01G 11/48* (2013.01); *C07D 487/12* (2013.01); *H01B 1/128* (2013.01); *H01G 11/58* (2013.01)

(58) Field of Classification Search
CPC .......... H01B 1/12; H01B 1/128; H01M 4/60; H01M 4/602; H01G 11/30; H01G 11/48; C07D 487/12
See application file for complete search history.

(56) References Cited

U.S. PATENT DOCUMENTS

| | | | |
|---|---|---|---|
| 11,964,992 B2 * | 4/2024 | Uribe-Romo | ........... H01M 4/60 |
| 2023/0178848 A1 * | 6/2023 | Jia | ........................ H01M 50/403 429/249 |

OTHER PUBLICATIONS

Roy et al "Benzimidazole linked arylimide based covalent organic framework as gas adsorbing and electrode materials for supercapacitor application", http://dx.doi.org/10.1016/j.eurpolymj.2017.06.028 European Polymer Journal Jun. 2017.*
(Continued)

*Primary Examiner* — Mark Kopec
(74) *Attorney, Agent, or Firm* — Billion & Armitage

(57) ABSTRACT

Embodiments include an electrode material including a plurality of cores fused to a plurality of redox active linkers via Aza units to form a layered two-dimensional (2D) Aza-fused pi-conjugated covalent organic framework (COF). Embodiments also include a negative electrode material including the electrode material, as well as a supercapacitor device and an asymmetric supercapacitor device including the electrode material. Embodiments further include a method of making an electrode material including one or more of the following steps: combining a hexaketocyclohexane compound and an aromatic tetraamine compound in a solution; mixing the solution including the hexaketocyclohexane compound and the aromatic tet-
(Continued)

raamine compound; and heating the mixed solution to form a 2D Aza-fused pi-conjugated COF.

19 Claims, 47 Drawing Sheets

(51) Int. Cl.
*H01B 1/12* (2006.01)
*H01G 11/58* (2013.01)

(56) References Cited

OTHER PUBLICATIONS

Mauger et al "Recent Progress on Organic Electrodes Materials for Rechargeable Batteries and Supercapacitors", Materials 2019, 12, 1770; doi:10.3390/ma12111770 (57 pages).*
Yang et al "Theory-Driven Design and Targeting Synthesis of a Highly-Conjugated Basal-Plane 2D Covalent Organic Framework for MetalFree Electrocatalytic OER", ACS Energy Lett. 2019, 4, 2251-2258.*
"International Search Report and Written Opinion Received mailed Sep. 16, 2021", Sep. 16, 2021, 13 pages.
Kim, Soyoung, et al., "Light-promoted synthesis of highly-conjugated crystalline covalent organic framework", Communications Chemistry, vol. 2, No. 1, Dec. 1, 2019(Dec. 1, 2019), XP055837959, DOI: 10.1038/542004-019-0162-z Retrieved from the Internet: URL:https://www.nature.com/articles/s42004-019-0162-z.pdf>, Dec. 1, 2019, 8 pages.
Zheng, Meng, et al., "Proton Conduction in 2D Aza-Fused Covalent Organic Frameworks", Chemistry of Materials, vol. 31, No. 3, Dec. 19, 2018 (Dec. 19, 2018), pp. 819-825.
Xuefeng, Lu, et al., "A review of negative electrode materials for electrochemical supercapacitors", Science China Technological Sciences 58 (2015): 1799-1808., 10 pages.
Zhang, Jintao, et al., "A high-performance asymmetric supercapacitor fabricated with graphene-based electrodes", Energy & Environmental Science 4.10 (2011): 4009-4015., 7 pages.
Zhang, Li Li, et al., "Carbon-based materials as supercapacitor electrodes", Chemical society reviews 38.9 (2009): 2520-2531., 12 pages.
Algharaibeh, Zaher, et al., "An asymmetric anthraquinone-modified carbon/ruthenium oxide supercapacitor", Journal of Power Sources 187.2 (2009): 640-643., 4 pages.
Anasori, Babak, et al., "2D metal carbides and nitrides (MXenes) for energy storage", Nature Reviews Materials 2.2 (2017): 1-17., 17 pages.
Aricò, Antonino Salvatore, et al., "Nanostructured materials for advanced energy conversion and storage devices", nature materials, vol. 4, May 2005, 366-377.
Augustyn, Veronica, et al., "Pseudocapacitive oxide materials for high-rate electrochemical energy storage", Energy Environ. Sci., 2014, 7, 1597-1614.
Beguin, et al., "Supercapacitors", Materials, Systems, and Applications, 2013, 560 pages.
Bindewald, Elvira, et al., "Tetraguanidino-functionalized phenazine and fluorene dyes: synthesis, optical properties and metal coordination", Dalton Transactions 44.7 (2015): 3467-3485., 19 pages.
Brezesinski, Torsten, et al., "Templated nanocrystal-based porous TiO2 films for next-generation electrochemical capacitors", Journal of the American Chemical Society 131.5 (2009): 1802-1809., 8 pages.
Burke, Andrew, "Ultracapacitors: why, how, and where is the technology", Journal of Power Sources, 91, 2000, 37-50.
Chandra, Suman, et al., "Molecular level control of the capacitance of two-dimensional covalent organic frameworks: role of hydrogen bonding in energy storage materials", Chemistry of Materials 29.5 (2017): 2074-2080., 7 pages.

Choudhary, Nitin, et al., "Asymmetric supercapacitor electrodes and devices", Advanced Materials 29.21 (2017): 1605336., 30 pages.
Conway, B. E., "Transition from "Supercapacitor" to "Battery" Behavior in Electrochemical Energy Storage", J. Electrochem. Soc., vol. 138, No. 6, Jun. 1991.
Cote, Adrien P., et al., "Porous, crystalline, covalent organic frameworks", science 310.5751 (2005): 1166-1170., 6 pages.
Deblase, Catherine R., et al., "Rapid and efficient redox processes within 2D covalent organic framework thin films", ACS nano 9.3 (2015): 3178-3183., 6 pages.
Ding, Xuesong, et al., "Synthesis of metallophthalocyanine covalent organic frameworks that exhibit high carrier mobility and photoconductivity", Angewandte Chemie International Edition 50.6 (2011): 1289-1293., 5 pages.
Gao, Xing, et al., "MOFs and COFs for batteries and supercapacitors", Electrochemical Energy Reviews 3 (2020): 81-126., 46 pages.
Ghidiu, Michael, et al., "Conductive two-dimensional titanium carbide 'clay'with high volumetric capacitance", Nature 516.7529 (2014): 78-81., 12 pages.
Gogotsi, Yury, "Energy storage wrapped up", Nature, vol. 509, May 29, 2014, 568-570.
Guo, Jia, et al., "Conjugated organic framework with three-dimensionally ordered stable structure and delocalized p clouds", Nat. Commun. 4:2736 doi: 10.1038/ncomms3736 (2013)., 8 pages.
Halder, Arjun, et al., "Interlayer hydrogen-bonded covalent organic frameworks as high-performance supercapacitors", Journal of the American Chemical Society 140.35 (2018): 10941-10945., 5 pages.
Jiang, Qiu, et al., "All pseudocapacitive MXene-RuO2 asymmetric supercapacitors", Advanced Energy Materials 8.13 (2018): 1703043., 10 pages.
Kale, Vinayak S., et al., "Microporosity-Controlled Synthesis of Heteroatom Codoped Carbon Nanocages by Wrap-Bake-Sublime Approach for Flexible All-Solid-State-Supercapacitors", Adv. Funct. Mater. 2018, 28, 1803786.
Kandambeth, Sharath, et al., "Construction of crystalline 2D covalent organic frameworks with remarkable chemical (acid/base) stability via a combined reversible and irreversible route", Journal of the American Chemical Society 134.48 (2012): 19524-19527., 4 pages.
Khayum, Abdul M., et al., "Convergent covalent organic framework thin sheets as flexible supercapacitor electrodes", ACS applied materials & interfaces 10.33 (2018): 28139-28146., 8 pages.
Kim, Brian Kihun, et al., "Electrochemical Supercapacitors for Energy Storage and Conversion", Handbook of Clean Energy Systems, 2015, 25 pages.
Kuehl, Valerie A., et al., "A highly ordered nanoporous, two-dimensional covalent organic framework with modifiable pores, and its application in water purification and ion sieving", Journal of the American Chemical Society 140.51 (2018): 18200-18207., 8 pages.
Kurra, Narendra, et al., "MXene-on-paper coplanar microsupercapacitors", Advanced Energy Materials 6.24 (2016): 1601372., 8 pages.
Li, Xinle, et al., "Dynamic covalent synthesis of crystalline porous graphitic frameworks", Chem 6.4 (2020): 933-944., 13 pages.
Lukatskaya, Maria R., et al., "Cation intercalation and high volumetric capacitance of two-dimensional titanium carbide", Science 341.6153 (2013): 1502-1505., 5 pages.
Luo, Zhiqiang, et al., "A microporous covalent-organic framework with abundant accessible carbonyl groups for lithium-ion batteries", Angewandte Chemie International Edition 57.30 (2018): 9443-9446., 4 pages.
Mahmood, Javeed, et al., "Nitrogenated holey two-dimensional structures", Nature communications 6.1 (2015): 6486., 7 pages.
Majumdar, Dipanwita, et al., "Recent progress in ruthenium oxide-based composites for supercapacitor applications", ChemElectroChem 6.17 (2019): 4343-4372., 30 pages.
Mallick, Arijit, et al., "Made-to-order porous electrodes for supercapacitors: MOFs embedded with redox-active centers as a case study", Chemical Communications 56.12 (2020): 1883-1886., 4 pages.
Meng, Zheng, et al., "Proton conduction in 2D aza-fused covalent organic frameworks", Chemistry of Materials 31.3 (2018): 819-825., 7 pages.

(56) References Cited

OTHER PUBLICATIONS

Meng, Zheng, et al., "Two-dimensional chemiresistive covalent organic framework with high intrinsic conductivity", Journal of the American Chemical Society 141.30 (2019): 11929-11937., 9 pages.
Miller, John R., et al., "Electrochemical Capacitors for Energy Management", Materials Science, vol. 321, Aug. 1, 2008, 651-652.
Mulzer, Catherine R., et al., "Superior charge storage and power density of a conducting polymer-modified covalent organic framework", ACS central science 2.9 (2016): 667-673., 7 pages.
Naguib, Michael, et al., "Two-dimensional nanocrystals produced by exfoliation of Ti3AlC2", Advanced materials 23.37 (2011): 4248-4253., 6 pages.
Peng, You-Yu, et al., "All-MXene (2D titanium carbide) solid-state microsupercapacitors for on-chip energy storage". Energy & Environmental Science 9.9 (2016): 2847-2854., 8 pages.
Shao, Yuanlong, et al., "Design and mechanisms of asymmetric supercapacitors", Chemical reviews 118.18 (2018): 9233-9280., 48 pages.
Sheberla, Dennis, et al., "Conductive MOF electrodes for stable supercapacitors with high areal capacitance", Nature materials 16.2 (2017): 220-224., 6 pages.
Simon, Patrice, et al., "Materials for electrochemical capacitors", nature materials, vol. 7, Nov. 2008, 845-854.
Simon, Patrice, et al., "Where Do Batteries End and Supercapacitors Begin?", Materials Science, vol. 343, Mar. 14, 2014, 1210-1211.
Tabor, Daniel P., Approaching saturation limits. Nature Energy 3.6 (2018): 455-456., 2 pages.
Vitaku, Edon, et al., "Phenazine-based covalent organic framework cathode materials with high energy and power densities", Journal of the American Chemical Society 142.1 (2019): 16-20., 5 pages.
Wang, Xu, et al., "Accurate modulation of mass ratio on electrodes of ruthenium oxide//polyaniline supercapacitor for Improving energy density", ournal of the Electrochemical Society 166.10 (2019): A1884., 10 pages.
Wang, John, et al., "Pseudocapacitive contributions to electrochemical energy storage in TiO2 (anatase) nanoparticles", The Journal of Physical Chemistry C 111.40 (2007): 14925-14931., 7 pages.
Winter, Martin, et al., "What Are Batteries, Fuel Cells, and Supercapacitors?", Chem. Rev. 2004, 104, 4245-4269.
Xia, Hui, et al., "A symmetric RuO2/RuO2 supercapacitor operating at 1.6 V by using a neutral aqueous electrolyte", Electrochemical and Solid-State Letters 15.4 (2012): A60., 5 pages.
Xie, Heping, et al., "Low-energy-consumption electrochemical CO2 capture driven by biomimetic phenazine derivatives redox medium", Applied Energy 259 (2020): 114119., 9 pages.
Xu, Hong, et al., "Stable, crystalline, porous, covalent organic frameworks as a platform for chiral organocatalysts", Nature chemistry 7.11 (2015): 905-912., 8 pages.

* cited by examiner

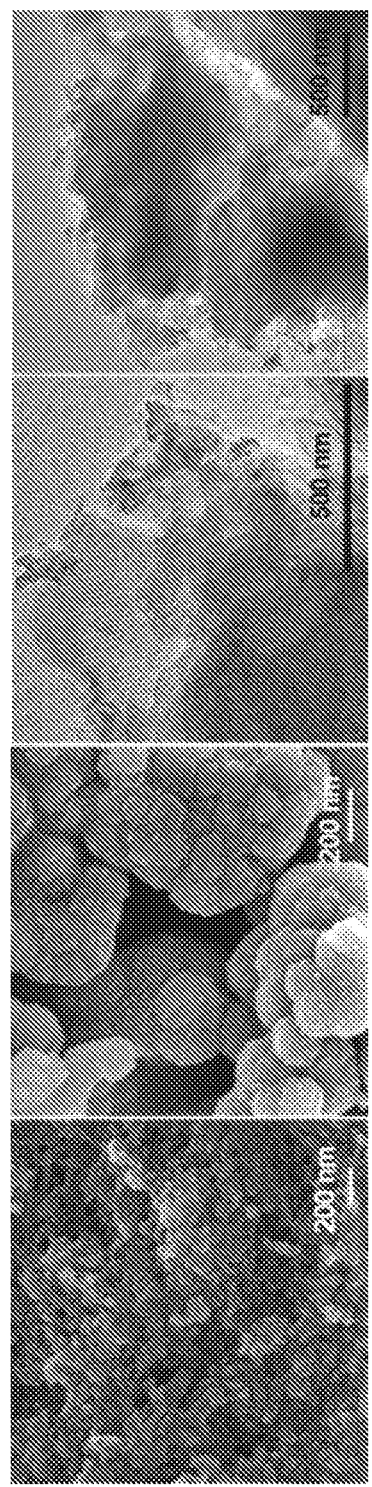

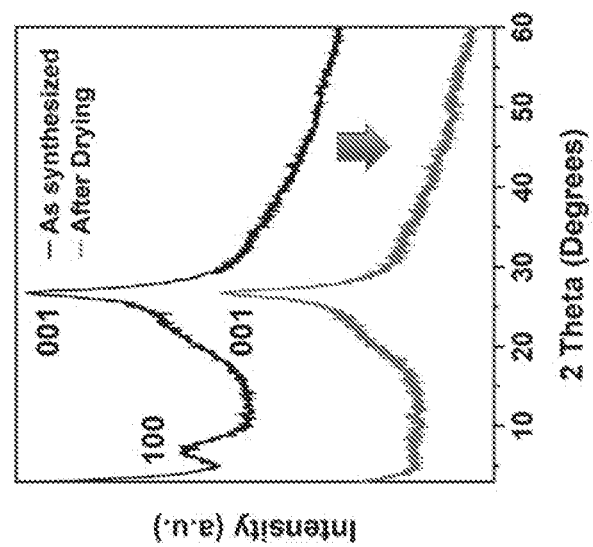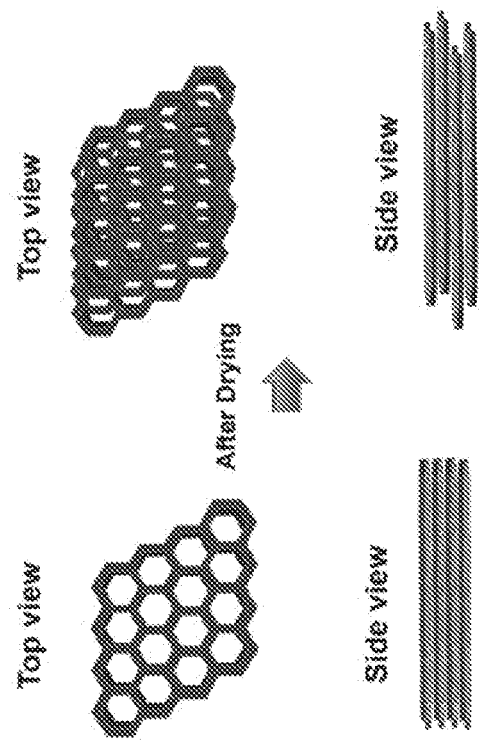
FIG. 17A
FIG. 17B

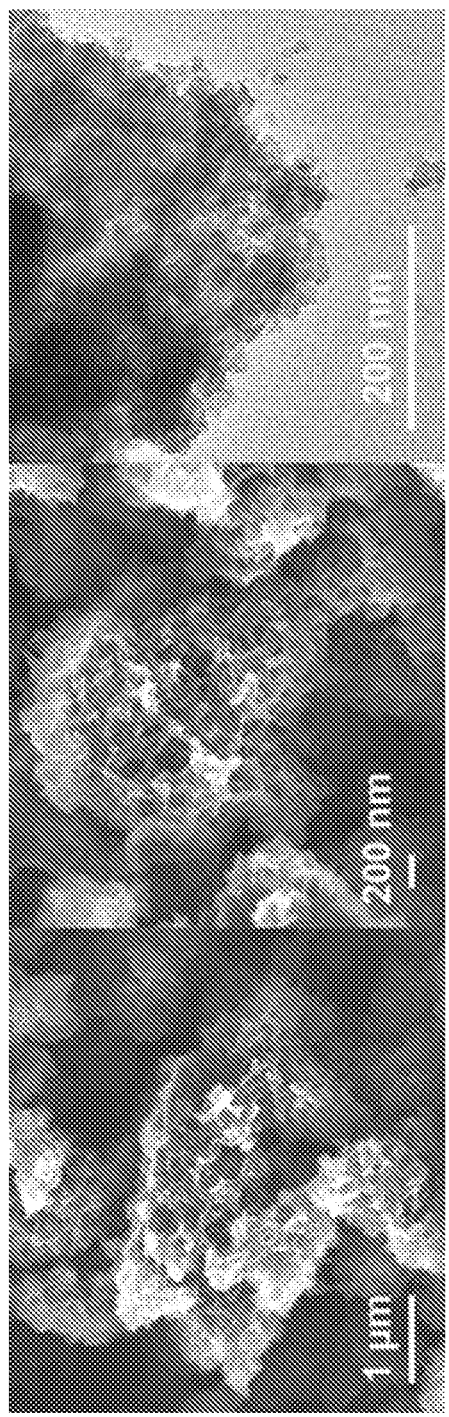

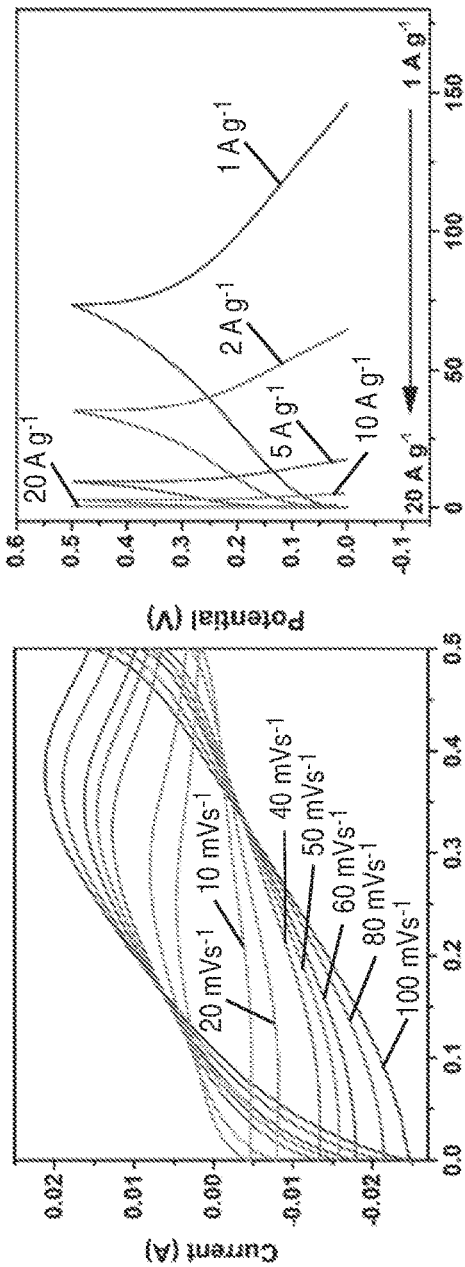
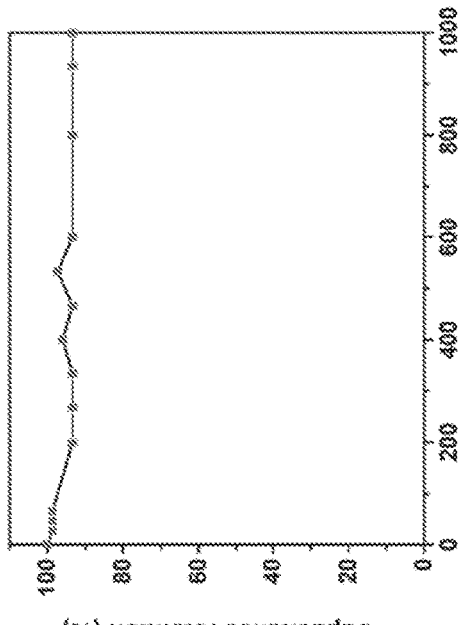
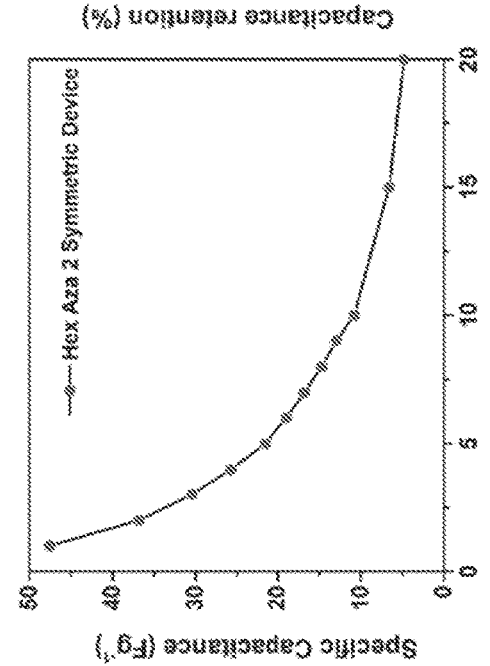
FIG. 29A  FIG. 29B  FIG. 29C  FIG. 29D

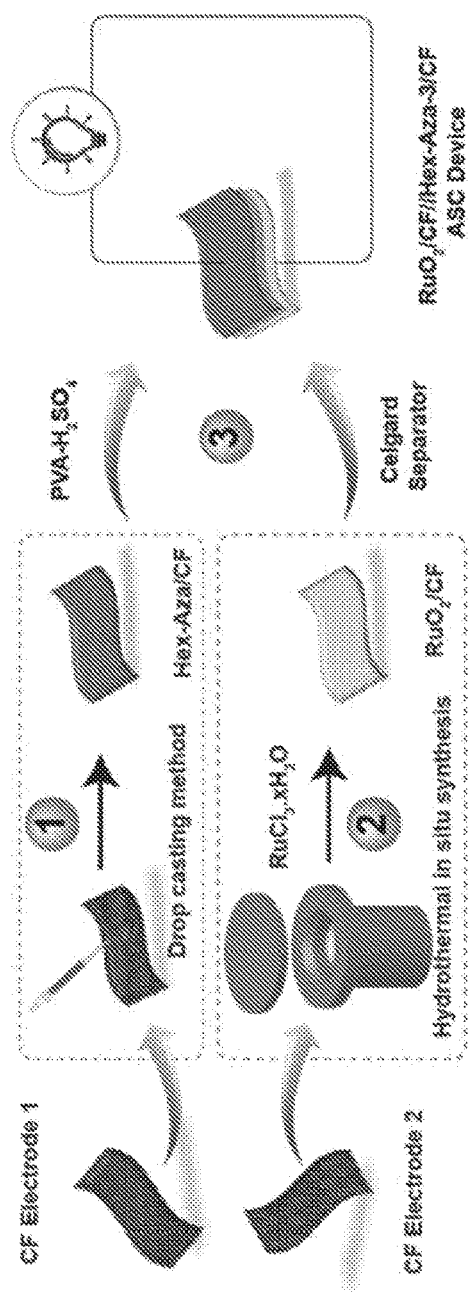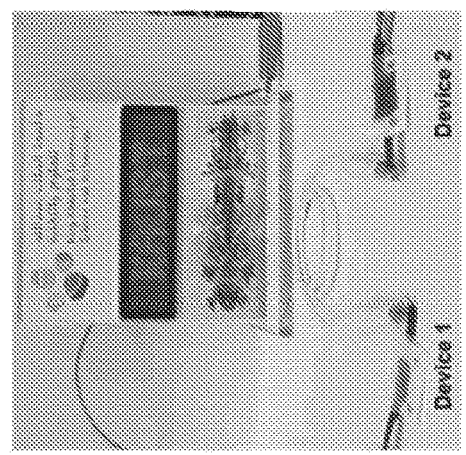
FIG. 35A
FIG. 35B

CONDUCTIVE TWO-DIMENSIONAL (2D) COVALENT ORGANIC FRAMEWORKS (COFS) AND METHOD OF MAKING AN ELECTRODE MATERIAL

BACKGROUND

Supercapacitors (SCs) as energy storage devices offer high power density, but lower energy density than batteries. Their high power density makes them suitable for applications such as uninterruptible power supply (UPS), portable tools, rubber-tired gantry crane, and emergency doors on airplanes. However, for use in automotive and grid storage applications, the energy density of SCs needs to be significantly improved. To enhance the energy density of SCs (which is calculated using $E=0.5CV^2$) either the specific capacitance (C) or cell voltage (V) needs to be improved. The C values of the SC device can be improved by tuning the intrinsic properties of the electrode material. For example, employing pseudo-capacitive electrode materials is an effective strategy for improving the C of the SC. Psuedocapacitive materials, in general, show high C values in comparison to electrical double layer capacitor (EDLC) based materials due to their fast reversible electron transfer redox reactions.

The cell voltage (V) may be controlled by engineering various aspects of the device. Organic electrolyte-based SC devices usually offer a higher V value in comparison to aqueous based systems. However, these devices suffer from various disadvantages, such as low ionic mobility, high cost, toxicity, and being not environmentally benign. While aqueous electrolyte based SCs tend not to suffer from the above disadvantages, conventional symmetric SCs with aqueous electrolyte are restricted by low V values. The V of aqueous electrolyte-based SCs can be significantly improved by constructing asymmetric SCs (ASCs). In ASCs, two different electrode materials are used separately for the anode and the cathode. The complementary potential windows of the individual electrodes enable the ASC device to cross the thermodynamic break down potential window of water (1.23 V) to achieve high cell voltage values. Various materials have been deployed as cathode and anode in ASCs, with the majority of the high performing pseudo capacitive materials using $RuO_2$, $MnO_2$, and metal hydroxides as cathode materials in ASCs. On the anode side of ASCs, electrical double layer capacitor (EDLC)-based carbon materials are commonly employed. Only a limited number of high performing pseudocapacitive materials have been reported for use as anodes in the literature. Accordingly, the development of new novel pseudo capacitive anode materials with high C may lead to significant improvements in the performance of ASCs.

SUMMARY

According to one or more aspects of the invention, an electrode material (e.g., and/or a covalent organic framework composition and/or a negative electrode material and/or a positive electrode material, etc.) may include a plurality of cores fused to a plurality of redox active linkers via Aza units to form an Aza-fused n-conjugated covalent organic framework (e.g., a layered two-dimensional Aza-fused 7r-conjugated covalent organic framework).

According to one or more aspects of the invention, a supercapacitor device (e.g., and/or an asymmetric supercapacitor device and/or a symmetric supercapacitor device) may include an electrode material (e.g., and/or a negative electrode material and/or a positive electrode material, etc.), wherein the electrode material includes a plurality of cores fused to a plurality of redox active linkers via Aza units to form an Aza-fused 7r-conjugated covalent organic framework (e.g., a layered two-dimensional Aza-fused 7r-conjugated covalent organic framework).

According to one or more yet further aspects of the invention, a method of making an electrode material (e.g., and/or a covalent organic framework composition and/or a negative electrode material and/or a positive electrode material, etc.) may include combining a hexaketocyclohexane compound and an aromatic tetraamine compound in a solution; mixing the solution including the hexaketocyclohexane compound and the aromatic tetraamine compound; and heating the solution including the hexaketocyclohexane compound and the aromatic tetraamine compound to form an Aza-fused n-conjugated covalent organic framework (e.g., a layered two-dimensional Aza-fused n-conjugated covalent organic framework).

BRIEF DESCRIPTION OF THE DRAWINGS

FIGS. 8A-8I relate to the synthesis and characterization of Hex-Aza COFs and include (A) schematic diagrams of the synthesis of Hex-Aza-2 and Hex-Aza-3; (B) a graphical view of PXRD of the synthesized Hex-Aza-2 powders; (C) a graphical view of PXRD of the synthesized Hex-Aza-3 powders; (D) a graphical view of a comparison of $^{13}C$ solid-state NMR of Hex-Aza-2 and Hex-Aza-3; (E) a graphical view of a comparison of $N_2$ adsorption isotherm of Hex-Aza-2 and Hex-Aza-3; (F)-(G) SEM images of Hex-Aza-2 and Hex-Aza-3, respectively; (H)-(I) TEM images of Hex-Aza-2 and Hex-Aza-3, respectively, according to one or more embodiments of the present disclosure.

FIGS. 17A-17B are (A) PXRD peak shift of Hex-Aza-3 before after solvent drying and (B) a schematic of atop view and side view both before and after drying, according to one or more embodiments of the present disclosure.

FIGS. 18A-18C are (A)-(B) SEM images of Hex-Aza-1 show aggregated layers, (C) TEM image of Hex-Aza-1, according to one or more embodiments of the present disclosure.

FIGS. 29A-29D relate to electrochemical performance of Hex-Aza-2 COFs in symmetric two-electrode configuration and include (A) CV curves of Hex-Aza-2 symmetric full cell two-electrode device at different scan rates; (B) GCD profiles of Hex-Aza-2 symmetric full cell two-electrode device at different current densities; (C) Comparison of gravimetric specific capacitances of Hex-Aza-2 symmetric full cell two-electrode device at different scan rates; (D) Cycling stability of the Hex-Aza-2 symmetric full cell two-electrode device over 1000 cycles in 1.0 M$H_2SO_4$ electrolyte at a current density of 1 A g$^{-1}$, according to one or more embodiments of the present disclosure.

FIGS. 35A-35K relate to the electrochemical performance of $RuO_2$//Hex-Aza-3 ASC two electrode full-cell device and include the following: (A) Schematic representation illustrating the fabrication of $RuO_2$//Hex-Aza-3 ASC device; (B) Digital photograph showing the two series connected $RuO_2$//Hex-Aza-3 ASC device illuminating the LEDs of 3V; (C) CV curves of $RuO_2$//Hex-Aza-3 ASC at 50 $mVs^{-1}$, in different potential windows; (D) Galvanostatic charge-discharge (GCD) profiles of $RuO_2$//Hex-Aza-3 ASC full cell device at $5Ag^{-1}$ current density in different potential windows; (E) Increase in capacitance value of $RuO_2$//Hex-Aza-3 ASC full cell device (at $5Ag^{-1}$) by the change in potential window; (F) CV curves of Hex-Aza-3/CF, $RuO_2$/CF, and $RuO_2$//Hex-Aza-3 ASC device at a scan rate of 20 mV/s; (G) CV curves of $RuO_2$//Hex-Aza-3 ASC at different scan rate; (H) Galvanostatic charge-discharge (GCD) profiles of $RuO_2$//Hex-Aza-3 ASC full cell device at different current densities; (I) Comparison of gravimetric specific capacitances of $RuO_2$//Hex-Aza-3 ASC device at different scan rates; (J) Ragone plot comparison for $RuO_2$//Hex-Aza-3 ASC device; (K) Cycling stability and Columbic efficiency of the $RuO_2$//Hex-Aza-3 ASC at a current density of 5 $Ag^{-1}$ over 7500 cycles, Nyquist plots of device is given in the incept, according to one or more embodiments of the present disclosure.

DETAILED DESCRIPTION

Definitions

Figure 1A:
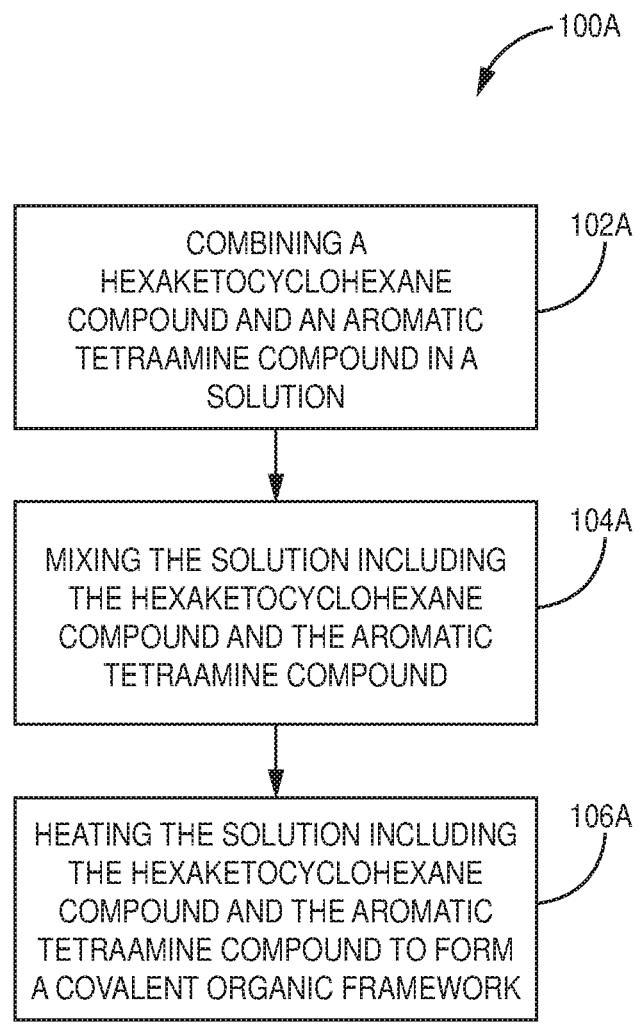
FIG. 1A is a flowchart of a method of making a covalent organic framework (COF), according to one or more embodiments of the present disclosure.

As used herein, the term "alkyl" refers to a straight- or branched-chain or cyclic hydrocarbon radical or moiety comprising only carbon and hydrogen atoms, containing no unsaturation, and having 30 or fewer carbon atoms. The term "cycloalkyl" refers to aliphatic cyclic alkyls having 3 to 10 carbon atoms in single or multiple cyclic rings, preferably 5 to 6 carbon atoms in a single cyclic ring. Non-limiting examples of suitable alkyl groups include methyl group, ethyl group, propyl group, isopropyl group, cyclopropyl group, butyl group, isobutyl group, sec-butyl group, tert-butyl group, cyclobutyl group, pentyl group, neo-pentyl group, cyclopentyl group, hexyl group, cyclohexyl group, 2-ethylhexyl, cyclohexylmethyl group, heptyl group, octyl group, nonyl group, decyl group, dodecyl group, tridecyl group, tetradcyl group, pentadecyl group, hexadecyl group, heptadecyl group, octadecyl group, nonadecyl group, cyclopentyl group, cyclohexyl group, and the like. Additional examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcaryl, adamantyl, and spiro[4.5]decanyl groups, as well as their homologs, isomers, and the like. Preferably, the alkyl group is selected from methyl group, ethyl group, butyl group, helptyl group, octadecyl group, and the like. Alkyls can be substituted or unsubstituted. When the term is used with the "substituted" modifier, one or more hydrogen atoms has been independently replaced by any of the substituents disclosed herein.

As used herein, the term "heteroalkyl" refers to an alkyl as defined above having at least one carbon atom replaced by a heteroatom. Non-limiting examples of suitable heteroatoms include nitrogen, oxygen, and sulfur. Examples of cycloheteroalkyl groups include, among others, morpholinyl, thiomorpholinyl, pyranyl, imidazolidinyl, imidazolinyl, oxazolidinyl, pyrazolidinyl, pyrazolinyl, pyrrolidinyl, pyrrolinyl, tetrahydrofuranyl, tetrahydrothiophenyl, piperidinyl, piperazinyl, and the like. Heteroalkyls can be substituted or unsubstituted. When the term is used with the "substituted" modifier, one or more hydrogen atoms has been independently replaced by any of the substituents disclosed herein, or a substituent is bonded to a heteroatom, or both.

As used herein, the term "alkenyl" refers to a straight- or branched-chain hydrocarbon radical or moiety comprising only carbon and hydrogen atoms and having at least one carbon-carbon double bond, which can be internal or terminal. Non-limiting examples of alkenyl groups include: —CH=$CH_2$ (vinyl), —CH=$CHCH_3$, —CH=$CHCH_2CH_3$, —$CH_2$CH=$CH_2$ (allyl), —$CH_2$CH=$CHCH_3$, —CH=CH—$C_6H_5$, —CH=CH—, —CH=$C(CH_3)CH_2$—, and —CH=$CHCH_2$—. The groups, —CH=CHF, —CH=CHCl, —CH=CHBr, and the like. Examples of alkenyl groups include ethenyl, propenyl, butenyl, pentenyl, hexenyl, butadienyl, pentadienyl, hexadienyl groups, and the like. Alkenyls can be substituted or unsubstituted. When the term is used with the "substituted" modifier, one or more hydrogen atoms has been independently replaced by any of the substituents disclosed herein.

As used herein, the term "alkynyl" refers to a straight- or branched-chain hydrocarbon radical or moiety comprising only carbon and hydrogen atoms and having at least one carbon-carbon triple bond, which can be internal or terminal.

The groups —C≡CH, —C≡CCH₃, and —CH₂C≡CCH₃, are non-limiting examples of alkynyl groups. Examples of alkynyl groups include ethynyl, propynyl, butynyl, pentynyl, hexynyl, and the like. Alkynes can be substituted or unsubstituted. When the term is used with the "substituted" modifier, one or more hydrogen atoms has been independently replaced by any of the substituents disclosed herein.

As used herein, the term "aryl" refers to a monocyclic or polycyclic aromatic hydrocarbon radical or moiety comprising only carbon and hydrogen atom, wherein the carbon atoms form an aromatic ring structure. If more than one ring is present, the rings may be fused or not fused, or bridged. The term does not preclude the presence of one or more alkyl groups attached to the first aromatic ring or any additional aromatic ring present. The point of attachment can be through an aromatic carbon atom in the ring structure or a carbon atom of an alkyl group attached to the ring structure. Non-limiting examples of aryl groups include phenyl (Ph), toyl, xylyl, methylphenyl, (dimethyl)phenyl, —C₆H₄—CH₂CH₃ (ethylphenyl), naphthyl, and the monovalent group derived from biphenyl. Further examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. When the term is used with the "substituted" modifier, one or more hydrogen atoms has been independently replaced by any of the substituents disclosed herein.

As used herein, the term "heteroaryl" refers to an aryl having at least one aromatic carbon atom in the ring structure replaced by a heteroatom. Non-limiting examples of suitable heteroatoms include nitrogen, oxygen, and sulfur. The term does not preclude the presence of one or more alkyl groups attached to the first aromatic ring or any additional aromatic ring present. The point of attachment can be through an aromatic carbon atom or aromatic heteroatom in the aromatic ring structure or a carbon atom of an alkyl group attached to the aromatic ring structure. Non-limiting examples of heteroaryl groups include furanyl, benzofuranyl, isobenzylfuranyl, imidazolyl, indolyl, isoindolyl, indazolyl, methylpyridyl, oxazolyl, pyridyl, pyrrolyl, pyrimidyl, pyrazinyl, quinolyl, quinazolyl, quinoxalinyl, thienyl, and triazinyl. Additional examples of heteroaryl groups include, for example, the 5- or 6-membered monocyclic and 5-6 bicyclic ring systems shown below:

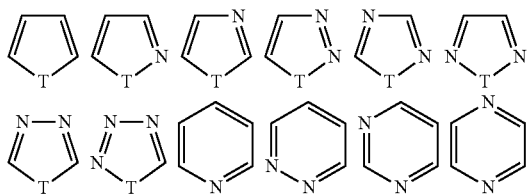

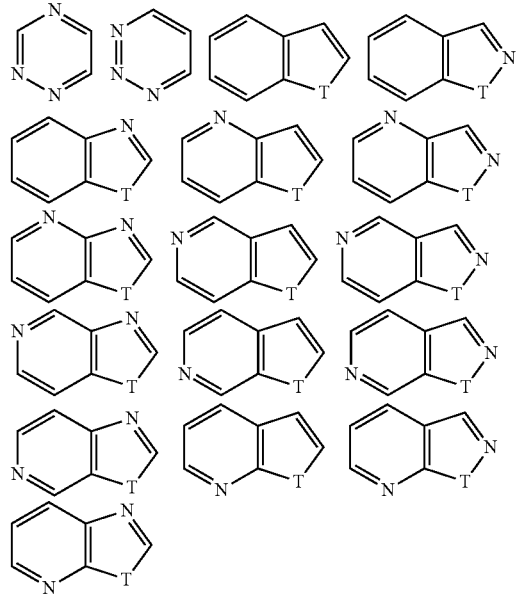

where T is O, S, NH, N-alkyl, N-aryl, N-(arylalkyl) (e.g., N-benzyl), SiH₂, SiH(alkyl), Si(alkyl)₂, SiH(arylalkyl), Si(arylalkyl)₂, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. Heteroaryls can be substituted or unsubstituted. When the term is used with the "substituted" modifier, one or more hydrogen atoms has been independently replaced by any of the substituents disclosed herein, or a substituent is bonded to a heteroatom, or both.

As used herein, the term "alkoxy" refers to the group —OR, wherein R is an alkyl, heteroalkyl, aryl, or heteroaryl group. Non-limiting examples of alkoxy groups include: —OCH₃, —OCH₂CH₃, —OCH₂CH₂CH₃, —OCH(CH₃)₂, —OCH(CH₂)₂, —OC₃H₆, —OC₄H₈, —OC₅H₁₀, —OC₆H₁₂, —OCH₂C₃H₆, —OCH₂C₄H₈, —OCH₂C₅H₁₀, —OCH₂C₆H₁₂, and the like. The terms "alkenyloxy", "alkynyloxy", "aryloxy", "aralkoxy", "heteroaryloxy", and "acyloxy" refer to the group —OR, wherein R is an alkenyl, alkynyl, aryl, aralkyl, heteroaryl, or acyl group, respectively. Examples include without limitation aryloxy groups such as —O-Ph and aralkoxy groups such as —OCH₂-Ph (—OBn) and —OCH₂CH₂-Ph. Alkoxys, alkenyloxys, alkynyloxys, aryloxys, aralkoxys, heteroaryloxys, and acyloxys can each be substituted or unsubstituted. When those terms are used with the "substituted" modifier, one or more hydrogen atoms has been independently replaced by any of the substituents disclosed herein, or a substituent is bonded to a heteroatom, or both.

As used herein, "amine" and "amino" (and its protonated form) are art-recognized and refer to both unsubstituted and substituted amines, e.g., a moiety that can be represented by the general formula NRR'R", represented by the structure:

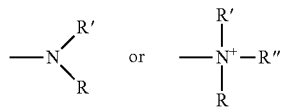

wherein R, R', and R" each independently represent a hydrogen, a heteroatom, an alkyl, a heteroalkyl, an alkenyl, —(CH$_2$)$_m$-Rc or R and R' taken together with the N atom to which they are attached complete a heterocycle having from 4 to 8 atoms in the ring structure; Re represents an aryl, a cycloalkyl, a cycloalkenyl, a heterocycle or a polycycle; and m is zero or an integer in the range of 1 to 8, and substituted versions thereof.

As used herein, the terms "halide," "halo," and "halogen" refer to —F, —Cl, —Br, or —I.

As used herein, the term "substituent" and "substituted" refers to all permissible substituents of the compounds described herein. In the broadest sense, the permissible substituents include acyclic and cyclic, branched and unbranched, carbocyclic and heterocyclic, aromatic and nonaromatic substituents of organic compounds. Examples of substituents include, without limitation, nothing, alkyl, substituted alkyl, cycloalkyl, substituted cycloalkyl, heteroalkyl, substituted heteroalkyl, alkenyl, substituted alkenyl, alkynyl, substituted alkynyl, aryl, substituted aryl, heteroaryl, substituted heteroaryl, aralkyl, substituted aralkyl, alkaryl, substituted alkaryl, haloaryl, substituted haloaryl, alkoxy, substituted alkoxy, alkenyloxy, substituted alkenyloxy, alkynyloxy, substituted alkynyloxy, aryloxy, substituted aryloxy, aralkoxy, substituted aralkoxy, heteroaryloxy, substituted heteroaryloxy, acyloxy, substituted acyloxy, acyl, substituted acyl, halo (—F, —Cl, —Br, —I, etc.), hydrogen (—H), carboxyl (—COOH), hydroxy (—OH), oxo (=O), hydroxyamino (—NHOH), nitro (—NO$_2$), cyano (—CN), isocyanate (—N=C=O), azido (—N$_3$), phosphate (e.g., —OP(O)(OH)$_2$, —OP(O)(OH)O—, deprotonated forms thereof, etc.), mercapto (—SH), thio (=S), thioether (=S—), sulfonamido (—NHS(O)$_2$—), sulfonyl (—S(O)$_2$—), sulfinyl (—S(O)$_2$—), any combinations thereof, and the like.

Additional examples of substituents include, but are not limited to, —NC, —S(R$^0$)$_2$, —N(R$^0$)$_3$$^+$, —SO$_3$H, —SO$_2$R$^0$, —SO$_3$R$^0$, —SO$_2$NHR$^0$, —SO$_2$N(R$^0$)$_2$, —COR, —COOR$^0$, —CONHR$^0$, CON(R$_0$)$_2$, C$_{1-40}$ haloalkyl groups, C$_{6-14}$ aryl groups, and 5-14 membered electron-poor heteroaryl groups; where R$^0$ is a C$_{1-20}$ alkyl group, a C$_{2-20}$ alkenyl group, a C$_{2-20}$ alkynyl group, a C$_{1-20}$ haloalkyl group, a C$_{1-20}$ alkoxy group, a C$_{6-14}$ aryl group, a C$_{3-14}$ cycloalkyl group, a 3-14 membered cycloheteroalkyl group, and a 5-14 membered heteroaryl group, each of which can be optionally substituted as described herein. Additional examples of substituents include, but are not limited to, —OR$^0$, —NH$_2$, —NHR$^0$, —N(R$^0$)$_2$, and 5-14 membered electron-rich heteroaryl groups, where R$^0$ is a C$_{1-20}$ alkyl group, a C$_{2-20}$ alkenyl group, a C$_{2-20}$ alkynyl group, a C$_{6-14}$ aryl group, or a C$_{3-14}$ cycloalkyl group.

Discussion

The present disclosure provides covalent organic framework compositions for use as electrode materials in supercapacitor devices, among other applications. While conventional covalent organic frameworks have very low electronic conductivity and very low specific capacitance (C) values, the electrode materials of the present disclosure provide a covalent organic framework composition having a redox active linker incorporated into a highly porous conductive backbone to obtain a layered two-dimensional Aza-fused n-conjugated covalent organic framework composition with enhanced electrical conductivity, among other properties. The highly porous conductive backbone of the covalent organic framework composition may be useful for electrical double layer capacitor (EDLC)-based charged storage, while the installation of redox active linker into said backbone may be useful for pseudocapacitive charge storage. The extended framework of the two-dimensional aromatized n-conjugated system together with the long-range 7c-7c stacking/orbital overlapping may provide a continuous pathway for electrons which makes them conductive. The present disclosure further provides a new low temperature solvothermal synthetic strategy that permits the incorporation of redox active linkers into the conductive backbone of the covalent organic framework compositions without causing the redox active linkers to decompose. In addition, the present disclosure provides various supercapacitor devices including the electrode materials, among other embodiments.

Embodiments of the present disclosure provide electrode materials. In some embodiments, the electrode material is or is included in a negative electrode material (e.g., anode). In some embodiments, the electrode material is or is included in a positive electrode material (e.g., cathode). In some embodiments, the electrode materials include a covalent organic framework (COF) composition having the following structural formula:

Structural Formula I

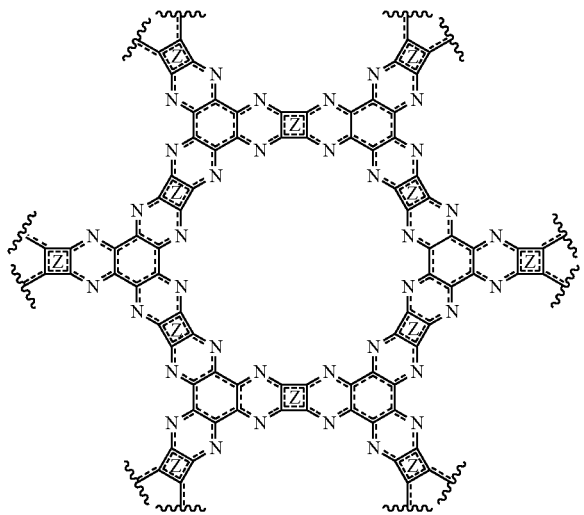

where Z is a redox active linker. In some embodiments, the redox active linker, Z, is a redox-functionalized aromatic linker. An unsubstituted carbocyclic benzene, which may be tetravalent, is not redox active and thus is not a redox active linker. For example, in some embodiments, a redox active linker does not include, or is not, an unsubstituted carbocyclic benzene, such as a tetravalent unsubstituted carbocyclic benzene. For example, in some embodiments, the redox active linker, Z, includes at least one aromatic ring, with the proviso that when the redox active linker is a single aromatic ring, the redox active linker is not unsubstituted carbocyclic benzene. In some embodiments, the redox active linker, Z, includes at least one aromatic ring having at least one of a heteroatom and a substituent. For example, in some embodiments, the heteroatom includes at least one of, or is selected from the group consisting of, a nitrogen heteroatom, an oxygen heteroatom, a sulfur heteroatom, and combinations thereof. In some embodiments, the substituent includes at least one of, or is selected from the group consisting of, a hydrogen, a halogen (e.g., at least one of —Cl, —F, —Br, —I, etc.), a carbonyl group (e.g., —C=O), a carboxylic acid group, an alkoxy group (—OR), a hydroxyl group (—OH), an amino group, a nitro group, an optionally substituted linear alkyl group (e.g., a trichloromethyl group), an optionally substituted branched alkyl group, or a nitrile (cyano) group, and combinations thereof.

In some embodiments, the COF composition, such as for example the COF composition of structural formula I, includes a plurality of cores and a plurality of redox active linkers. For example, in some embodiments, the electrode materials include a plurality of cores fused to a plurality of redox active linkers via Aza units to form a COF composition. In some embodiments, the electrode materials include a plurality of cores fused to a plurality of redox-functionalized aromatic linkers via Aza units to form a COF composition. In some embodiments, the COF composition includes one or more of a layered COF composition, a two-dimensional COF composition, an Aza-fused COF composition, a π-conjugated COF composition, a COF composition based on hexaketocyclohexane (e.g., a Hex-Aza-COF composition), and a COF composition of structural formula I. For example, in some embodiments, the electrode materials include an Aza-fused n-conjugated COF composition. In some embodiments, the electrode materials include a layered two-dimensional Aza-fused π-conjugated COF composition.

In some embodiments, the plurality of cores is represented by the following structural formula:

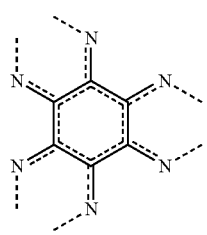

where:
* - - - * is at least one of an optional bond and a point of attachment, either or both of which may provide aromaticity.

In some embodiments, the plurality of cores is represented by at least one of the following structural formulas:

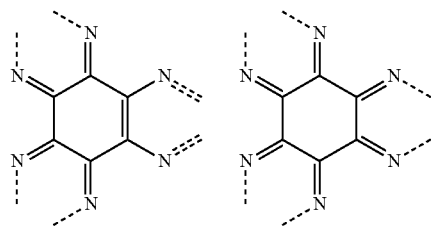

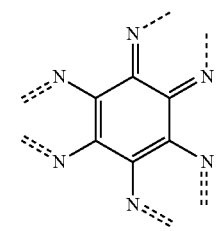

where:
* - - - * is at least one of an optional bond and a point of attachment, either or both of which may provide aromaticity.

In some embodiments, the plurality of redox active linkers is represented by the following structural formula:

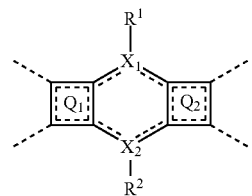

wherein:
* - - - * is at least one of an optional bond and a point of attachment, either or both of which may provide aromaticity (e.g., as a point of attachment, a double bond may be formed and/or present (even if not shown), depending on the core, among other things);

$X_1$ and $X_2$ are independently a carbon atom, a nitrogen atom, an oxygen atom, or a sulfur atom;

$R^1$ and $R^2$ are independently a hydrogen, a halogen (e.g., at least one of —Cl, —F, —Br, —I, etc.), carbonyl group (e.g., C=O), an alkoxy group (—OR), a hydroxyl group (—OH), an amino group, an optionally substituted linear alkyl group, an optionally substituted branched alkyl group, or a nitrile group, provided that, when $X_1$ and $X_2$ are carbon atoms, at least one of $R^1$ and $R^2$ is a trichloromethyl group, a nitrile group, a nitro group, a carboxylic acid group, or a sulfonyl group, or is not a hydrogen; and $Q_1$ and $Q_2$ are independently nothing, an optionally substituted aryl group, an optionally substituted heteroaryl group.

In some embodiments, the plurality of redox active linkers includes at least one of, or is selected from the group consisting of, the following:

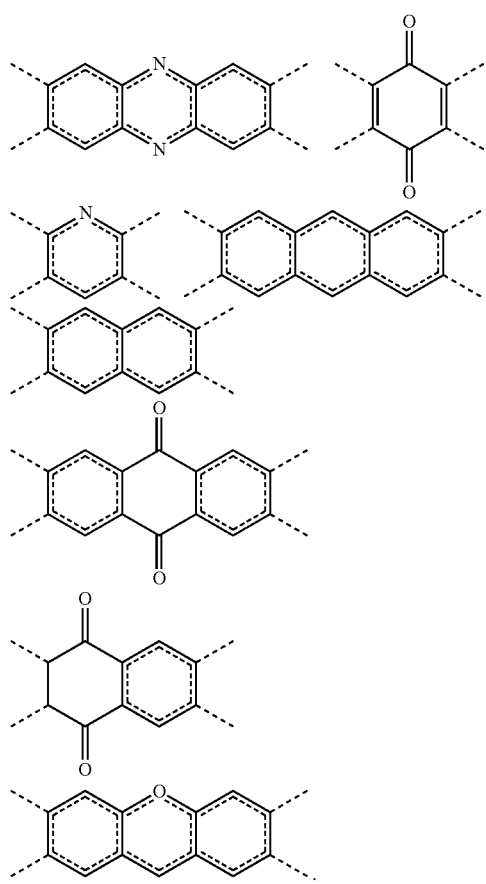

In some cases, one or more of the redox active linkers include at least one redox active moieties, such as a nitrile group, a nitro group, a carboxylic acid group, a sulfonyl group or a combination thereof.

As mentioned above, in some embodiments, the electrode material includes a layered two-dimensional Aza-fused n-conjugated COF composition. In some embodiments, a COF composition is a layered two-dimensional COF where covalent bonds exist or only exist in conjugated two-dimensional sheets or layers, while only weak interactions (e.g., π-π stacking/orbital overlapping) exist between the two-dimensional sheets or layers. In some embodiments, an interlayer repulsion between polarized imine nitrogens of the Aza-fused 7c-conjugated COF composition prevents ordered stacking and/or long-range ordered stacking of said layers. In some embodiments, the electrode material includes a three-dimensional Aza-fused n-conjugated covalent organic framework. In some embodiments, a COF composition is a three-dimensional COF composition where covalent bonds exist in conjugated two-dimensional sheets or layers and between the two-dimensional sheets or layers.

In some embodiments, the electrode material has low crystallinity, moderate crystallinity, or high crystallinity, as determined by PXRD. In some embodiments, an interlayer π-π stacking and/or overlapping distance is at least about 1 Å, or at least any one of, equal to any one of, or between any two of about 1, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9, 9.2, 9.4, 9.6, 9.8, and 10 Å.

In some embodiments, the electrode material includes a covalent organic framework composition having a unit cell with at least one of AA eclipse packing, inclined packing, ABC staggered packing, and AB staggered packing.

In some embodiments, the electrode material is provided in the form of a thin film, a layer, a coating, and a nanostructure (e.g., a nanosheet, etc.).

In some embodiments, the Aza-fused π-conjugated covalent organic framework has a BET surface area of at least 70 $m^2/g$, or at least any one of, equal to any one of, or between any two of 70, 75, 80, 85, 90, 95, 100, 105, 110, 115, 120, 125, 130, 135, 140, and 145 $m^2/g$ or greater.

In some embodiments, the electrode material includes a COF composition having at least one of an aggregated layer morphology and an aggregated spherical morphology, as determined by scanning electron microscopy (SEM). In some embodiments, the aggregated layer morphology has particle sizes ranging from about 100 nm to about 100 ms or greater. In some embodiments, the electrode material includes a COF composition formed by self-assembly of nanosheets as determined by transmission electron microscopy (TEM).

While not wishing to be bound to a theory, it is believed that the covalent organic framework compositions disclosed herein feature a redox active moiety which is incorporated into the conductive backbone of an Aza-fused n-conjugated covalent organic framework to improve the Aza-fused n-conjugated covalent organic framework's performance as an electrode material. While supercapacitive energy storage of conventional conjugated microporous polymers, including covalent organic frameworks, is only based on electrical double layer capacitive charge storage, the incorporation of the redox active moiety into the conductive backbone in accordance with the present invention improves the charge storage performance of the covalent organic framework composition by enabling pseudocapacitive charge storage in addition to the electrical double layer capacitive charge storage. In addition, the covalent organic framework compositions not only benefit from the high specific capacitance of pseudocapacitors, but said covalent organic framework compositions also benefit from the long cyclic stability of electrical double layer capacitors (EDLC).

FIG. 1A is a flowchart of a method of making an electrode material, according to one or more embodiments of the invention. As mentioned above, the method includes a low temperature solvothermal synthetic strategy based on solvothermal condensation reaction of cyclohexanehexone precursors and redox functionalized aromatic tetraamine precursors. The low temperature solvothermal condensation reaction permits the incorporation of redox active linkers into the conductive backbone of the covalent organic framework compositions without causing the redox active linkers to decompose.

As shown in FIG. 1A, the method may include a combining step 102A in which a hexaketocyclohexane compound and an aromatic tetraamine compound are combined in a solution. The hexaketocyclohexane compound may include a hexaketocyclohexane salt, a hexaketocyclohexane hydrate, and/or any other hexaketocyclohexane precursor. For example, in some embodiments, the hexaketocyclohexane compound includes a hexaketocyclohexane octahydrate. The aromatic tetraamine compound may include any aromatic tetraamine, including an aromatic tetraamine salt, an aromatic tetraamine hydrate, and/or any other aromatic tetraamine precursor, such as precursors to the redox active linkers described above. Non-limiting examples of aromatic tetraamine compounds include, without limitation, at least one of the following: 1,2,4,5-tetraamino-benzoquinone; 2,3, 6,7-tetraamino-phenazine hydrochloride; 2,3,5,6-tetraaminocyclohexa-2,5-diene-1,4-dione;

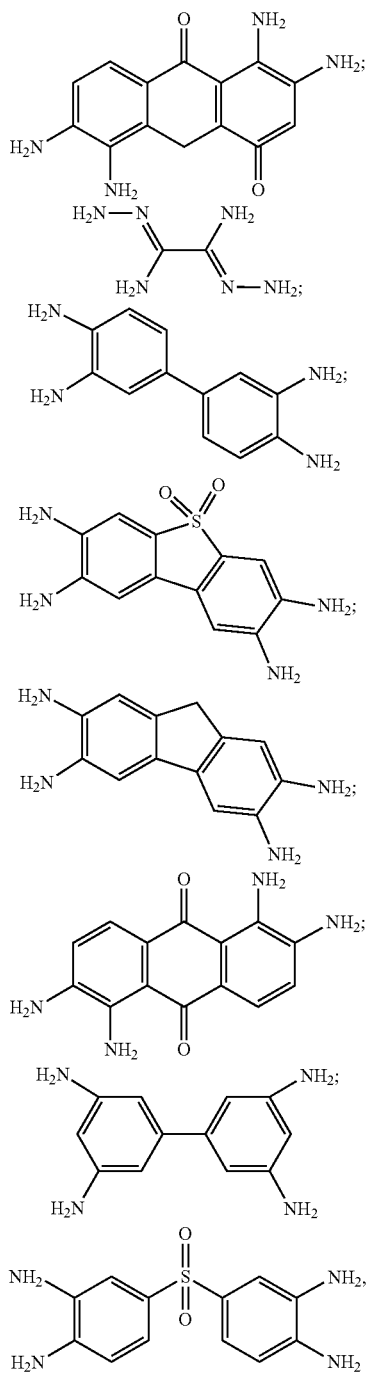

and the like.

The solution may include at least one solvent. For example, in some embodiments, the solution may include one or more of ethylene glycol and acetic acid. In some embodiments, the solution includes a 1:1 solvent combination of ethylene glycol and 3.0 M acetic acid (e.g., at 1 mL:1 mL). In some cases, the solvent is pyridine, mesitylene, 1,4-dioxane, or mixtures thereof.

The method 100A may further include a mixing step 104A in which the solution including the hexaketocyclohexane compound and the aromatic tetraamine compound are mixed. The manner in which said solution is mixed and/or the technique used for mixing is not particularly limited. In some embodiments, the mixing 104A may include sonicating for a select duration, such as at least 1 min, or at least any one of, equal to any one of, or between any two of 5 min, 10 min, 15 min, 20 min, 25 min, 30 min, 45 min, and 60 min or greater. In some embodiments, the mixing 104A includes at least one of agitating, contacting, stirring, swirling, shaking, and the like.

The method 100A may further include a heating step 106A in which the solution including the hexaketocyclohexane compound and the aromatic tetraamine compound from step 102A and/or 104A (e.g., the sonicated solution) is heated to form an electrode material of the present disclosure. The heating 106A may include heating the solution including the hexaketocyclohexane compound and the aromatic tetraamine compound to a first temperature. The heating 106A may include further heating the solution including the hexaketocyclohexane compound and the aromatic tetraamine compound to a second temperature. In some embodiments, the first temperature is less than the second temperature. In some embodiments, the first temperature is at least about 15° C., or at least any one of, equal to any one of, or between any two of 20, 25, 30, 35, 40, 45, 50, 55, 60, 65, 70, 75, 80, 85, 90, 95, and 99° C. In some embodiments, the second temperature is at least about 100° C., or at least any one of, equal to any one of, or between any two of, 100, 105, 110, 115, 120, 125, 130, 135, 140, 145, 150, 155, 160, 165, 170, 175, 180 185, 190, 195, and 200° C. or greater. In some embodiments, the first temperature is about 65° C. and the second temperature is between 120° C. and 150° C. The duration of heating at each of the first temperature and the second temperature may be at least about 1 min, or at least any one of, equal to any one of, or between any two of, 1 h, 2 h, 3 h, 4 h, 5 h, 6 h, 7 h, 8 h, 9 h, 10 h, 11 h, 12 h, 13 h, 14 h, 15 h, 16 h, 17 h, 18 h, 19 h, 20 h, 21 h, 22 h, 23 h, 24 h, 2 d, 3 d, 4 d, 5 d, 6 d, and 7 d or longer.

Figure 1B:
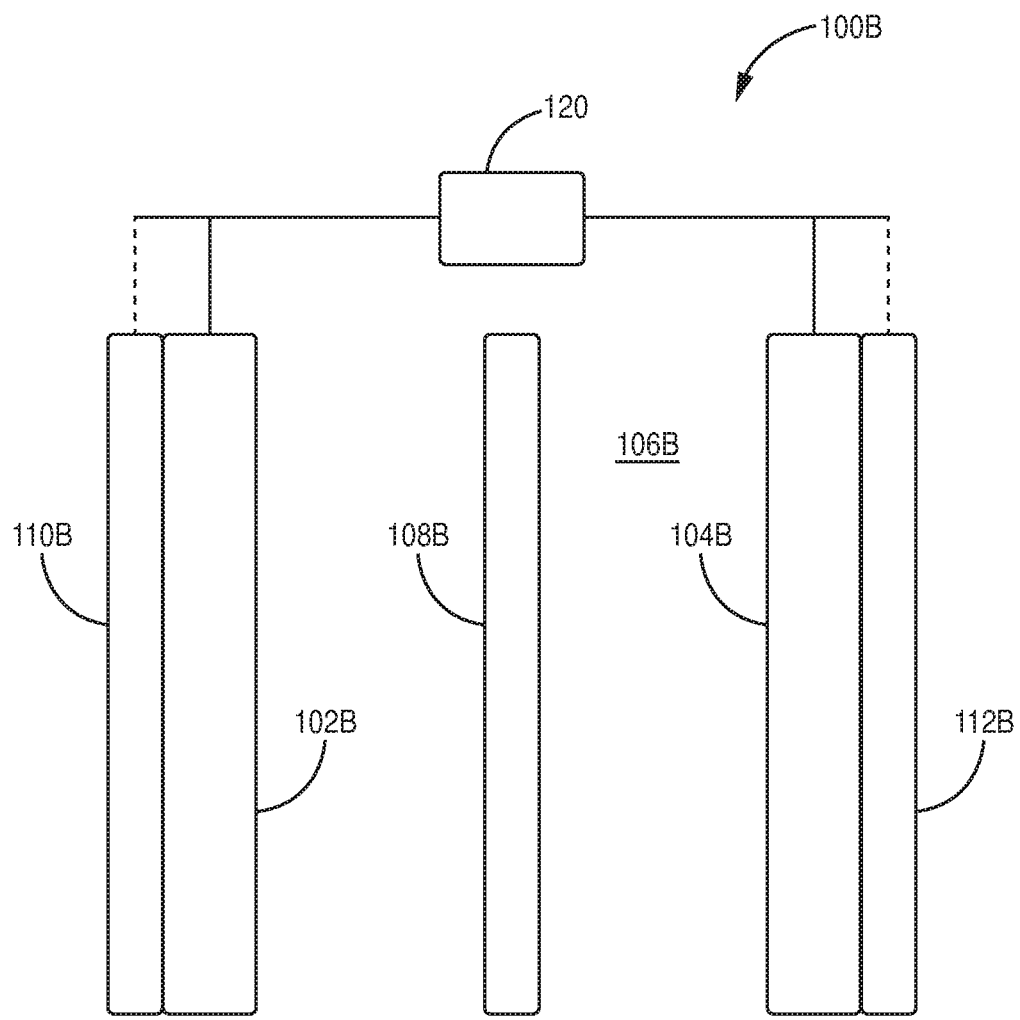
FIG. 1B is a schematic diagram of a supercapacitor device, according to one or more embodiments of the present disclosure.
Figure 2:
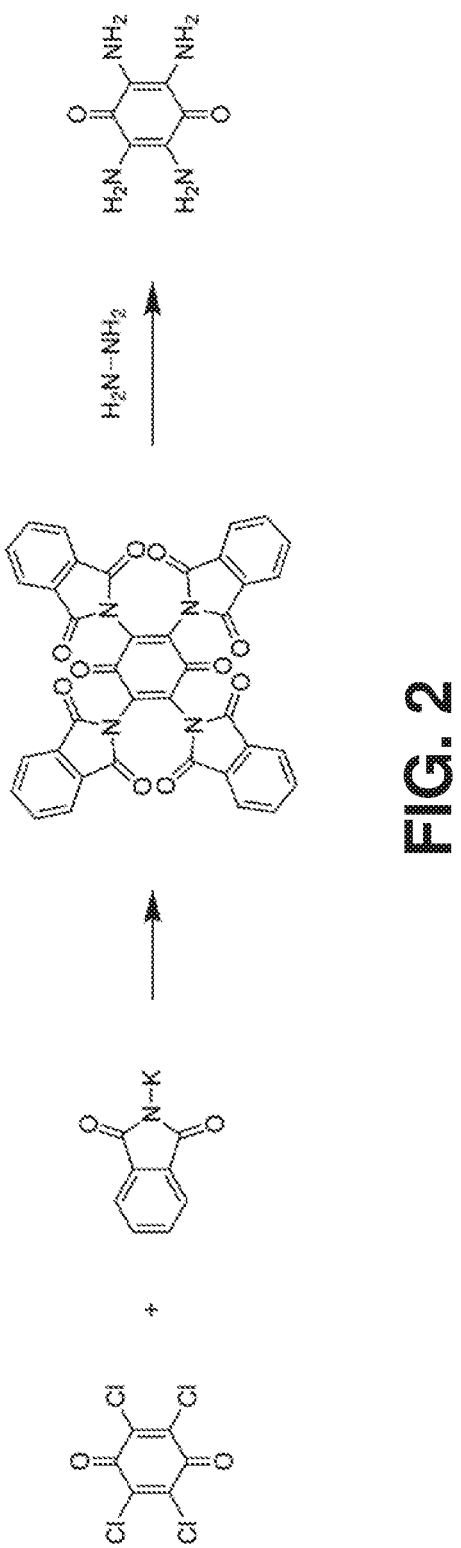
FIG. 2 is a schematic diagram of the synthesis of tetraamino-benzoquinone, according to one or more embodiments of the present disclosure.
Figure 3:
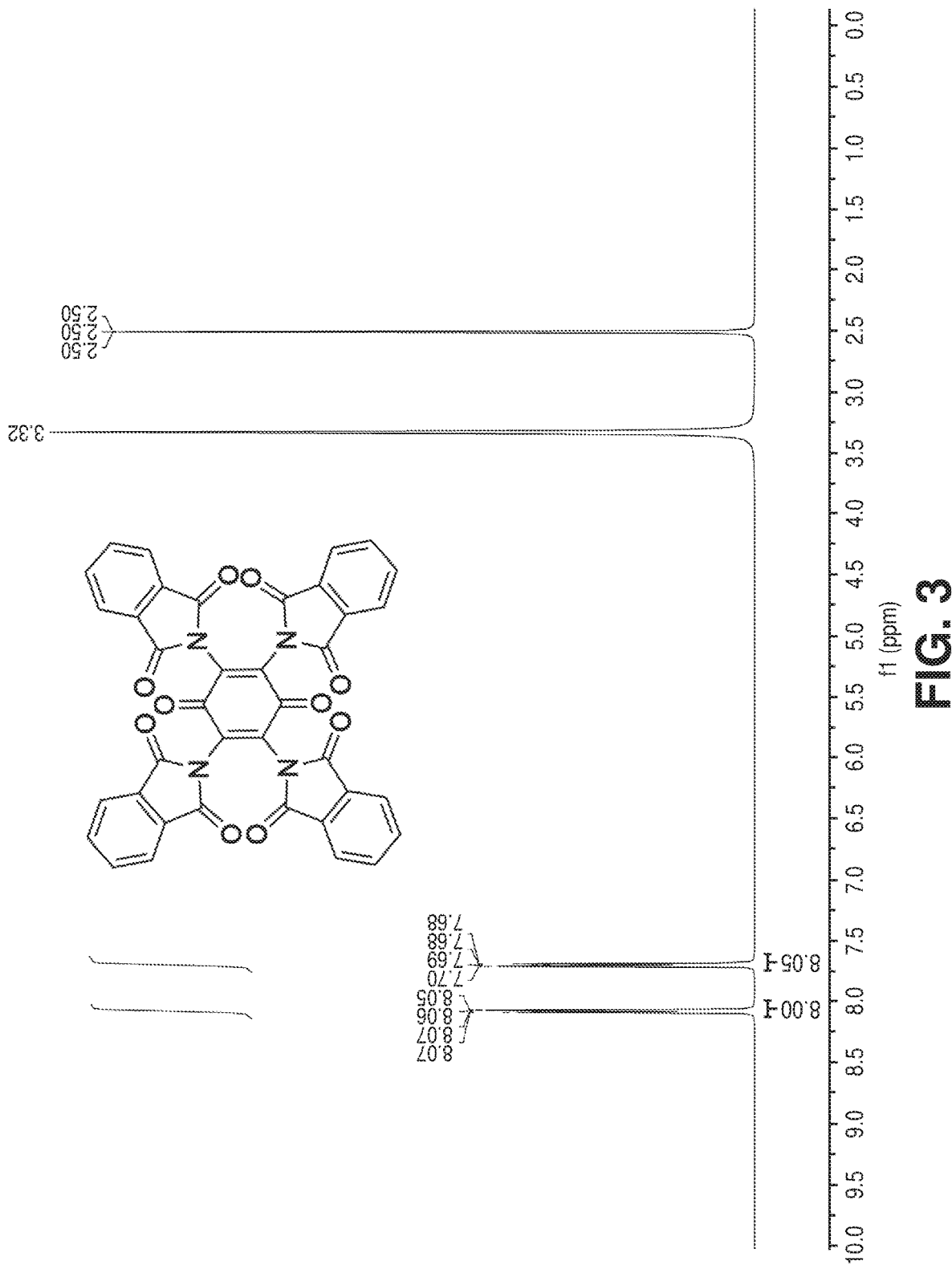
FIG. 3 is $^1H$ NMR spectra of tetraphthalimido-benzoquinone (500 MHz, $CDCl_3$); $^1H$ NMR (500 MHz, $CDCl_3$) δ 8.06 (dd, J=6.7, 3.3 Hz, 8H), 7.69 (dd, J=6.8, 3.2 Hz, 8H) ppm, according to one or more embodiments of the present disclosure.
Figure 4:
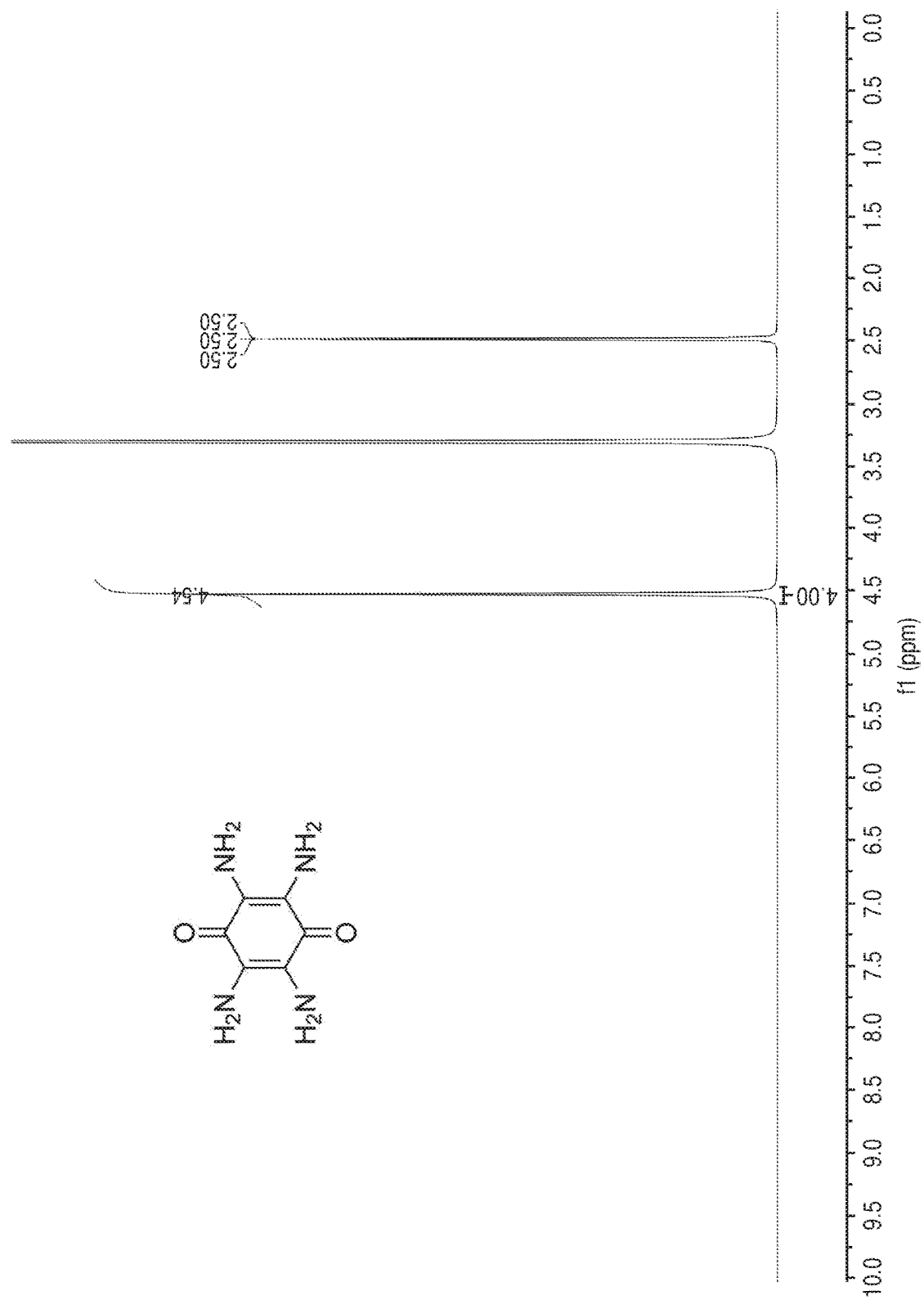
FIG. 4 is $^1H$ NMR spectra of tetramino-benzoquinone; 1H NMR (500 MHz, DMSO-$d_6$) δ 4.54 (s, 4H) ppm. 13C NMR (126 MHz, DMSO-$d_6$) δ 178.9, 121.4 ppm, according to one or more embodiments of the present disclosure.
Figure 5:
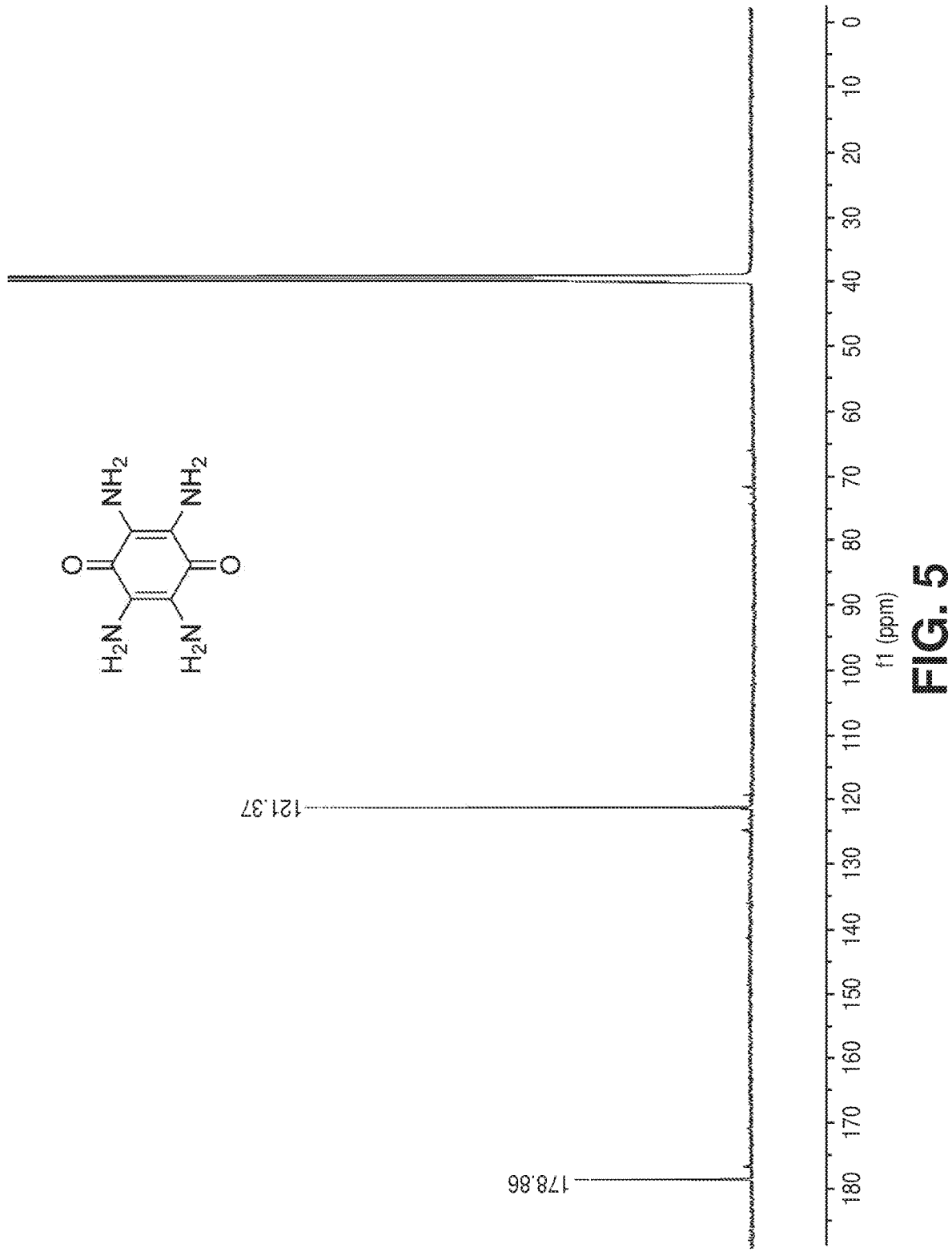
FIG. 5 is $^{13}C$ NMR spectra of tetramino-benzoquinone; $^{13}C$ NMR (126 MHz, DMSO-$d_6$) δ 178.9, 121.4 ppm, according to one or more embodiments of the present disclosure.

FIG. 1B is a schematic diagram of a supercapacitor device 100B, according to one or more embodiments of the invention. The supercapacitor device 100B may include any of the electrode materials of the present disclosure. As mentioned above, the electrode materials may generally be used as anode materials or as negative electrode materials, although embodiments also include electrode materials used as cathode materials or as positive electrode materials. For example, as shown in FIG. 1B, in some embodiments, a supercapacitor device 100B includes a positive electrode material 102B, a negative electrode material 104B, and at least one of an electrolyte 106B and a separator 108B provided between the positive electrode material 102B and the negative electrode material 104B. In some embodiments, a gel electrolyte is provided between the positive electrode material 102B and the negative electrode material 104B (e.g., in place of electrolyte 106B and/or separator 104B). In some embodiments, the supercapacitor device 100B includes or further includes a positive electrode material 102B having a first surface in contact with or proximal to at least one of an electrolyte 106B and a separator 108B and a second surface in contact with or proximal to a first current collector 110B. In some embodiments, the supercapacitor device 100B includes or further includes a negative electrode material 104B having a first surface in contact with or proximal to at least one of an electrolyte 106B and a separator 108B and a second surface in contact with or proximal to a second current collector 112B. The supercapacitor device 100B may further include terminals (not shown) (e.g., a positive terminal coupled to the positive electrode material and a negative terminal coupled to the negative electrode material) and a power source 120. In some embodiments, the supercapacitor device 100b is a hybrid supercapacitor device (e.g., an asymmetric supercapacitor device) or a solid-state hybrid supercapacitor device (e.g., a solid-state asymmetric supercapacitor device), wherein the negative electrode material 104B includes an electrode material of the present disclosure and wherein the positive electrode material 102B is a material different from the negative electrode material 104B. In some embodiments, the supercapacitor device 100B is a symmetric capacitor device, wherein the positive electrode material 102B and the negative electrode material 104B include the same or similar electrode materials of the present disclosure. Any of the electrolytes, electrode materials (e.g., positive and/or negative electrode materials) of the present disclosure may be used herein. In addition, any conventional components known in the art may be used herein as, for example and without limitation, the charge collector, electrolyte, separator, positive electrode material, negative electrode material, power supply, and terminals, among other components, whether or not mentioned herein.

In some embodiments, the asymmetric supercapacitor device is an all-solid asymmetric supercapacitor device including a gel electrolyte. In some embodiments, the electrolyte is a gel electrolyte including PVA and $H_2SO_4$. In some embodiments, the electrolyte includes at least one of $H_2SO_4$ (e.g., 1.0 M $H_2SO_4$), $Na_2SO_4$ (e.g., 1.0 M $Na_2SO_4$), and polyvinyl alcohol (PVA). In some embodiments, the electrolyte includes $H_2SO_4/Na_2SO_4$. In some embodiments, the electrolyte includes 1.0 M $H_2SO_4$/1.0 M $Na_2SO_4$ as electrolyte. In some embodiments, the negative electrode material includes at least one of the electrode material of the present disclosure, a conductive carbon component, a carbon fabric (CF) electrode material, a polymer binder (e.g., PVDF).

In some embodiments, a redox-functionalized layered two-dimensional Aza-fused π-conjugated covalent organic frameworks (COFs) based on hexaketocyclohexane (Hex-Aza COFs) structures is provided and deployed as anode in asymmetric supercapacitors (ASC). The Hexa-Aza COFs may be synthesized based on a solvothermal condensation reaction of cyclohexanehexone and redox-functionalized aromatic tetramines, such as benzoquinone (Hex-Aza-2) and/or phenazine (Hex-Aza-3). The Hexa-Aza COFs may exhibit a specific-capacitance of 585 $Fg^{-1}$ for Hex-Aza-2 and 536 $Fg^{-1}$ for Hex-Aza-3 in a three-electrode configuration. Additionally, Hex-Aza COFs may be deployed as an anode material covering a wide voltage-window (e.g., 0V to −1.0V). Taking advantage of their anodic characteristics, a two-electrode ASC device may be constructed by combining the Hex-Aza COFs with $RuO_2$ as cathode. In some embodiments, the complementary potential windows of Hex-Aza-3 and $RuO_2$ may form an asymmetric device achieving a high voltage-window of 1.7 V. The broad potential-window and high specific-capacitance may form a $RuO_2$//Hex-Aza-3 two-electrode solid-state ASC device capable of achieving a high energy density value of 39.6 W h $kg^{-1}$ with a power density of 1124 W $kg^{-1}$.

In some embodiments, the design and synthesis of layered two-dimensional Aza-fused COFs based on hexaketocyclohexane (Hex-Aza COFs) are provided. Hex-Aza COFs functionalized with redox-active benzoquinone (Hex-Aza-2) or phenazine (Hex-Aza-3) moieties may be synthesized by simple solvothermal condensation reaction. The installation of redox active moieties such as phenazine or benzoquinone in the conductive backbone of Aza-COF framework may be performed to improve the pseudocapacitance, as well as the specific capacitance C values of the Hex-Aza COFs. The synthesized redox functionalized Hex-Aza COFs (Hex-Aza-2 and Hex Aza-3) may exhibit high C values close to 500 $Fg^{-1}$ at 1 $Ag^{-1}$ (e.g., 585 $Fg^{-1}$ for Hex-Aza-2 and 536 $Fg^{-1}$ for Hex-Aza-3), which is higher than its unfunctionalized analog Hex-Aza-1 (which was constructed for comparative purposes; see example below). In the three-electrode measurement mode, Hex-Aza COFs may exhibit a majority of the capacitance contribution in the negative potential window (−1.0 V to 0.0 V vs. $Hg/Hg_2SO_4$), which may enable said COFs to work as anode materials in ASC device. The C values of the redox functionalized Hex-Aza COFs may be comparable to or may exceed the best performing anode materials in ASC, such as MXenes. In order to exploit the high C values and negative electrode characteristics of functionalized Hex-Aza COFs, an ASC solid-state device may be constructed by combing Hex-Aza-3 as the anode and $RuO_2$ as the cathode. The complementary potential window of the individual electrode material may form a $RuO_2$//Hex-Aza-3 ASC device that achieves a broad voltage window of 1.7 V. The $RuO_2$//Hex-Aza-3 ASC solid-state device may deliver a capacitance of 95 F $g^{-1}$, at 1 A $g^{-1}$ current density. The energy density of $RuO_2$//Hex-Aza-3 ASC device may also be high (39.6 W h $kg^{-1}$) with a power density of 1124 W $kg^{-1}$. Excellent cyclic stability may also be achieved with about 89% capacitance retention after 7500 charge-discharge cycles.

In some embodiments, a series of functionalized (e.g., redox functionalized) Hex-Aza COFs may be deployed as high performing anode materials for ASC devices. The incorporation of redox functionalities such as benzoquinone and phenazine may significantly improve the capacitive performance in Hex-Aza COFs. These newly synthesized redox functionalized Hex-Aza COFs may exhibit a high specific capacitance close to 500 $Fg^{-1}$ at 1 $Ag^{-1}$ (585 $Fg^{-1}$ for Hex-Aza-2 and 536 $Fg^{-1}$ for Hex-Aza-3) in three-electrode configuration. To check the effect of the redox-active functionalities on the capacitance contribution, a pristine unfunctionalized COF Hex-Aza-1 may also be constructed for comparison purposes, which exhibits a lower capacitance value of 220 $Fg^{-1}$. In some embodiments, a majority of the capacitance contribution of Hex-Aza COFs may be located in the negative potential window. To exploit the high capacitance value and anodic nature of the Hex-Aza COFs, ASC devices may be constructed by coupling them with $RuO_2$ as cathode. The complementary potential window of the individual electrode may form a $RuO_2$//Hex-Aza-3 device that achieves a high cell voltage window of 1.7 V. Additionally, the $RuO_2$//Hex-Aza-3 device may exhibit a specific capacitance of 98 $Fg^{-1}$ at a current density of 1 $Ag^{-1}$, and may deliver an energy density of 39.6 W h $Kg^{-1}$ with a power density of 1124 W $Kg^{-1}$.

Example 1

Synthesis of Hex-Aza-1

For Comparative Purposes

The synthesis of Hex-Aza covalent organic frameworks (COFs) was performed by solvothermal condensation reaction of hexaketocyclohexane octahydrate (0.06 mmol, 18.7 mg) and 1,2,4,5-benzenetetramine tetrahydrochloride (0.09 mmol, 25.56 mg) in 1:1 solvent combination of ethylene glycol and 3.0 M acetic acid (1 mL:1 mL). Initially, reactants and solvents were transferred to 20 mL screw-capped Pyrex tubes under nitrogen atmosphere, followed by sonication for 15 minutes. After sonication the Pyrex tubes were transferred to a preheated oven at 65° C. The Pyrex tubes were then incubated at 65° C. for 4 hours, and then the temperature of the oven was slowly raised to 150° C. After 4 days of reaction, the Pyrex tubes were removed from the oven. The black Hex-Aza COFs powders were isolated by filtration, washed with solvents acetone and water, and dried under vacuum. All other starting materials, solvents were purchased from a commercial source and used without further purification.

Example 2

Synthesis of Hex-Aza-2

The synthesis of Hex-Aza COFs was performed by solvothermal condensation reaction of hexaketocyclohexane octahydrate (0.06 mmol, 18.7 mg) and 2,3,5,6-tetraamino-cyclohexa-2,5-diene-1,4-dione (FIGS. 2-5), which was previously synthesized, (0.09 mmol, 15.2 mg or 15.4 mg) in 1:1 solvent combination of ethylene glycol and 3.0 M acetic acid (1 mL:1 mL). Initially, reactants and solvents were transferred to 20 mL screw-capped Pyrex tubes under nitrogen atmosphere, followed by sonication for 15 minutes. After sonication the Pyrex tubes were transferred to a preheated oven at 65° C. The Pyrex tubes were then incubated at 65° C. for 4 hours, and then the temperature of the oven was slowly raised to 120 to 150° C. After 4 days of reaction, the Pyrex tubes were removed from the oven. The black Hex-Aza COFs powders were isolated by filtration, washed with solvents acetone and water, and dried under vacuum. All other starting materials, solvents were purchased from a commercial source and used without further purification.

Example 3

Synthesis of Hex-Aza-3

Figure 6:
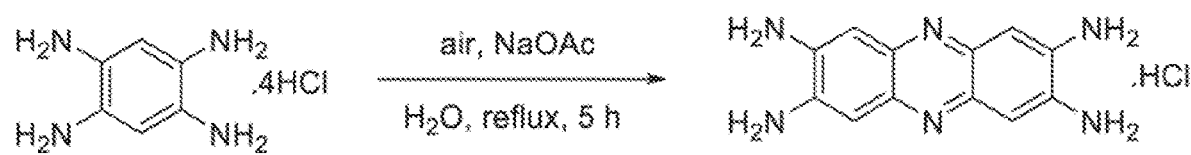
FIG. 6 is a schematic diagram of the synthesis of 2,3,6,7-tetraamino-phenazine hydrochloride, according to one or more embodiments of the present disclosure.
Figure 7:
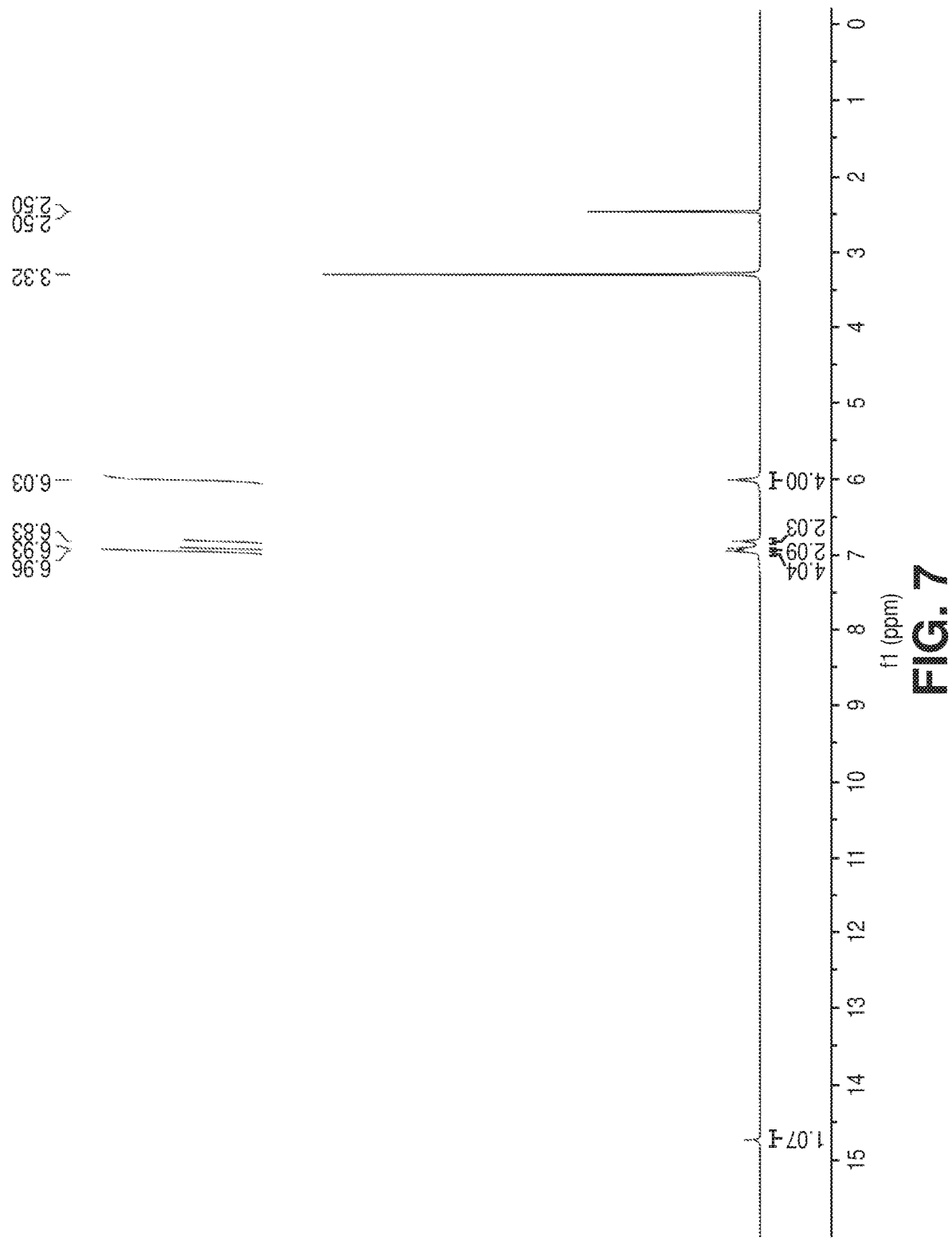
FIG. 7 is $^1H$ NMR of 2,3,6,7-tetraamino-phenazine hydrochloride; $^1H$ NMR (500 MHz, DMSO-$d_6$) δ 14.70 (s, 1H), 6.96 (s, 4H), 6.93 (s, 2H), 6.83 (s, 2H), 6.03 (s, 4H=), according to one or more embodiments of the present disclosure.

The synthesis of Hex-Aza COFs was performed by solvothermal condensation reaction of hexaketocyclohexane octahydrate (0.06 mmol, 18.7 mg) and 2,3,6,7-tetraamino-phenazine hydrochloride (FIGS. 6-7), which was previously synthesized, (0.09 mmol, 31.5 mg) in 1:1 solvent combination of ethylene glycol and 3.0 M acetic acid (1 mL: 1 mL). Initially, reactants and solvents were transferred to 20 mL screw-capped Pyrex tubes under nitrogen atmosphere, followed by sonication for 15 minutes. After sonication the Pyrex tubes were transferred to a preheated oven at 65° C. The Pyrex tubes were then incubated at 65° C. for 4 hours, and then the temperature of the oven was slowly raised to 120 to 150° C. After 4 days of reaction, the Pyrex tubes were removed from the oven. The black Hex-Aza COFs powders were isolated by filtration, washed with solvents acetone and water, and dried under vacuum. All other starting materials, solvents were purchased from a commercial source and used without further purification.

Example 4

Tetraphthalimido-benzoquinone

Schlenk flask was charged with 2,3,5,6-tetrachlorocyclo-hexa-2,5-diene-1,4-dione (10 g, 1 Eq, 40.7 mmol) and potassium 1,3-dioxoisoindolin-2-ide (30 g, 4.00 Eq, 162.7 mmol) and argonated. Anhydrous acetonitrile (100 mL) was added and reaction mixture was placed in preheated to 80° C. oil bath and stirred for 12 h. After cooling to room temperature, the product was filtered, washed with N,N-Dimethylformamide and deionized water at 100° C. for several times. Obtained material was suspended in 100 mL of ethanol, heated to the boiling temperature, and filtered while hot. Obtained material was dried in a vacuum oven at 105° C. for 12 h. Tetraphthalimido-benzoquinone was obtained as yellow solid (23 g, 33 mmol, 82%). $^1$H NMR (500 MHz, CDCl$_3$) δ 8.06 (dd, J=6.7, 3.3 Hz, 8H), 7.69 (dd, J=6.8, 3.2 Hz, 8H) ppm. $^{13}$C NMR (126 MHz, CDCl$_3$) δ 169.8, 131.69, 127.2, 126.1, 125.3 ppm.

Example 5

Tetraamino-benzoquinone

A round bottom flask was charged with tetraphthalimido-benzoquinone (19.00 g, 27.59 mmol) and hydrazine (88 g, 86 mL, 50% Wt, 50 Eq, 1.380 mol). Reaction mixture was kept at 65° C. for 2 h, purple precipitation appear. Reaction was cooled to room temperature and filtrated on suction to collect precipitation. Material was washed with water. Tetramino-benzoquinone (2.00 g, 11.9 mmol, 43%) was obtained as purple solid. $^1$H NMR (500 MHz, DMSO-d$^6$) δ 4.54 (s, 4H) ppm. $^{13}$C NMR (126 MHz, DMSO-d$^6$) δ 178.9, 121.4 ppm.

Example 6

PXRD, FTIR, and $^{13}$C Solid-State NMR of Hex-Aza COFs

As described above, the synthesis of Hex-Aza COFs was performed by solvothermal condensation reactions. (FIGS. 8A-8I, FIG. 9). The synthesized Hex-Aza COFs powders were further characterized by powder X-ray diffraction (PXRD), Fourier-transform infrared (FTIR), and $^{13}$C solid-state nuclear magnetic resonance ($^{13}$C solid-state NMR).

Powder X-Ray Diffraction (XRD) patterns were performed on a D8 Advance X-ray diffractometer (Bruker, Germany) with a Cu Kα radiation (λ=1.5406 Å). In-situ XRD were carried out on a D8 Twin X-ray diffractometer (Bruker, Germany). Scanning electron microscopy (SEM) images and energy-dispersive X-ray spectroscopy (EDS) images were collected on a scanning electron microscope (Merlin, ZEISS, Germany). Transmission electron microscopy (TEM) images and EDS mapping images were taken on a Titan 80-300 CT transmission electron microscope (FEI, Thermo Fisher Scientific, USA). $^1$H NMR and $^{13}$C NMR spectra were recorded on a Bruker Advance III 400 and 500 MHz instruments. Chemical shifts for $^1$H NMR spectra are reported in ppm (δ, relative to TMS) using DMSO residual peak (δ=2.50 ppm) in DMSO-d$_6$ as an internal standard and for $^1$C NMR spectra solvent peaks at 39.52 ppm, and for solutions in CDCl$_3$ solvent peaks at 7.26 and 77.16 ppm, respectively. High resolution dynamic thermogravimetric analysis (TGA) were performed under a continuous N$_2$ flow and recorded on a TA Instruments hi-res TGA Q500 thermogravimetric analyzer with a heating rate of 5° C. per minute. Fourier-transform Infrared (FT-IR) spectra (4000-600 cm$^{-1}$) were recorded on a Thermo Scientific Nicolet 6700 apparatus. Low pressure N$_2$ adsorption studies of the Hex-Aza COFs were conducted on a fully automated micropore gas analyzer Autosorb-IC (Quantachrome Instruments) at relative pressures up to 1 atm. Hex-Aza COFs sample activation was performed at 65° C. for 10 h.

Figure 8C:
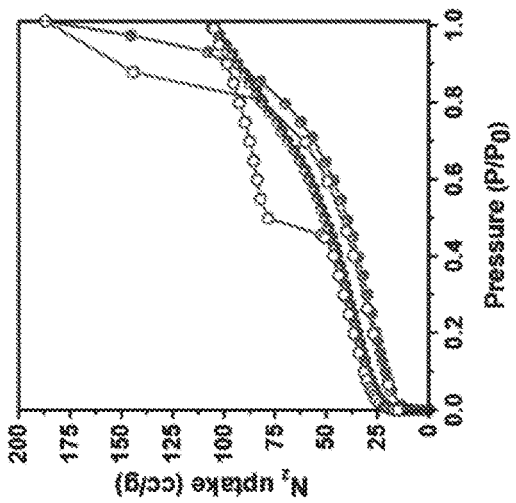
Figure 8B:
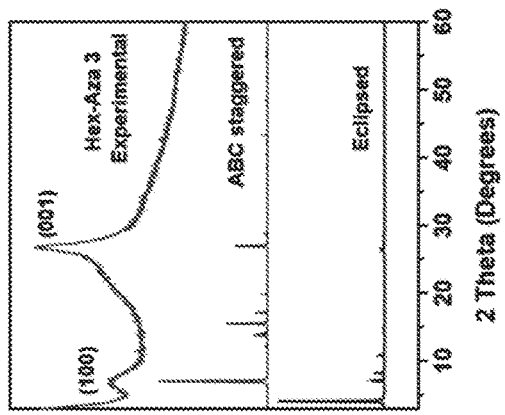
Figure 8E:
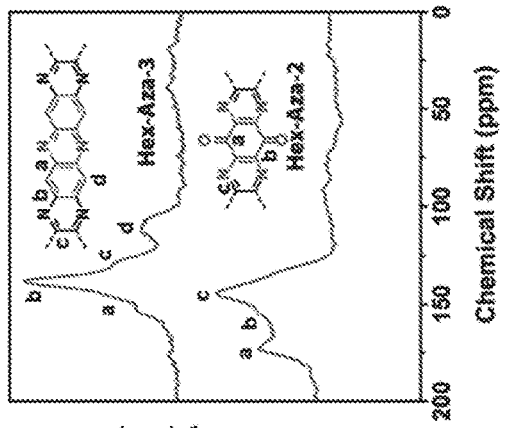
Figure 8D:
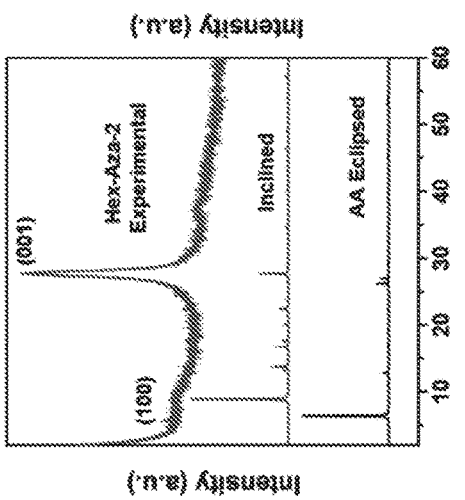
Figure 8A:
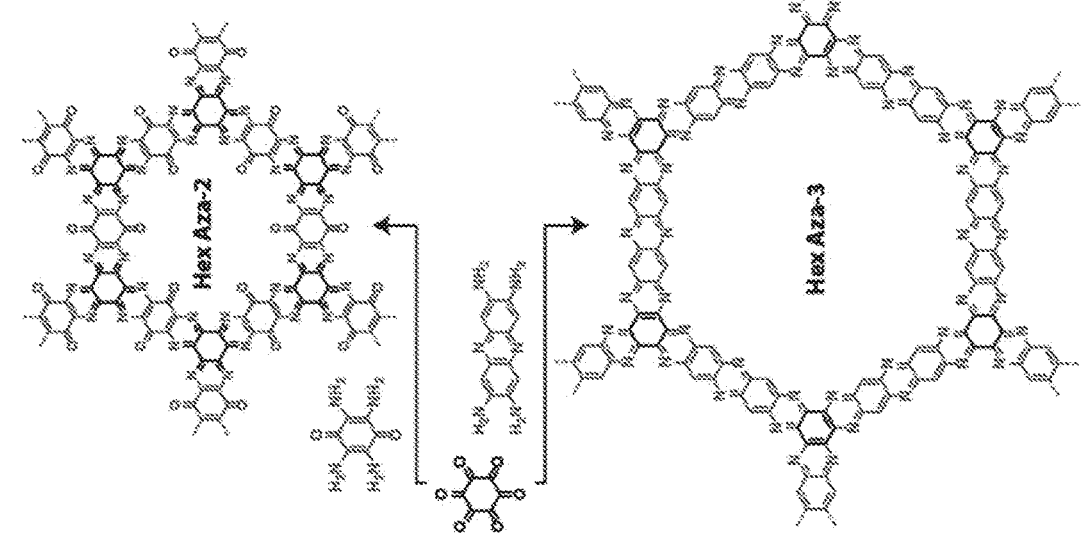
Figure 9:
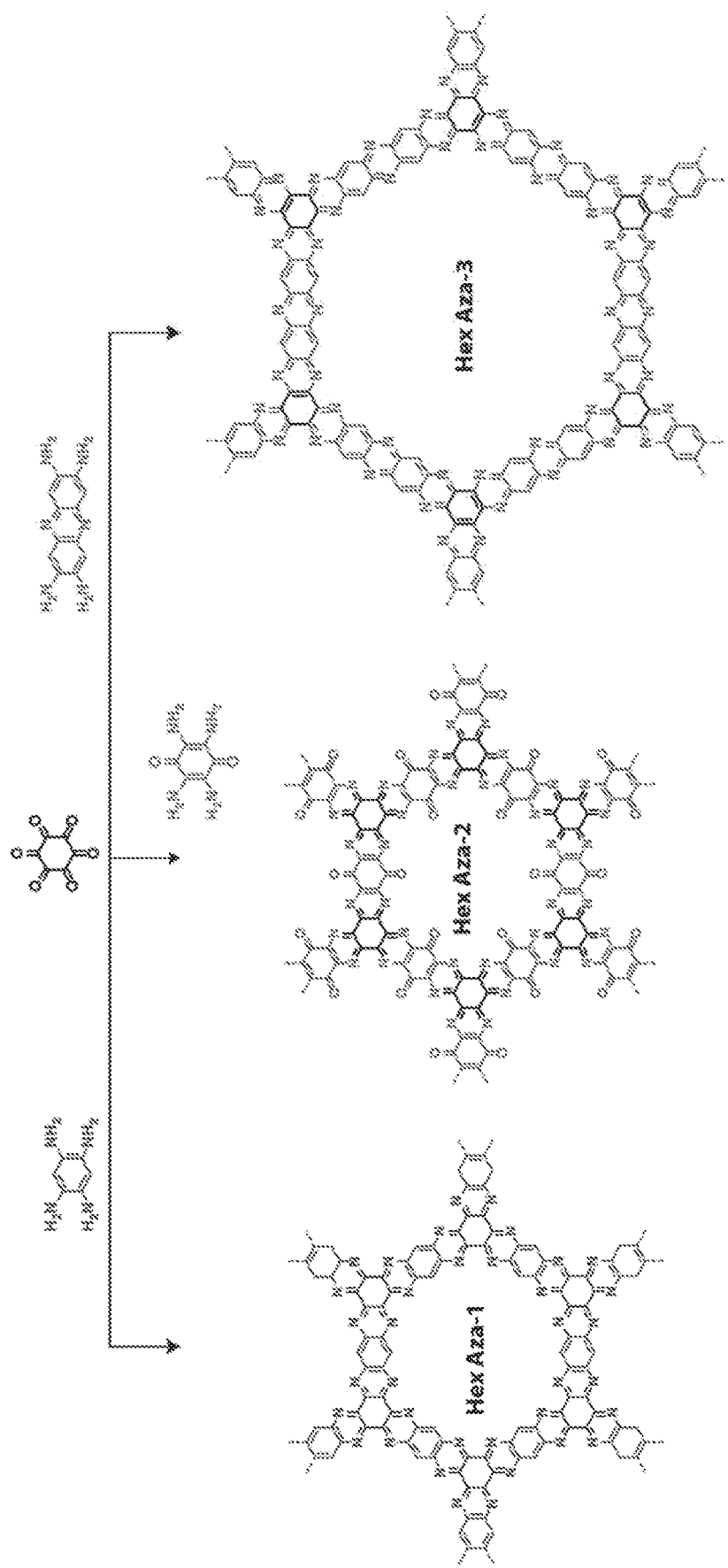
FIG. 9 is a schematic diagram of the synthesis of Hex-Aza COF series, according to one or more embodiments of the present disclosure.
Figures 10A, 10B, 10C:
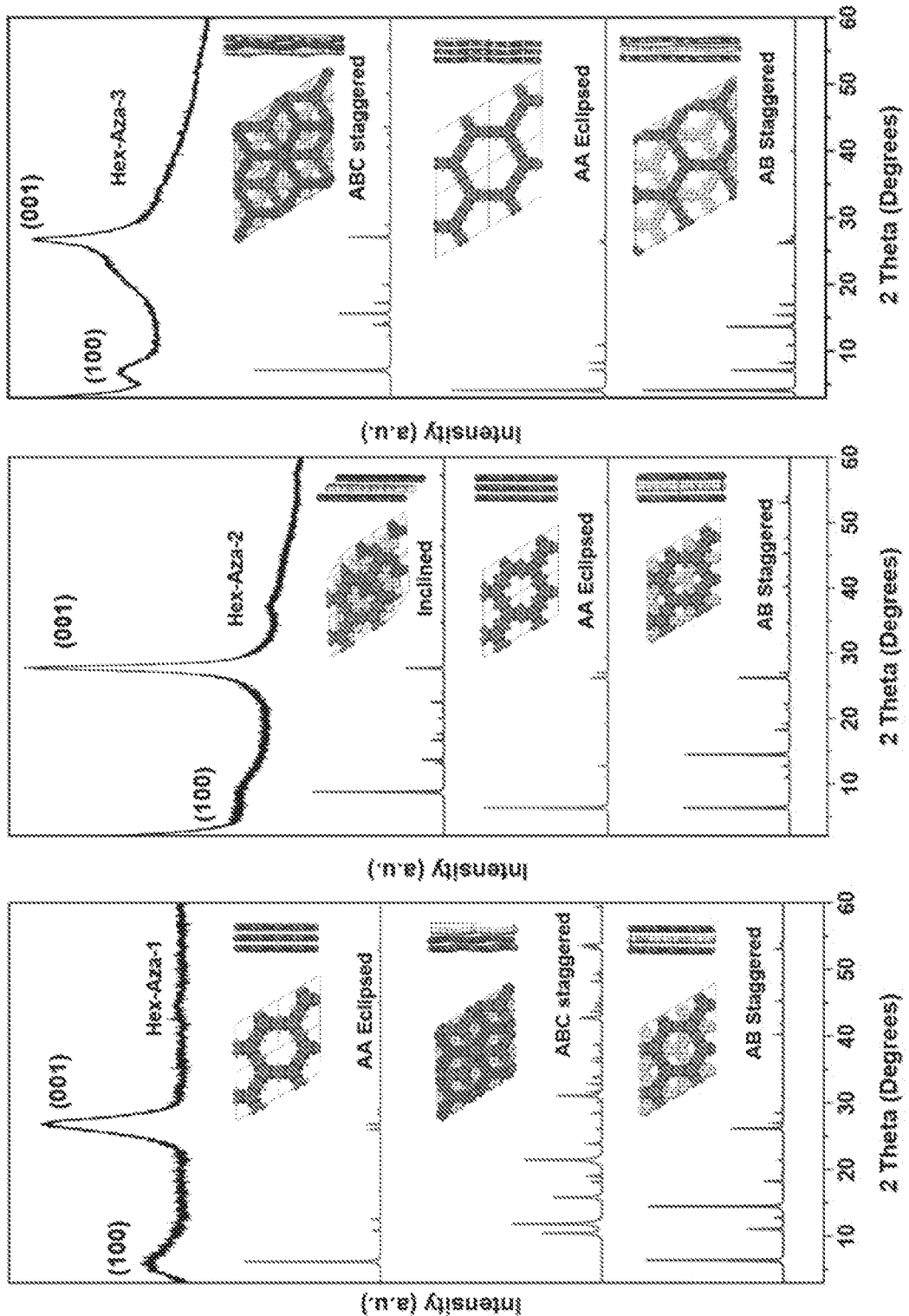
FIGS. 10A-10C are experimental PXRD patterns of Hex-Aza-2 compared with different probable stacking models, according to one or more embodiments of the present disclosure.
Figure 11:
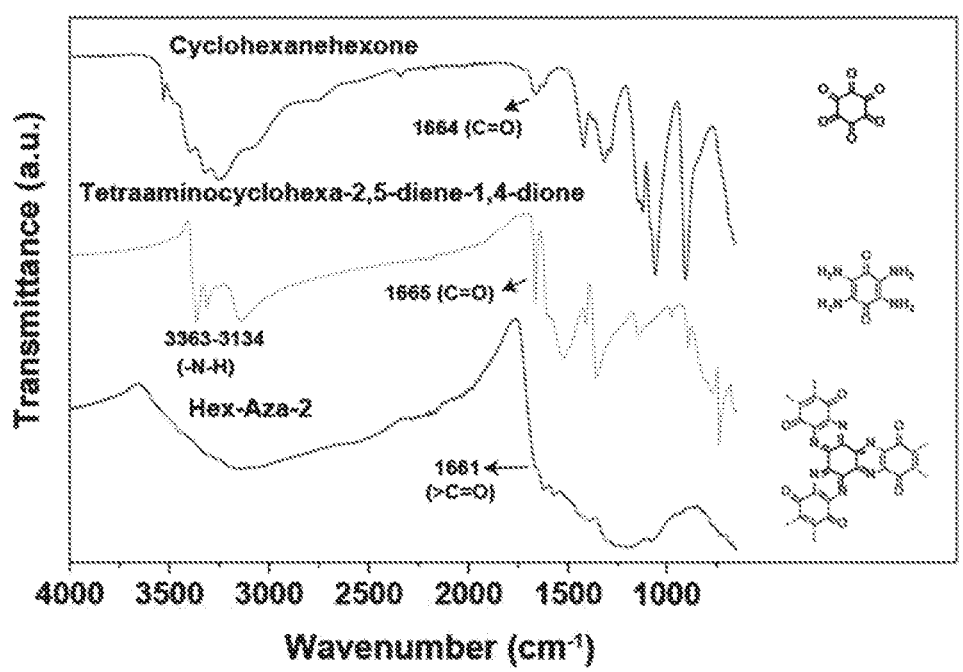
FIG. 11 is FT-IR of Hex-Aza-2 compared with corresponding starting materials, according to one or more embodiments of the present disclosure.

The synthesized Hex-Aza COFs, in general, have shown moderate crystallinity as revealed form the PXRD (FIGS. 8B-8C). The interlayer charge repulsion between the polarized imine nitrogen atoms on adjacent layers prevented long range ordered π-π stacking, which may explain the low crystallinity. The PXRD pattern of Hex-Aza-1 shows mainly two peaks appearing at 2θ=6.5° and 26.7°, which arose from the 100 and 001 planes (FIG. 10A). The interlayer π-π stacking distance between the COF layers was calculated to be 3.4 Å, from the d spacing of the 001 planes. The measured peak positions in Hex-Aza-1 were identical to the calculated peak positions, which proved the formation of the same structure. Also, the experimental PXRD pattern had a better match with the simulated AA eclipsed stacking model (FIGS. 10A-10C). The AA eclipsed structure was modeled in hexagonal space group P6/m with unit cell values a=b=16 Å, c=3.4 Å, α=90°, β=90°, γ=120° (FIG. 10A and Table 1). The PXRD of benzoquinone functionalized Hex-Aza-2 also showed two broad peaks appearing at 2θ=8.5° and 27.7°, which arose from 100 and 001 planes (FIGS. 8B, 10B). The π-π distance between the adjacent Hex-Aza-2 layers was calculated as 3.2 Å (FIG. 11). However, the experimental PXRD pattern did not match the eclipsed stacking model (FIG. 10B). After comparing several stacking models, it was concluded that the first peak of the Hex-Aza-2 in the PXRD pattern had a better match with the inclined stacking model (FIG. 10B). Since Hex-Aza-2 contained a large number of polar heteroatoms, such as nitrogen and oxygen, the charge repulsion between the individual COF layers may have prevented the formation of direct AA eclipsed structure. The unit cell values of the inclined structure was calculated as a=b=16 Å, c=6.9 Å, α=40°, β=140°, γ=1200 (Table S2). The PXRD pattern of the Hex-Aza-3 also did not match with the AA eclipsed stacked structure (FIG. 8C and FIG. 10C). Hex-Aza-3 was initially designed to realize an open mesoporous structure to enhance charge diffusion. However, the charge repulsion of the nitrogen atoms prevented Hex-Aza-3 from forming the direct AA eclipsed layered structure. The experimental PXRD pattern of Hex-Aza-3 showed two broad peaks, which appear at 2θ=7° and 26.8°. The interlayer stacking distance was calculated to be 3.3 Å from the (001) d spacing. By comparing the several stacking models, the experimental PXRD patterns of Hex-Aza-3 were found to match with the ABC staggered structure (FIG. 8C and FIG. 10C). The ABC staggered structure was modeled in trigonal space group R3 with unit cell values a=b=24.9 Å, c=6.6 Å, α=90°, β=90°, γ=120° (FIG. 10C, Table 3).

Figure 12:
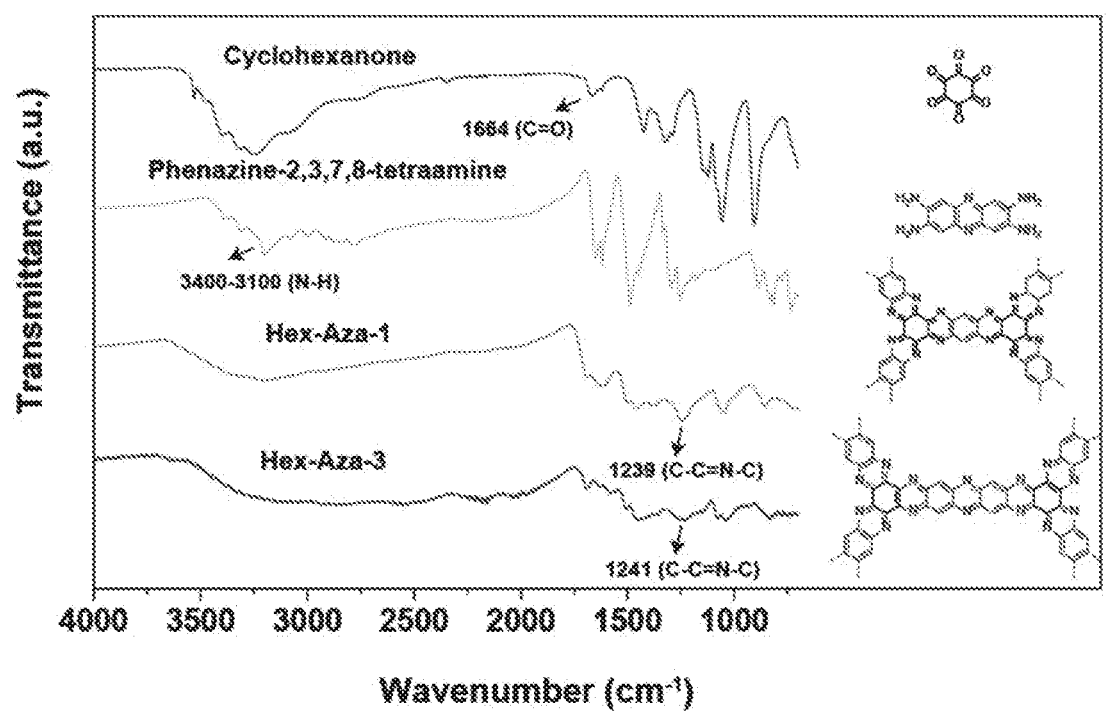
FIG. 12 are FT-IR of Hex-Aza-1 and Hex-Aza-3 compared with the starting materials, according to one or more embodiments of the present disclosure.
Figure 13A:
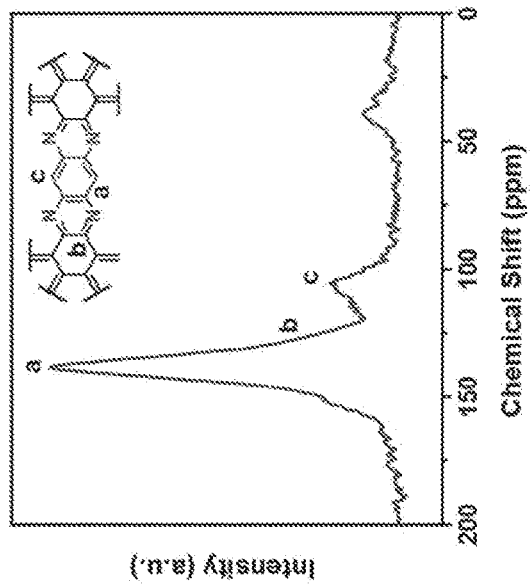
FIGS. 13A-13C are $^{13}$C solid-state NMR (CP-MAS) of (A) Hex-Aza-1, (B) Hex-Aza-2, (C) Hex-Aza-3, according to one or more embodiments of the present disclosure.
Figure 13B:
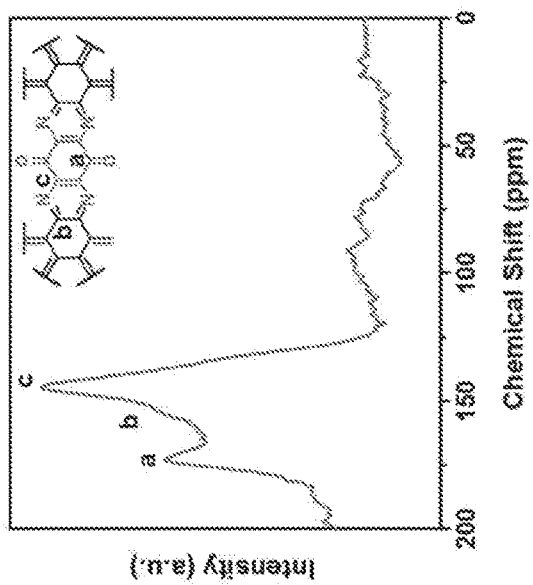
Figure 13C:
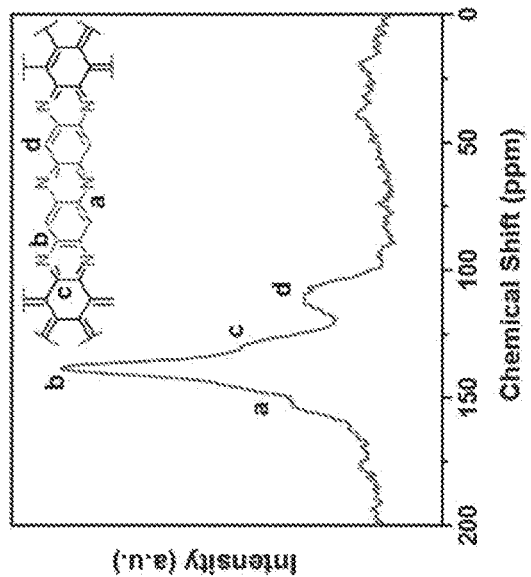

The chemical cross-linking and the formation of an extended framework structure in Hex-Aza COFs were confirmed by FT-IR spectroscopy and $^{13}C$ solid-state NMR studies. The FT-IR spectroscopy of Hex-Aza-1 and Hex-Aza-3 indicated the formation of new phenazine linkages (C—C=N—C) in the network (1239 and 1241 cm$^{-1}$), FIGS. 11-12. In Hex-Aza-2, the peak corresponding to the additional carbonyl functionalities (—C=O) appeared at 1665 cm$^{-1}$ ((FIG. 11)). Further confirmation of the functional linkages in the Aza-CMPs was performed from the $^{13}C$ solid state NMR (FIG. 8D and FIGS. 13A-13C). $^{13}C$ solid-state cross Polarization Magic-Angle Spinning ($^{13}C$ CP-MAS) of Hex-Aza-1 showed mainly three peaks and Hex-Aza-3 displayed four peaks, which was in accordance with the predicted structure (FIG. 8D and FIGS. 13A-13C). The presence of additional carbonyl functionalities (—C=O) in Hex-Aza-2 was confirmed from the signal at a chemical shift ($^δ$) 172 ppm (FIG. 8D and FIGS. 13A-13C).

Example 7

Thermo-Gravimetric Analysis (TGA) of Hex-Aza COFs

Figure 14C:
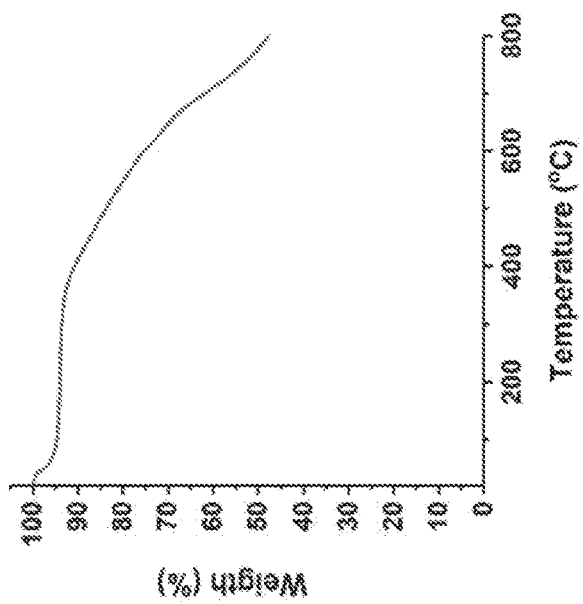
FIGS. 14A-14C are thermogravimetric analysis (TGA) of (A) Hex-Aza-1, (B) Hex-Aza-2, (C) Hex-Aza-3 under nitrogen atmosphere, according to one or more embodiments of the present disclosure.
Figure 14B:
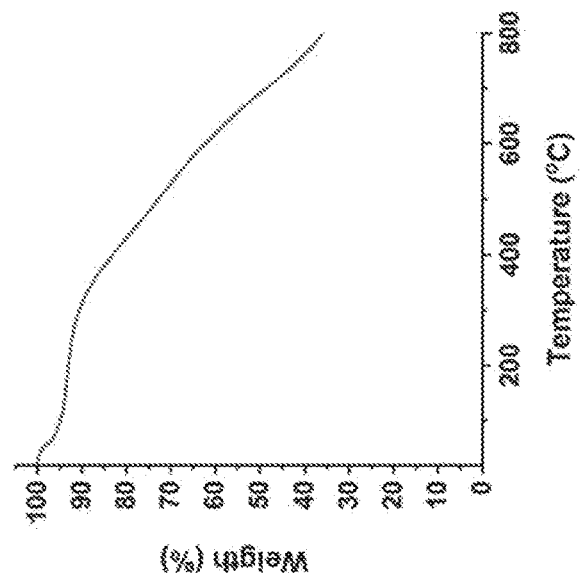
Figure 14A:
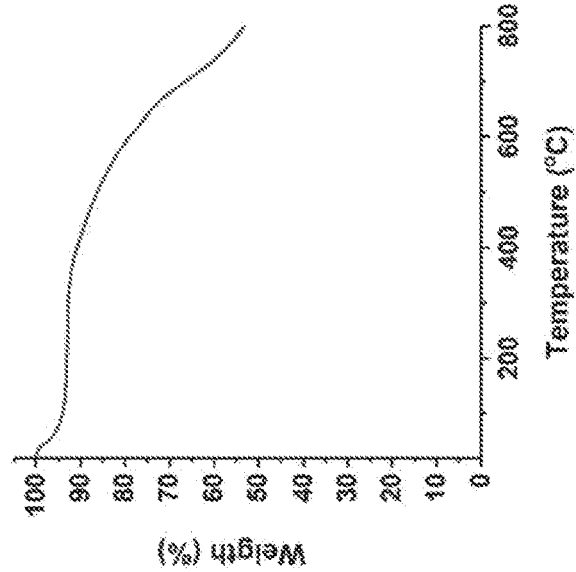
Figures 15A, 15B, 15C:
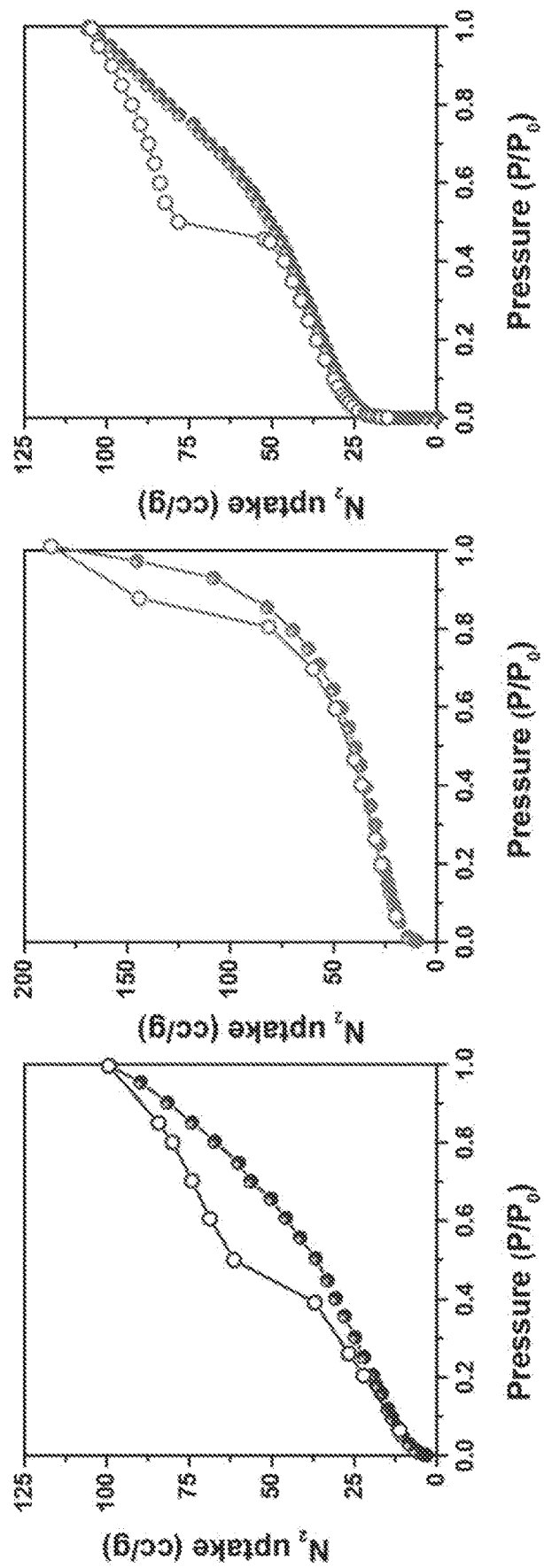
FIGS. 15A-15C are $N_2$ adsorption isotherm of (A) Hex-Aza-1, (B) Hex-Aza-2, (C) Hex-Aza-3 at 77 K, according to one or more embodiments of the present disclosure.
Figure 16A:
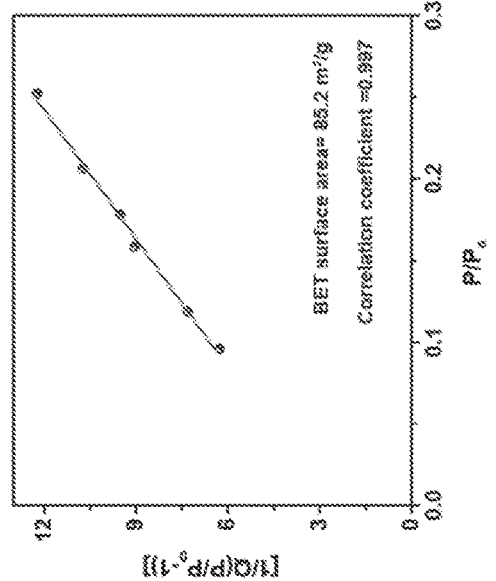
FIGS. 16A-16C are BET surface area calculations of (A) Hex-Aza-1, (B) Hex-Aza-2, (C) Hex-Aza-3 at 77 K, according to one or more embodiments of the present disclosure.
Figure 16B:
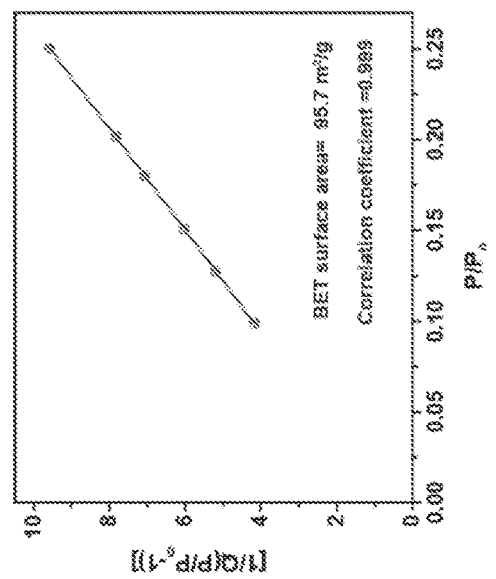
Figure 16C:
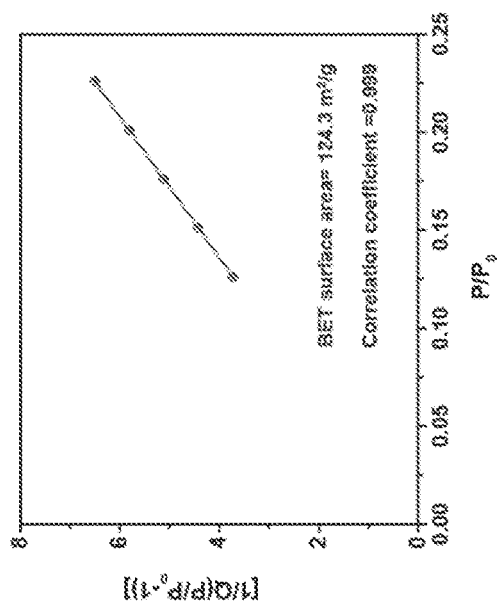

The thermal stability of the Aza-CMPs was investigated by thermo-gravimetric analysis (TGA). The TGA of Hex-Aza-1 and Hex-Aza-3 did not show any significant weight loss until 400° C. under nitrogen (FIGS. 14A-14C), which indicated their high thermal stability. On the other hand, Hex-Aza-2 displayed moderate thermal stability and started decomposing after 250° C. (FIGS. 14A-14C). The porosity of Hex-Aza COFs was analyzed by $N_2$ sorption isotherms measured at 77 K, which revealed that Hex-Aza COFs exhibited typical type II reversible sorption profiles (FIGS. 15A-15C). The calculated BET surface area of Hex-Aza-1, Hex-Aza-2 and Hex-Aza-3 was 69 m$^2$g$^{-1}$, 96 m$^2$g$^{-1}$ and 124 m$^2$g$^{-1}$, respectively (FIGS. 16A-16C). However, the experimental surface area of Hex-Aza COFs was lower than the theoretically predicted values. This was believed to be due to the interlayer repulsion between the polarized imine nitrogen atoms preventing ordered stacking of the COF layers. As a result of the random slipped π-π stacking of layer, porosity was not fully accessed in Hex-Aza COFs (FIGS. 17A-17B). The morphology of the Hex-Aza COFs was investigated by scanning electron microscopy (SEM) (FIGS. 8A-8G). SEM images of the Hex-Aza-1 and Hex-Aza-2 showed aggregated layered morphology with particle sizes ranging from hundreds of nanometers to micrometers (FIG. 8F and FIGS. 18A-18C). SEM images of the Hex-Aza-3 displayed aggregated spherical morphologies (FIG. 8G). Transmission electron microscopy (TEM) images revealed the bulk morphology of Hex-Aza-1, -2, and -3 was formed by the self-assembly of nano-sheets (FIGS. 8H, 8I, 18C).

Example 8

Preparation of Hex-Aza COF Electrodes

Hex-Aza COFs were fabricated by drop casting method. About 7 mg of COF powders were sonicated with 2 mg of conductive carbons and 1 mg of PVDF polymer binder in 400 μL of DMF for 1 hour. The suspension was then drop casted on a heated carbon fabric electrode at 150° C. The electrode was then left for drying overnight.

Example 9

Preparation of $RuO_2$ electrode $RuO_2$ electrodes were fabricated by an in situ growth fabrication method. About 120 mg of $RuCh_{3-x}H_2O$ was mixed with 5 mL of deionized water in a 23 mL Teflon autoclave. A piece of carbon fabric (CF) electrode (1×4 cm) was immersed into this solution. The Teflon container was closed afterword and heated to 180° C. for 20 hours. After the completion of the reaction, the CF electrode coated with $RuO_2$ was washed with deionized water several times and dried at 150° C.

Example 10

Preparation of Gel Electrolyte

The solid gel electrolyte was prepared by mixing 2 g of polyvinyl alcohol (PVA) polymer in 10 mL 1.0 M $H_2SO_4$ inside a screw-capped bottle. The mixture was heated at 85° C., under vigorous stirring until the solution mixture became clear. The viscous gel electrolyte was then slowly applied to the electrodes.

Example 11

Fabrication of Asymmetric Devices

Figure 19:
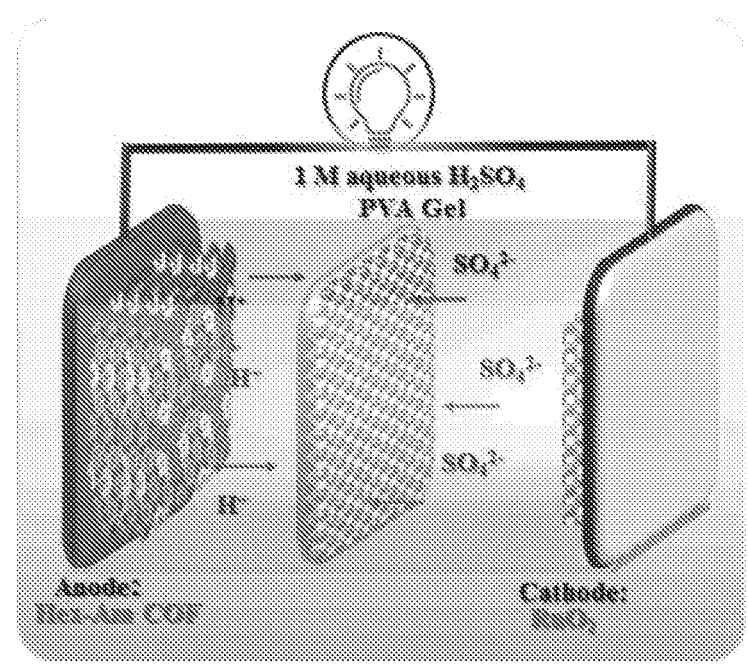
FIG. 19 is a schematic diagram of a device including Hex-Aza COF as an anode and $RuO_2$ as a cathode, according to one or more embodiments of the invention.

Hex-Aza-3/CF and $RuO_2$/CF were used as negative and positive electrodes, respectively. The PVA-$H_2SO_4$ prepared by the above method was applied to the individual electrodes on glass plate and was left over night to achieve a good adherence. After that, both electrodes were sandwiched together. FIG. 19.

Example 12

Electrochemical Performance of Hex-Aza COFs

Figure 22:
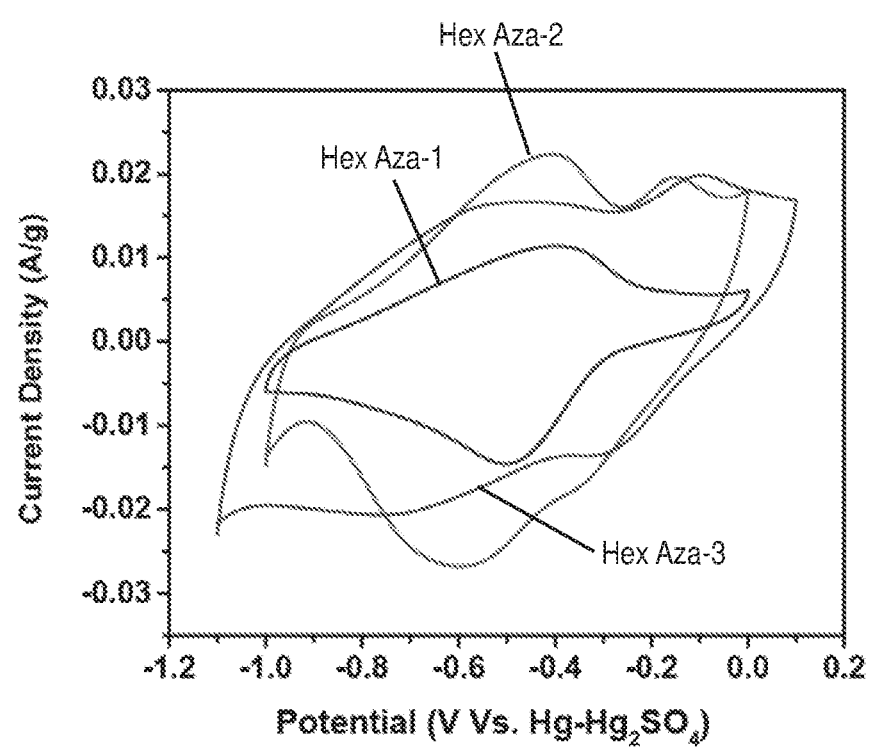
FIG. 22 is a graphical view of a comparison of CV curves of Hex-Aza-1, -2 and -3 in 1.0 M $H_2SO_4$ at a scan rate of 50 mVs$^{-1}$, according to one or more embodiments of the present disclosure.
Figure 23:
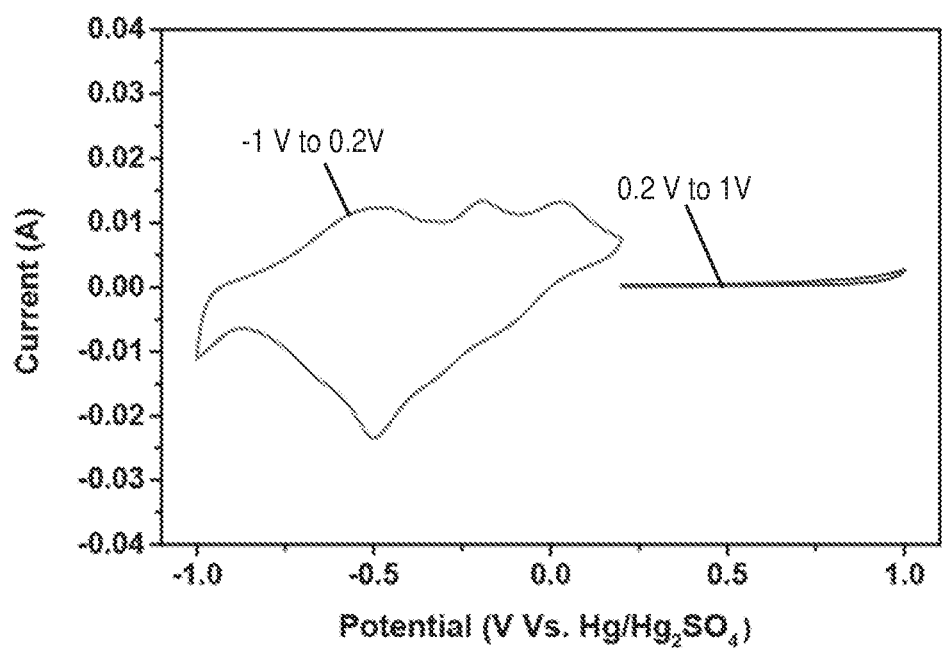
FIG. 23 is a graphical view of CV curves of Hex-Aza-2 in 1.0 M $H_2SO_4$ using three electrode configuration at a scan rate of 20 mV/s, which shows that the majority of the capacitive contribution is the negative potential range, according to one or more embodiments of the present disclosure.
Figure 24:
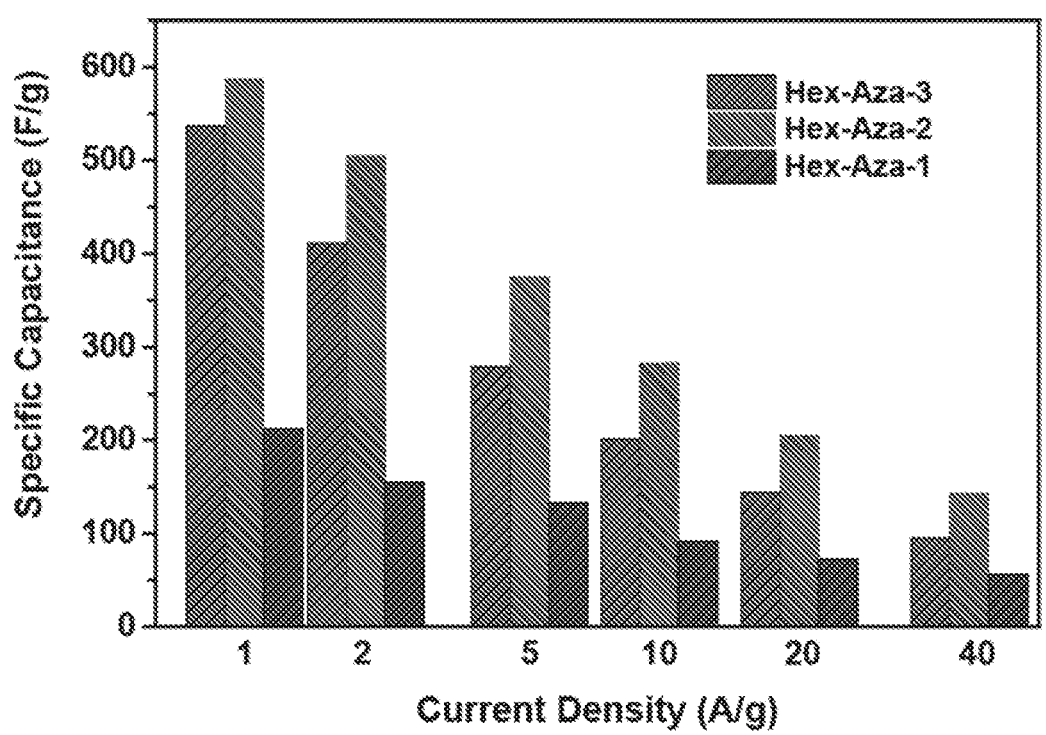
FIG. 24 is a graphical view of a comparison of specific capacitance of Hex-Aza-1, -2 and -3 at different current densities, according to one or more embodiments of the present disclosure.
Figures 25A, 25B:
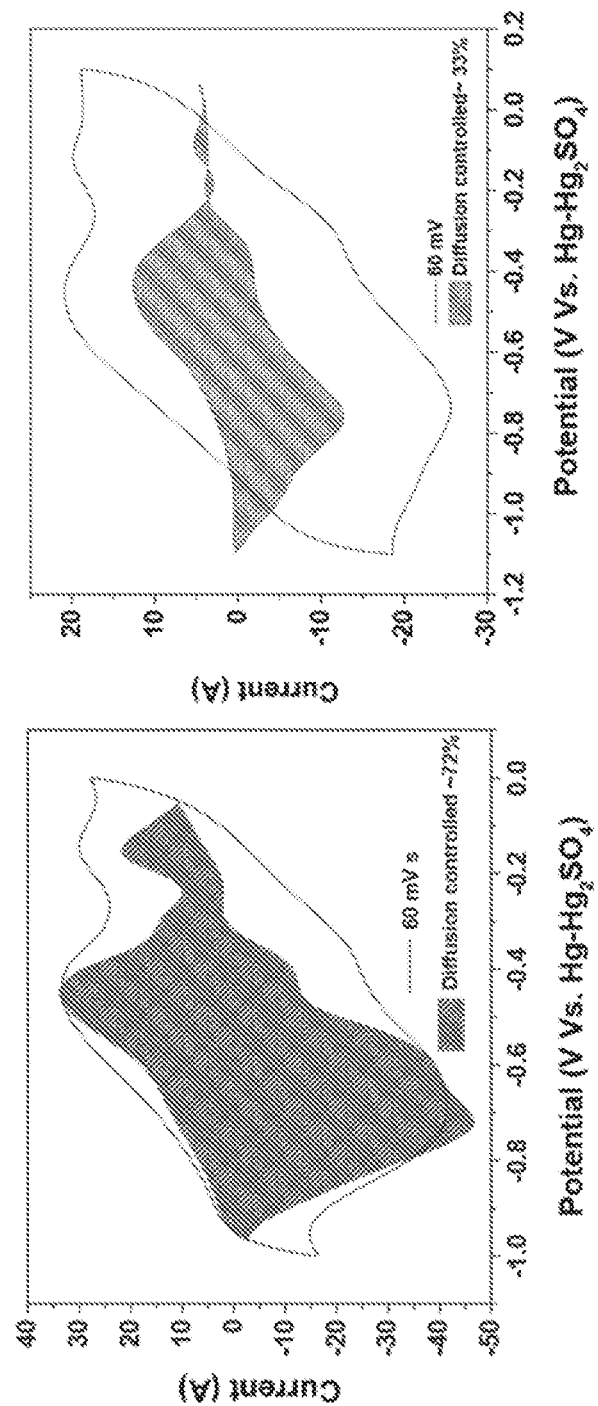
FIGS. 25A-25B are graphical views of a comparison of surface capacitive contribution and diffusion controlled ion insertion contributions of (A) Hex-Aza-2 and (B) Hex-Aza-3, according to one or more embodiments of the present disclosure.
Figure 32:
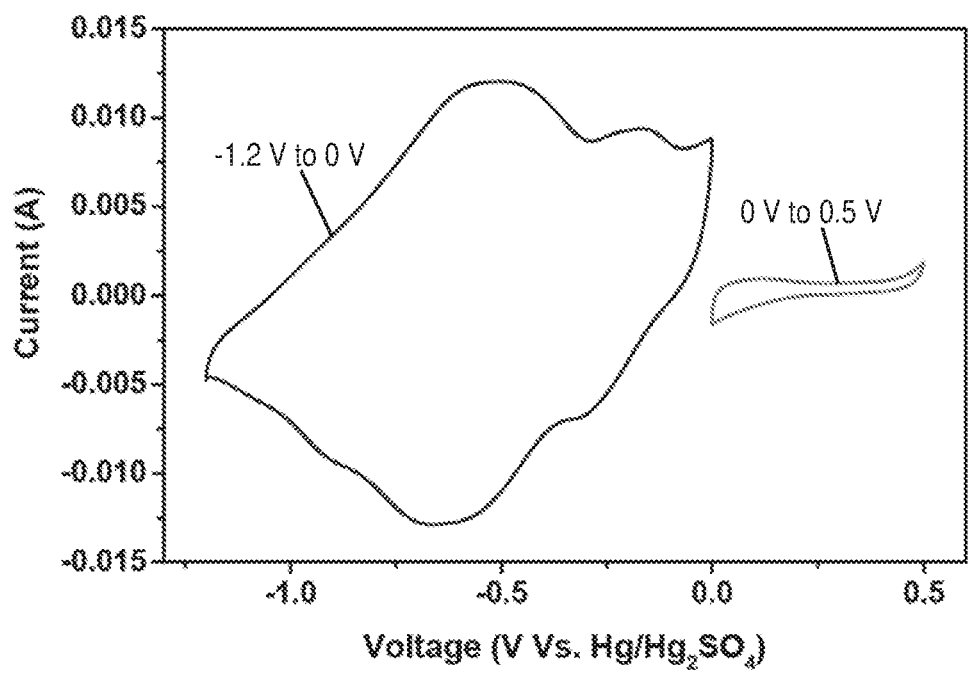
FIG. 32 is a graphical view of CV curves of Hex-Aza-3 in 1.0 M $H_2SO_4$ using three-electrode configuration at a scan rate of 50 mV/s, which shows the majority of the capacitive contribution is the negative potential, according to one or more embodiments of the present disclosure.

Electrochemical performance of Hex-Aza COFs was initially evaluated in three-electrode configuration, using 1.0 M $H_2SO_4$ as the electrolyte and Hg/$Hg_2SO_4$ and graphite rod as the reference and counter electrodes (FIGS. 20A-20F and FIGS. 21-22), respectively. The steady-state cyclic voltammogram (CV) curve at 50 mVs$^{-1}$ showed that the capacitance contribution in Hex-Aza COFs mainly occurred in the negative region, ranging from −1.1 V to 0.0 V (FIG. 22). In contrast, a negligible capacitance contribution was observed on the positive potential window (0.0 V to 1.0 V) for all three Hex-Aza COFs (FIGS. 22-23, 32). The CV of Hex-Aza-1 at 50 mVs$^{-1}$ showed mainly one redox couple, which may be due to the reversible protonation reaction on the sp$^2$ nitrogens (FIG. 22). The Hex-Aza-2 and Hex Aza-3 showed two major broad redox couples (FIG. 24) in negative potential range. The additional redox peaks of Hex-Aza-2 and Hex-Aza-3 may be due to the reversible protonation reaction of quinone and phenazine redox moieties (Equation 1, FIG. 22). The redox peaks present in the Hex-Aza COFs clearly indicated the pseudo-capacitive characteristics of the materials. Similar to other reported 2D materials, the charge storage in Hex-Aza COFs was achieved by either the diffusion-controlled ion insertion process or the surface capacitive effect (FIGS. 25A-25B).

To determine the percentage of these individual capacitive components in Hex Aza COFs, a scan rate dependent CV analysis was performed. From the current response (i(V)) of Hex-Aza COFs at different scan rates (v) at a fixed potential (V), the capacitive contribution was determined separately according to the following equation.

$$i(V) = k_1 v + k_2 v^{1/2} \qquad \text{Eq. (1)}$$

where $k_1$ and $k_2$ are constants, i(V) is the total current, and v is the scan rate. Here, $k_1 v$ and $k_2 v^{1/2}$ corresponded to the contributions arising from the surface capacitive effect and diffusion-controlled ion insertion process. The equation can be re-arranged as follows for calculation purposes, $$i(V)/v^{1/2} = k_1 v^{1/2} + k_2 \qquad \text{Eq. (2)}$$

By plotting $i(V)/v^{1/2}$ against $v^{1/2}$ as y and x axis, a straight line was obtained. The $k_1$ and $k_2$ values are calculated from the slope and intercept of the curve. It was found that for the Hex-Aza-2 COF, the majority of the capacitance contribution was pseudo capacitive (72%) (FIG. 25A), which arose from diffusion-controlled proton insertion process. For the Hex-Aza-3 COF, it was mainly dominated by surface capacitive contribution and the diffusion-controlled capacitance contribution was estimated to be 33% (FIG. 25B). The redox active benzoquinone and phenazine moieties may reversibly bind with the protons under acidic conditions. By taking account of the diffusion-controlled ion insertion contributions from the CV and the reversible proton accepting capabilities of the redox functionalities, the electrode reaction of Hex-Aza COFs can be expressed by the following reaction equations.

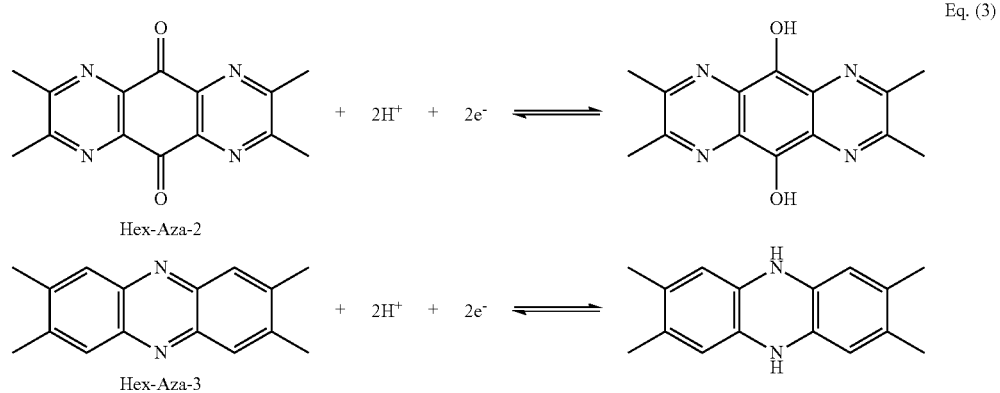

Eq. (3)

Figure 20A:
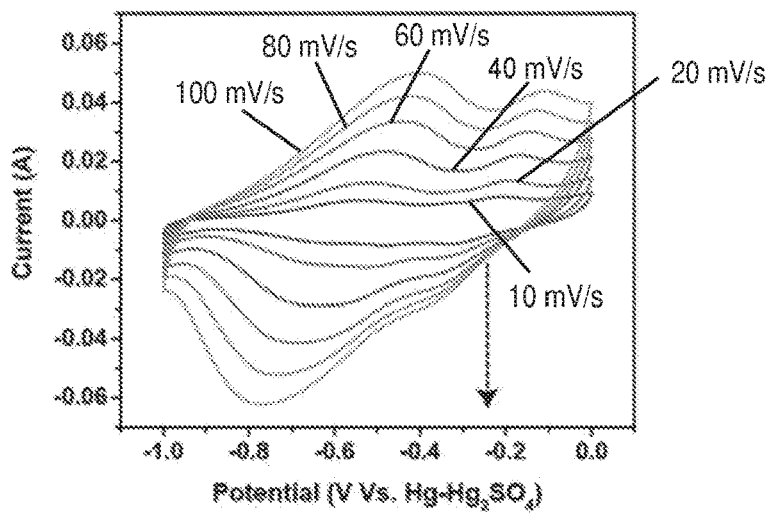
FIGS. 20A-20F relate to the electrochemical performance of Hex-Aza COFs in 1.0 M $H_2SO_4$ at three-electrode configuration and include the following graphical views: (A) CV curves of Hex-Aza-2 at different scan rates; (B) Galvanostatic charge-discharge profiles of Hex-Aza-2 at different current densities; (C) Comparison of gravimetric specific capacitances of Hex-Aza-2 and Hex-Aza-3 at different scan rates; (D) CV curves of Hex-Aza-3 at different scan rates; (E) GCD profiles of Hex-Aza-3 at different current densities; (F) Nyquist plots of Hex-Aza-2 and Hex-Aza-3, according to one or more embodiments of the present disclosure.
Figure 20B:
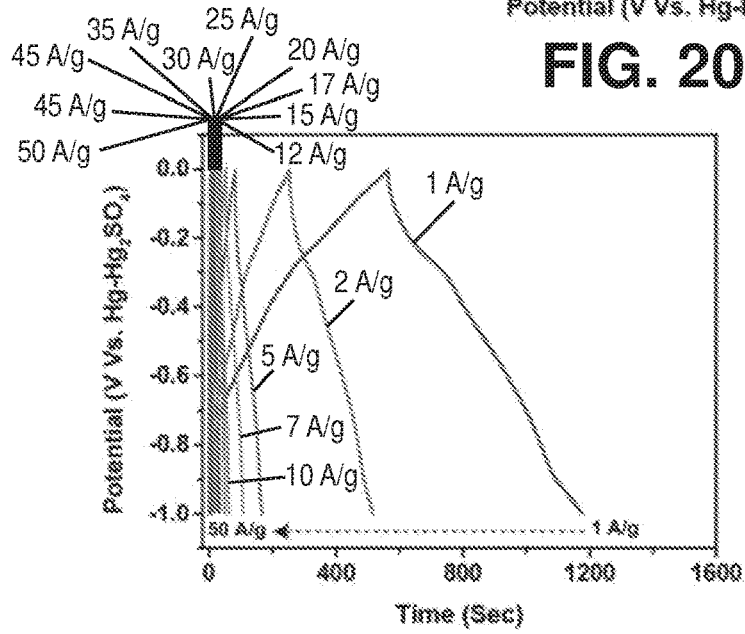
Figure 20C:
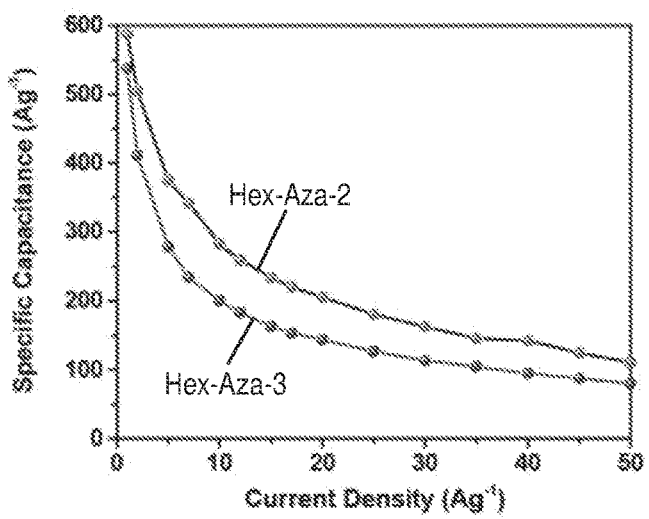
Figure 20D:
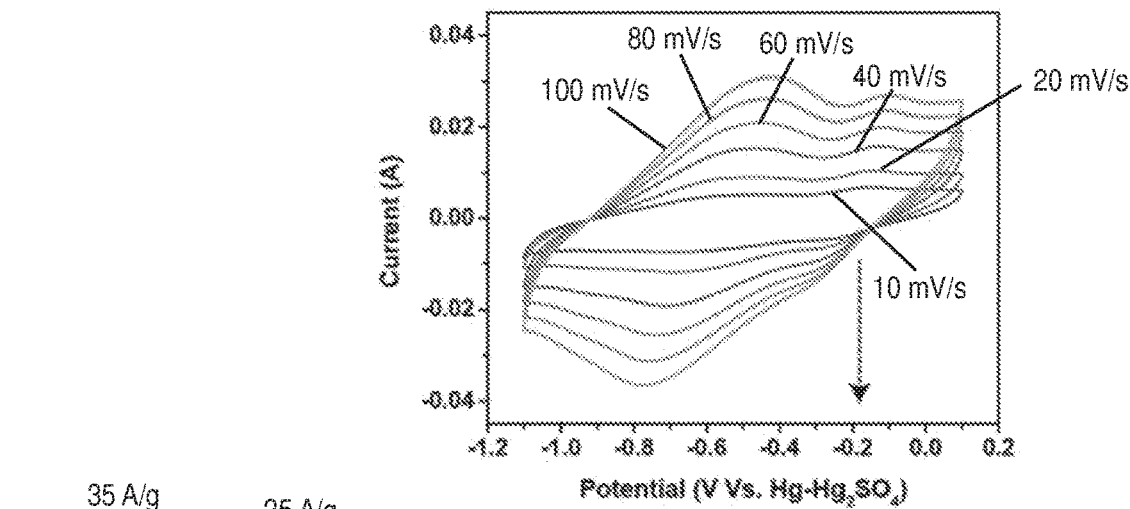
Figure 20E:
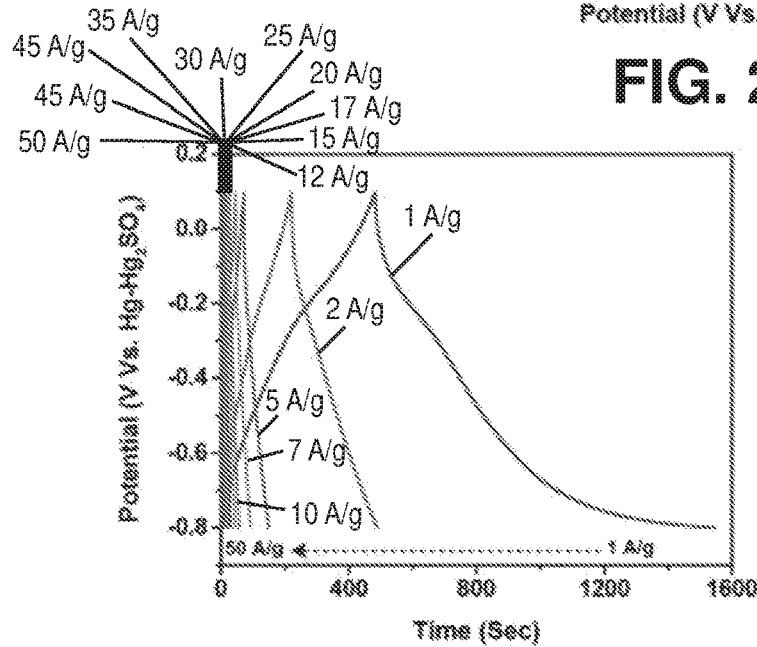
Figure 20F:
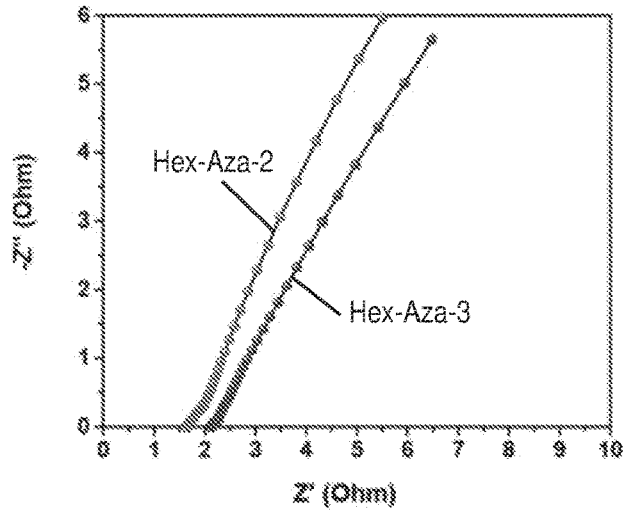
Figure 21A:
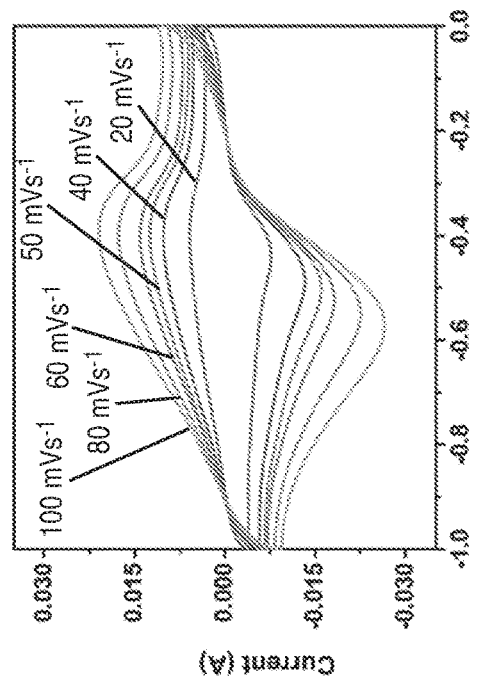
FIGS. 21A-21D relate to electrochemical performance of Hex-Aza-1 COF in 1.0 M $H_2SO_4$ in three-electrode configuration and include (A) CV curves of Hex-Aza-1 in 1.0 M $H_2SO_4$ at a scan rate of 50 mVs$^{-1}$; (B) CV curves of Hex-Aza-1 at different scan rates 1.0 M $H_2SO_4$; (C) GCD profiles of Hex-Aza-1 at different current densities in 1.0 M $H_2SO_4$; (D) Comparison of gravimetric specific capacitances of Hex-Aza-1 at different current densities in 1.0 M $H_2SO_4$, according to one or more embodiments of the present disclosure.
Figure 21B:
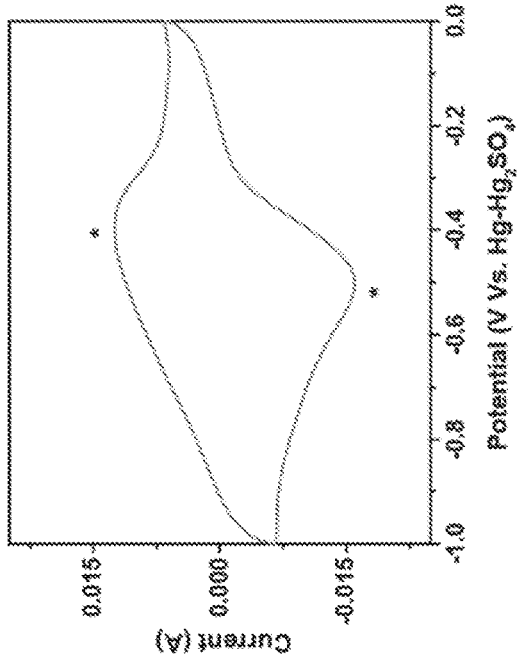
Figure 21C:
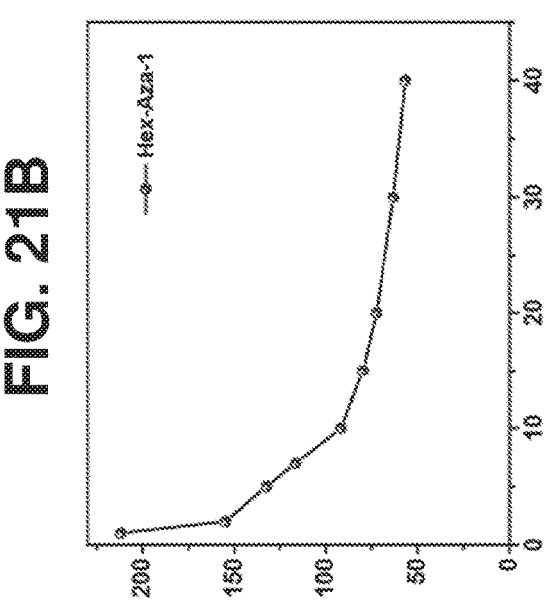
Figure 21D:
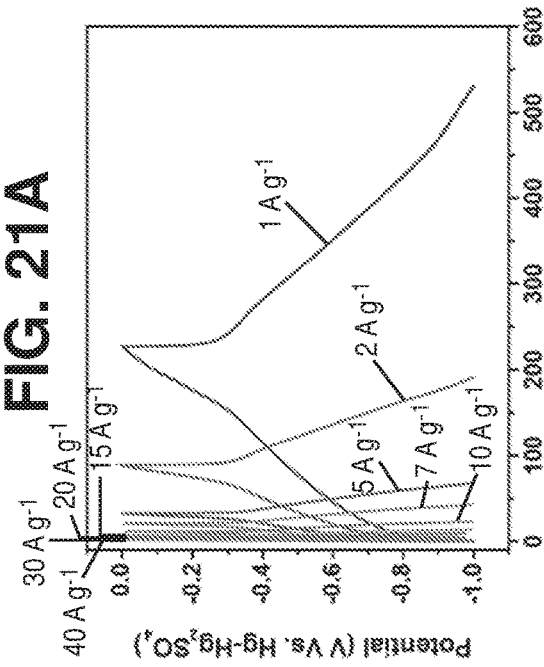
Figure 26:
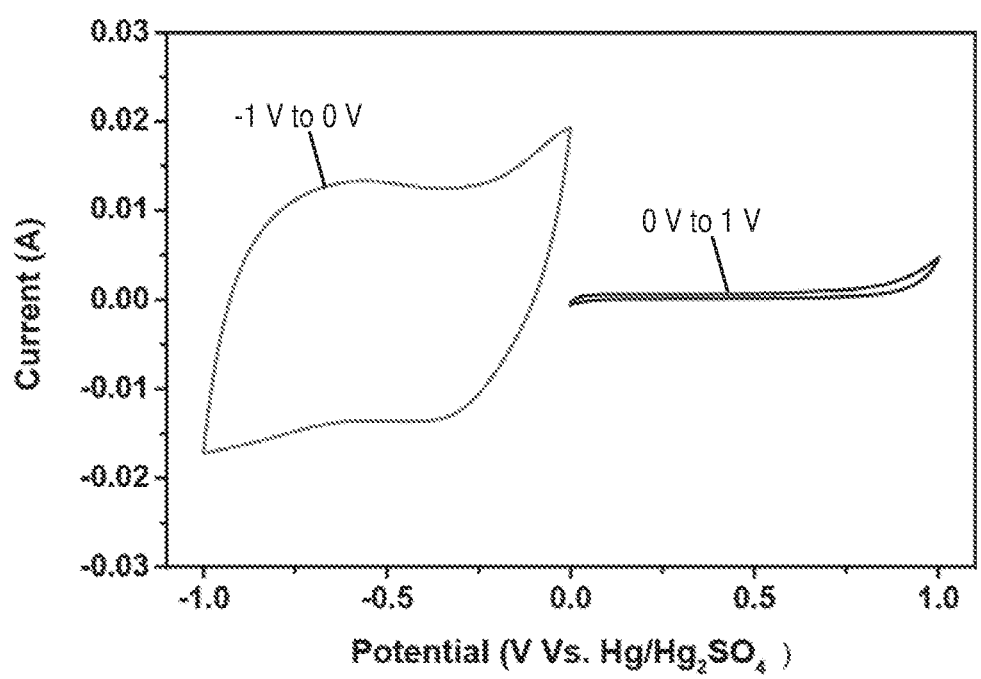
FIG. 26 is a graphical view of CV curves of Hex-Aza-2 in 1.0 M $Na_2SO_4$ using three-electrode configuration at a scan rate of 50 mV/s, which shows the majority of the capacitive contribution is in the negative potential, according to one or more embodiments of the present disclosure.
Figure 27A:
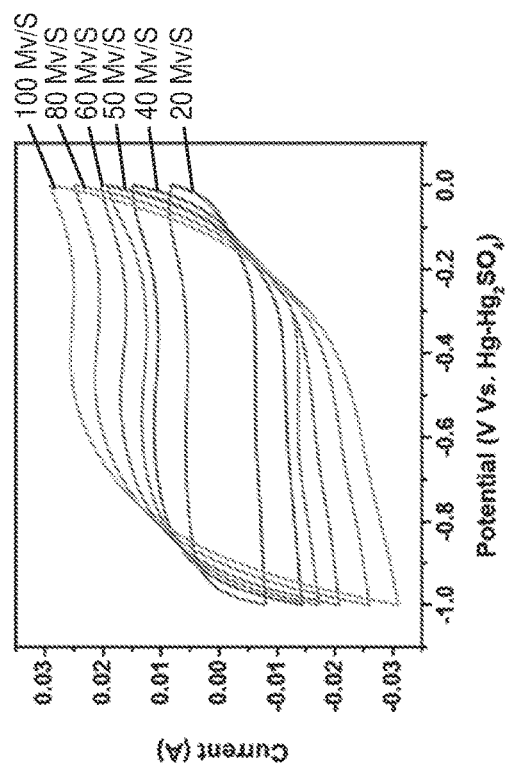
FIGS. 27A-27D relate to electrochemical performance of Hex-Aza-2 COF in 1.0 M $Na_2SO_4$ in three-electrode configuration and include (A) CV curves of Hex-Aza-2 in 1.0 M $Na_2SO_4$ at a scan rate of 50 mVs$^{-1}$; (B) CV curves of Hex-Aza-2 at different scan rates in 1.0 M $Na_2SO_4$; (C) GCD profiles of Hex-Aza-2 at different current densities in 1.0 M $Na_2SO_4$; (D) Comparison of gravimetric specific capacitances of Hex-Aza-2 and Hex-Aza-3 at different scan rates in 1.0 M $Na_2SO_4$, according to one or more embodiments of the present disclosure.
Figure 27B:
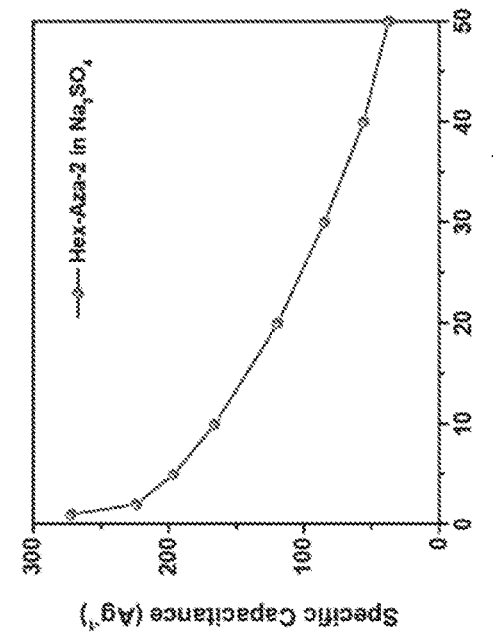
Figure 27C:
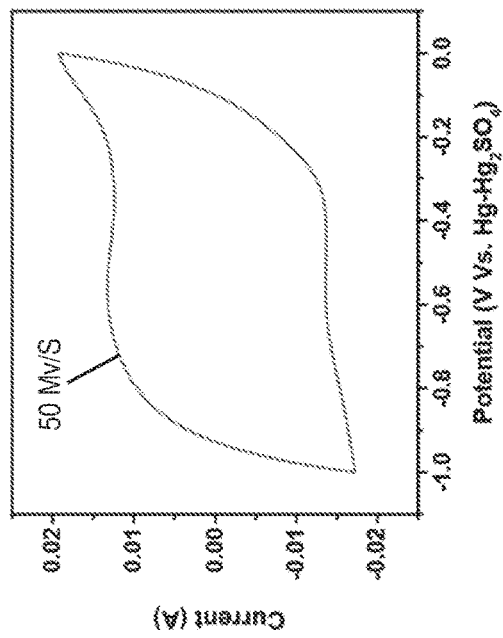
Figure 27D:
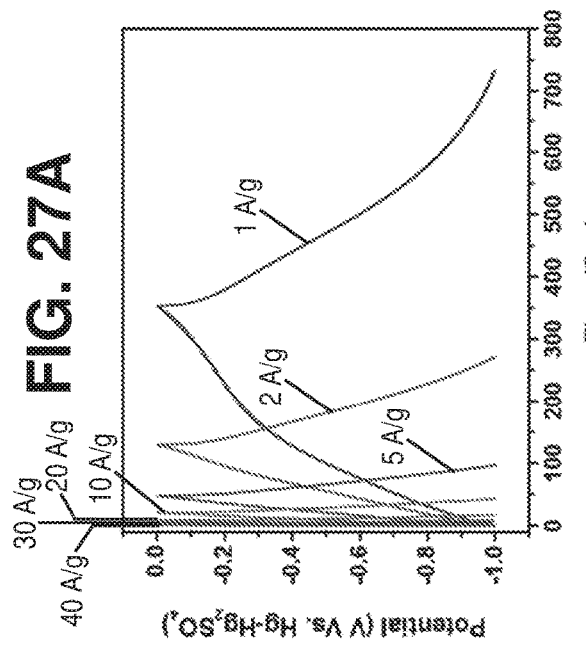
Figure 28B:
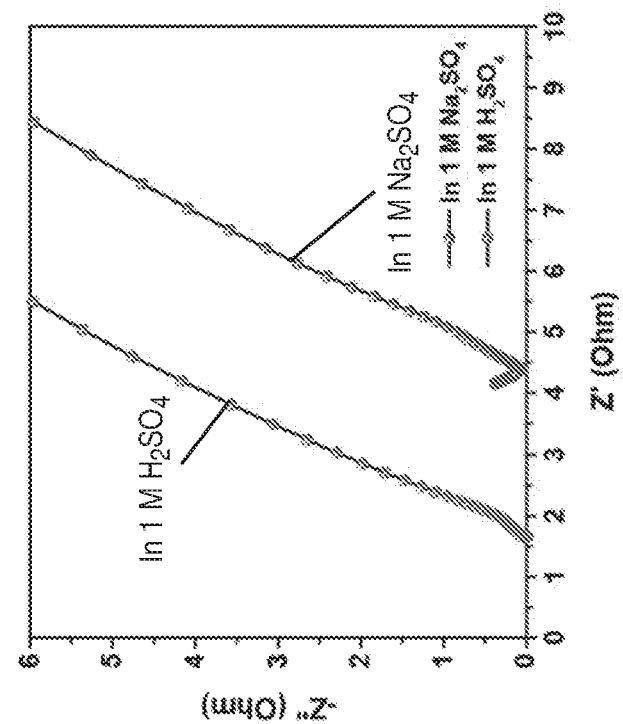
FIGS. 28A-28B are graphical views of (A) Comparison of the gravimetric specific capacitances of Hex-Aza-2 in 1.0 M $H_2SO_4$ and $Na_2SO_4$ using three-electrode configuration (Hg—$Hg_2SO_4$ as the reference electrode); (B) Comparison of the Nyquist plots of Hex-Aza-2 in 1.0 M $H_2SO_4$ and 1.0 M $Na_2SO_4$ using three-electrode configuration, according to one or more embodiments of the present disclosure.
Figure 28A:
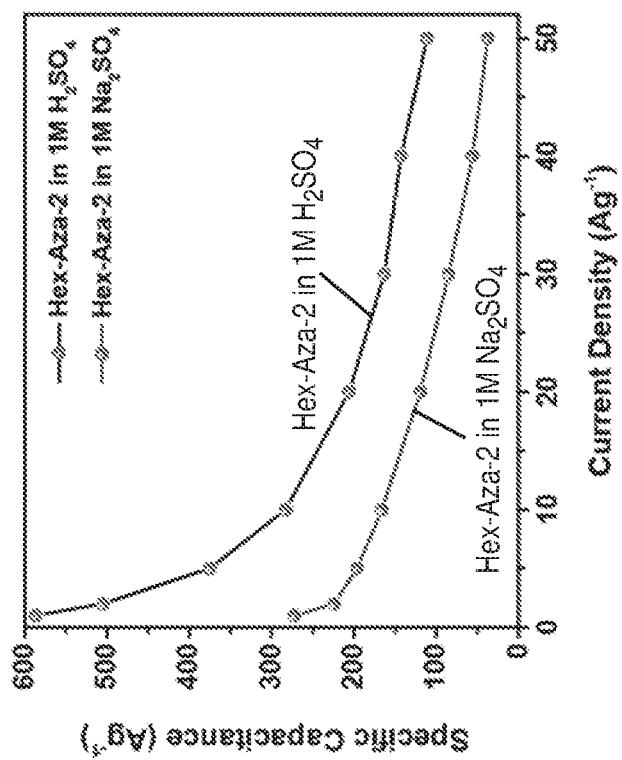
Figure 30A:
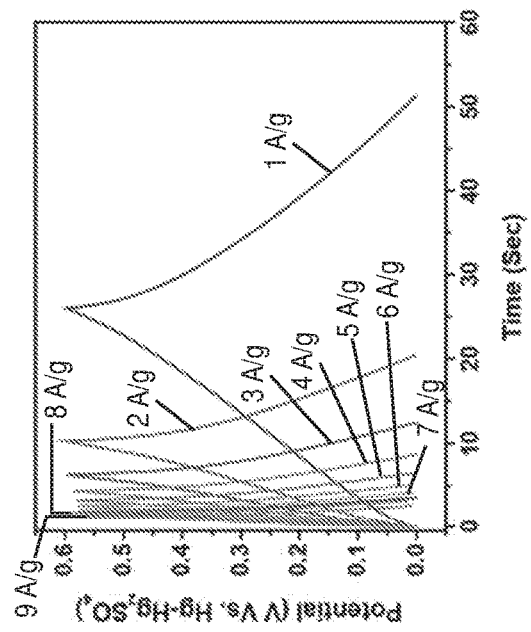
FIGS. 30A-30D relate to electrochemical performance of Hex-Aza-3 COF in in Symmetric two-electrode device configuration and include (A) CV curves of Hex-Aza-3 symmetric two-electrode device at different scan rates; (B) GCD profiles of Hex-Aza-3 symmetric two-electrode device at different current densities; (C) Comparison of gravimetric specific capacitances of Hex-Aza-3 symmetric two-electrode device at different scan rates in 1.0 M $Na_2SO_4$; (D) Nyquist plots of Hex-Aza-3 symmetric two-electrode device, according to one or more embodiments of the present disclosure.
Figure 30B:
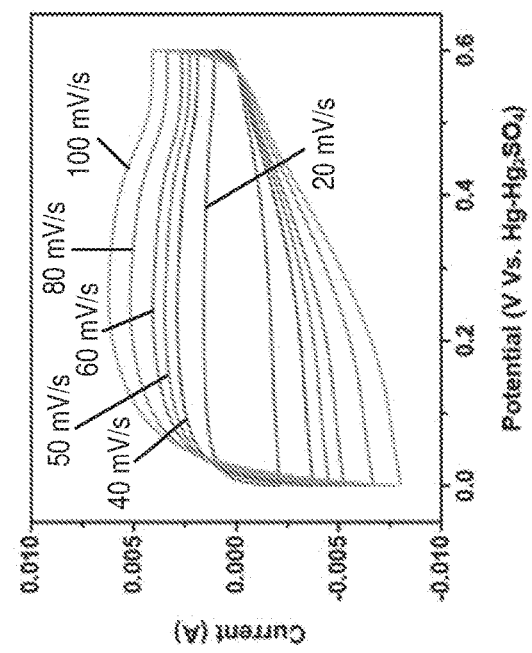
Figure 30C:
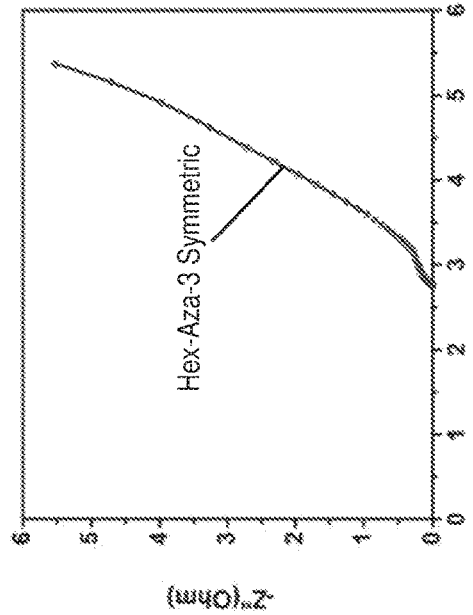
Figure 30D:
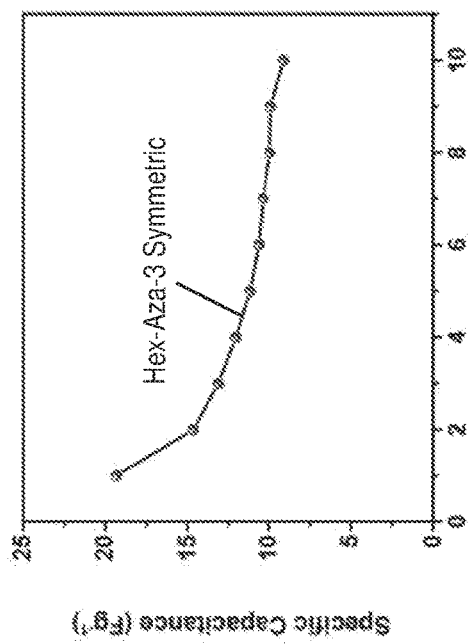

In order to evaluate the charge storage performance of Hex-Aza COFs, the galvanostatic charge/discharge (GCD) curves were recorded at different current densities (1A g$^{-1}$ to 50 A g$^{-1}$) (FIGS. 20B, 20E). The GCD curves of Hex-Aza-COFs showed a stable, reversible and symmetric curve, with columbic efficiencies close to 100% (FIGS. 20B, 20E). To achieve the highest capacitance values, the voltage window was optimized as −1.0 V to 0.0 V for Hex-Aza-1 and Hex-Aza-2, and −0.8 V to 0.1 V for Hex-Aza-3 (FIGS. 20A, 20D). The C values of Hex-Aza COFs were determined from the GCD curve by the integration method. The functionalized Hex-Aza-2 and Hex-Aza-3 displayed higher specific capacitance of 585 Fg$^{-1}$ and 536 Fg$^{-1}$, respectively, at 1 Ag$^{-1}$ current density in comparison to nonfunctionalized Hex-Aza-1 (220 Fg$^{-1}$ at 1Ag$^{-1}$) (FIG. 26). The pseudocapacitive contribution from the redox-active benzoquinone and phenazine core had positive impact on the specific capacitance values of Hex-Aza-2 and Hex-Aza-3. The capacitance values of Hex-Aza COFs decreased gradually at higher current densities (1 Ag$^{-1}$ to 50 Ag$^{-1}$) (FIG. 20C). The decrease in capacitance value can be attributed to the fact that at a higher current density, the electrolyte ions are not fully able to access all the redox-active sites in COF pores. Additionally, the charge storage performance of the Hex-Aza-2 in the neutral (1.0 M Na$_2$SO$_4$) electrolytes (FIGS. 26 and 27A-27D) was explored. The GCD curves show that Hex-Aza-2 exhibited lower capacitance performance (280 Fg$^{-1}$ at 1 Ag$^{-1}$) in neutral electrolyte (Na$_2$SO$_4$) in comparison to acidic electrolyte (1.0 M H$_2$SO$_4$) (FIGS. 27A-27D). The Nyquist plot of the Hex-Aza-2 in the neutral electrolyte (Na$_2$SO$_4$) showed a higher equivalent series resistance (ESR) value of 4.4Ω in comparison to the ESR value of acidic electrolyte (2.1Ω) (FIGS. 28A-28B). This meant that Hex-Aza-2 had a higher electrode resistance in the neutral electrolyte medium, which may explain the lower C value.

Figure 31:
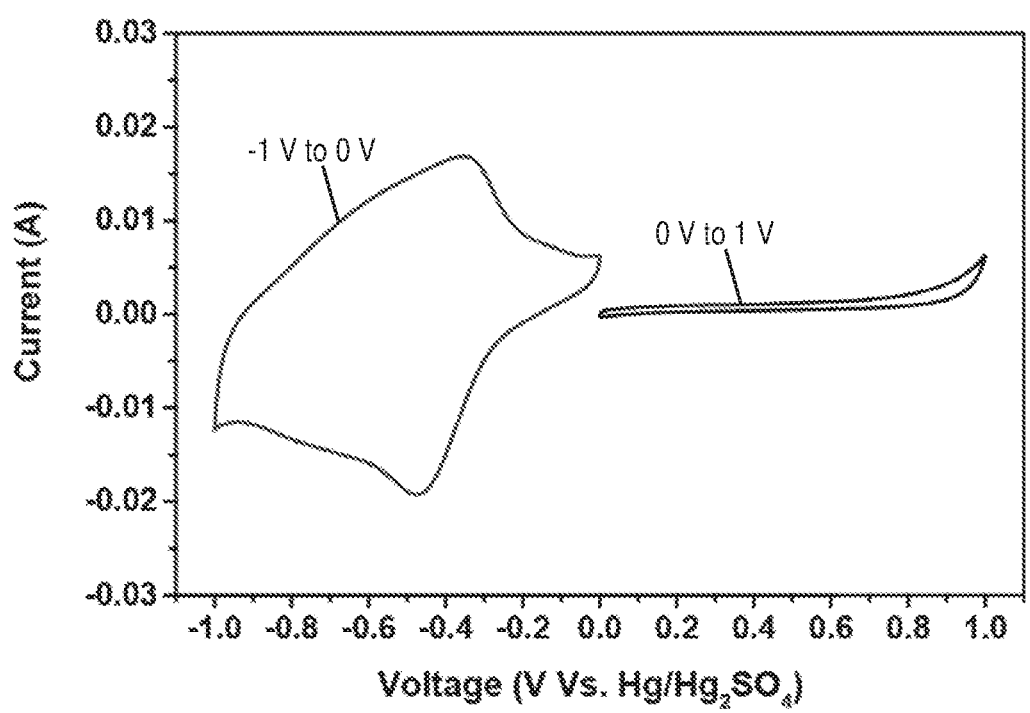
FIG. 31 is a graphical view of cyclic voltammogram (CV) curves of Hex-Aza-1 in 1.0 M $H_2SO_4$ using three-electrode configuration at a scan rate of 50 mVs$^{-1}$, which shows the majority of the capacitive contribution is the negative potential (−1 V to 0 V), according to one or more embodiments of the present disclosure.

Since Hex-Aza COFs displayed the highest C value in three-electrode configuration (Tables 4-5), the next target was to construct a two-electrode device, which has more practical applications. Since the majority of the capacitance contribution of Hex-Aza COFs was polarized towards the negative potential (−1.0 V to 0.0 V), fabrication of a symmetric device was rather challenging. Attempts to fabricate the symmetric devices of Hex-Aza-2 and Hex-Aza-3 COFs with equal mass loading cathode/anode ($m_+/m_-$=1) had not shown promising results (FIGS. 29A-29D and 30A-30D). The Hex-Aza-2 displayed a limited voltage window of 0.5 V, and for Hex-Aza-3 the voltage window was 0.6 V (FIGS. 29A-29D and 30A-30D). The lower voltage window of Hex-Aza COFs in symmetric device can be explained by their poor capacitive contribution in the positive potential windows in two-electrode configuration (FIGS. 31, 23, 32). The Hex-Aza-2 symmetric device displayed a low energy density of 1.65 Wh kg$^{-1}$ at a power density of 82.22 W kg$^{-1}$. Even though the energy density of the Hex-Aza-2 symmetric device was higher than reported COF-based SCs, the values were lower than pseudocapacitive materials based on RuO$_2$ and MnO$_2$.

Figure 33:
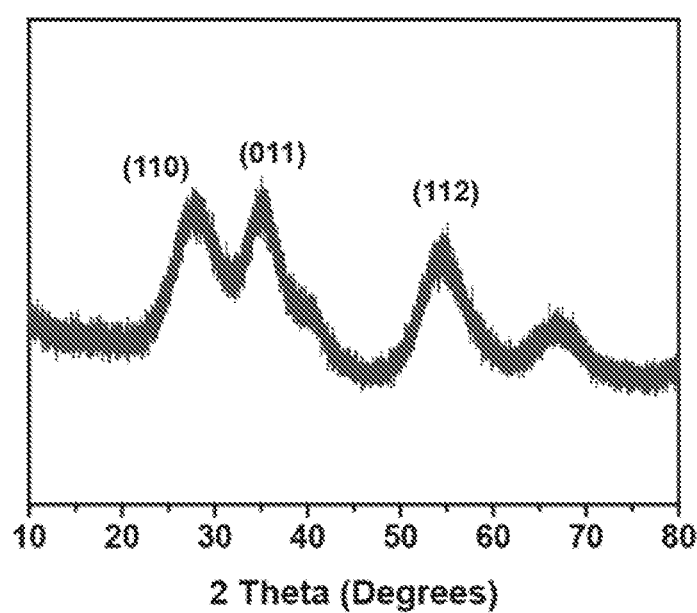
FIG. 33 is a graphical view of a PXRD of the $RuO_2$ powders synthesized by hydrothermal method, according to one or more embodiments of the present disclosure.

The polarized capacitive contribution of Hex-Aza COFs in the negative potential window combined with high specific capacitance values make them an ideal candidate for use as an anode material in ASC. RuO$_2$ may be used as a cathode material for combining with Hex-Aza COFs, as they exhibit a large potential window in positive region and a high C value with excellent cyclic stability in acidic electrolytes, especially in H$_2$SO$_4$. In the literature, RuO$_2$ has been used as cathode in ASC in combination with other anode materials such as MXene's, PANi, rGO, anthraquinone, etc. The pseudo-capacitive charge storage in RuO$_2$ in H$_2$SO$_4$ was achieved by the reversible fast proton-coupled-electron exchange process similar to the COF materials. It was expected that the complementary reversible protonation-deprotonation reaction between Hex-Aza COFs and RuO$_2$ can help build a stable high performing ASC device. FIG. 33.

Figure 34B:
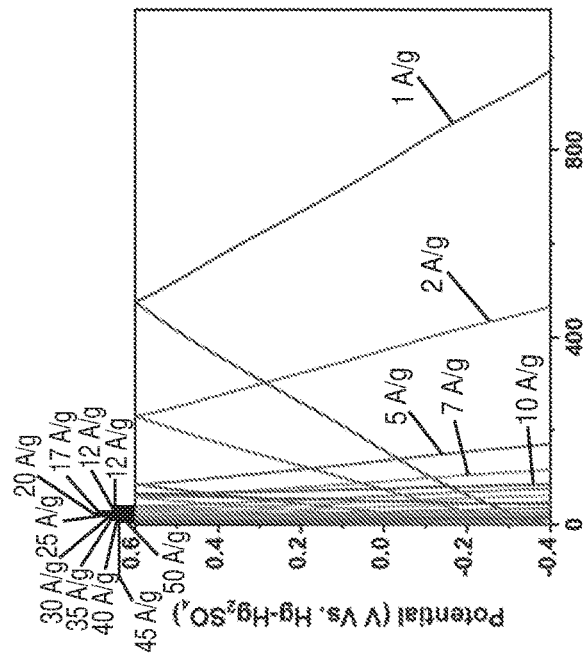
FIGS. 34A-34D relate to the electrochemical performance of $RuO_2$ in 1.0 M $H_2SO_4$ at three-electrode configuration and include the following graphical views: (A) CV curves of $RuO_2$ at different scan rates; (B) GCD profiles of $RuO_2$ at different current densities; (C) Comparison of gravimetric specific capacitances of $RuO_2$ at different scan rates; (D) Nyquist plots of $RuO_2$, according to one or more embodiments of the present disclosure.
Figure 34D:
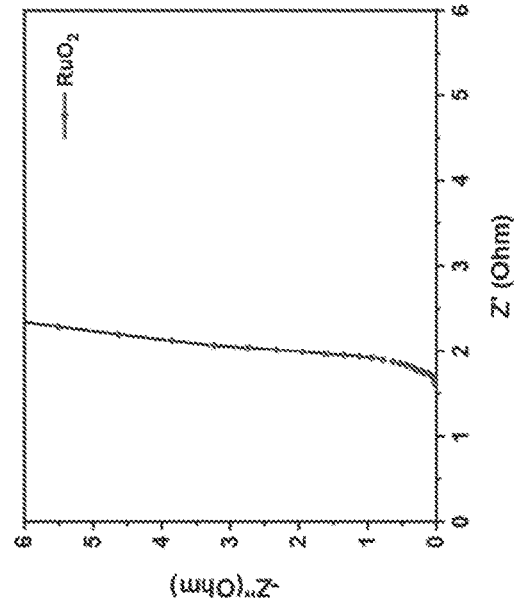
Figure 34A:
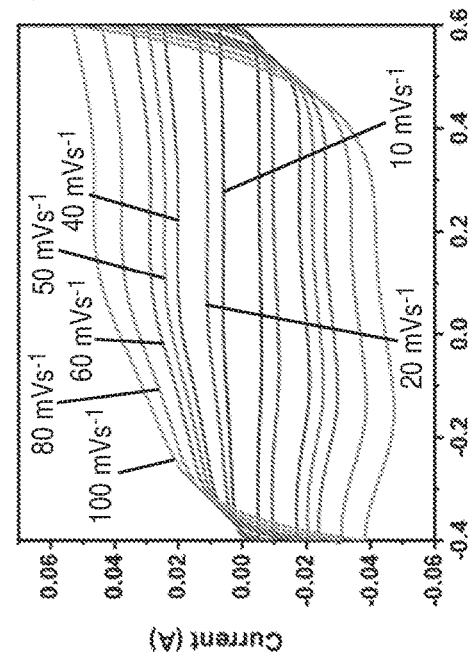

In three-electrode configuration using 1.0 M H$_2$SO$_4$ as the electrolyte, the CV of RuO$_2$ showed broad redox peaks (around 130 mV at 100 mVs$^{-1}$ vs. Hg/Hg$_2$SO$_4$) in the selected potential window of −0.4V to 0.6V (FIG. 34A). By comparing with the literature values, it was found that this redox peak position was coming in the range of the reversible oxidation peak for the Ru(III)/Ru(IV) redox couple (756±11 mV Vs SHE). Thus the redox oxidation reaction on the cathode can be expressed as follows:

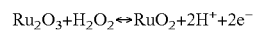

Eq. (4)

Figure 34C:
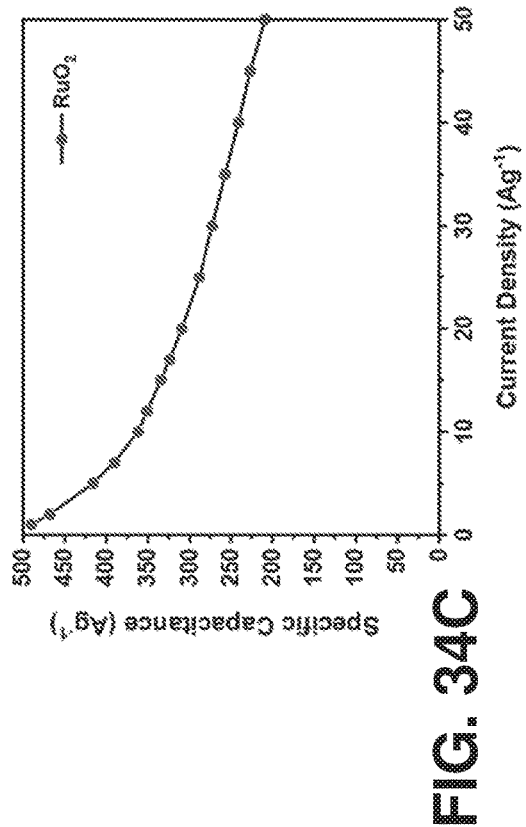
Figure 35C:
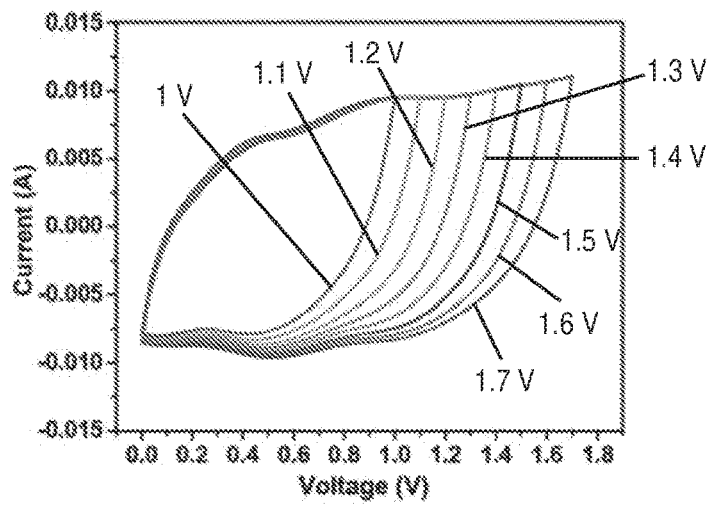
Figure 35D:
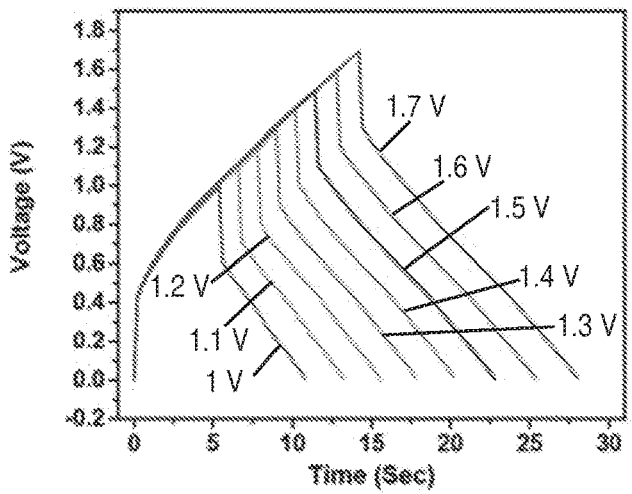
Figure 35E:
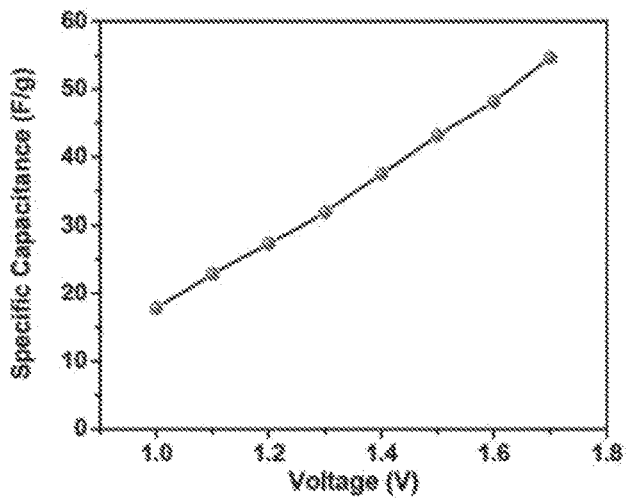
Figure 35F:
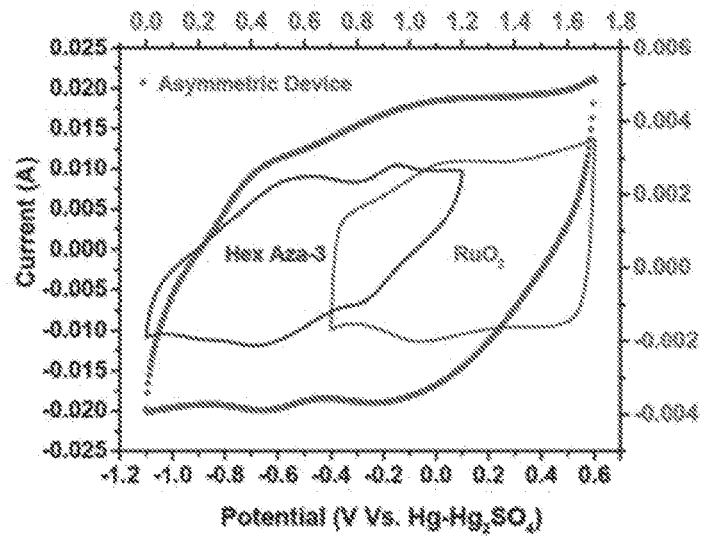
Figure 35G:
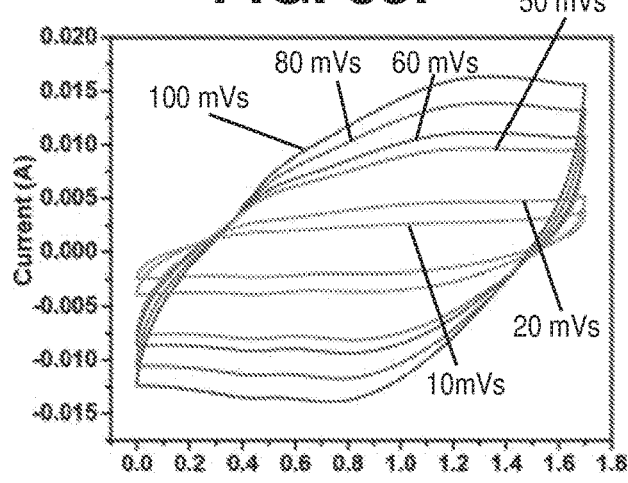
Figure 35H:
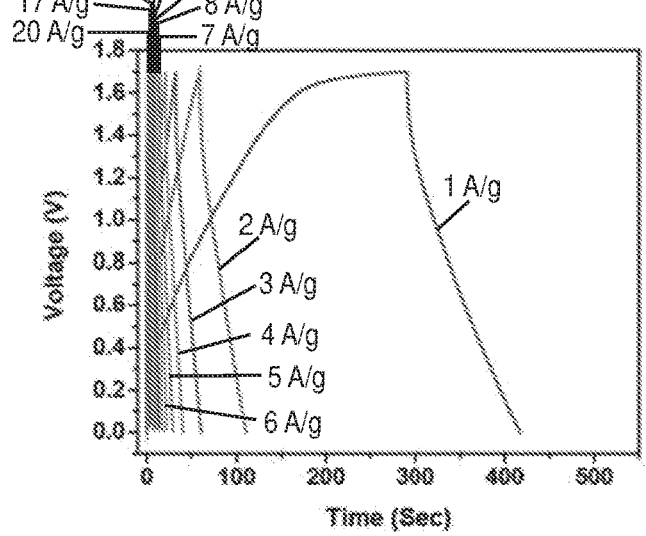
Figure 35I:
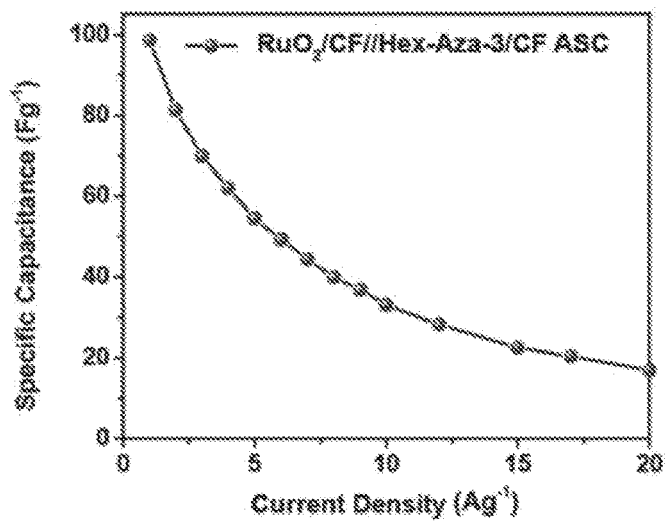
Figure 35J:
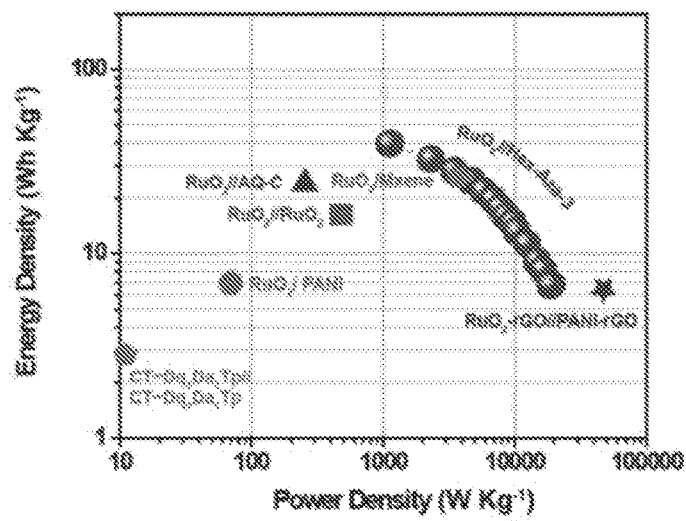
Figure 35K:
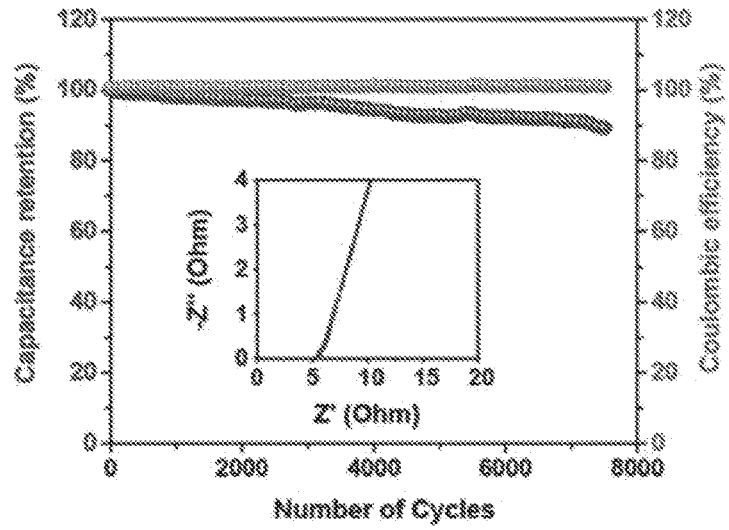
Figure 36:
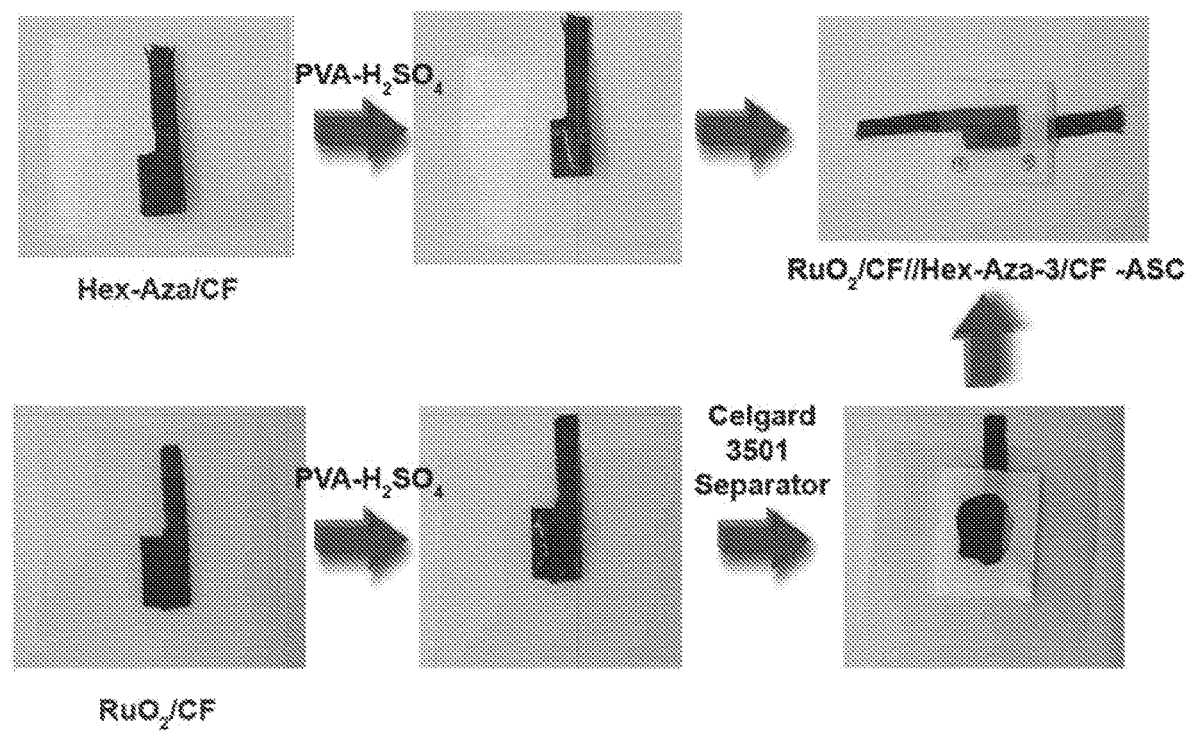
FIG. 36 are digital photographs of $RuO_2$//Hex-Aza-3 Asymmetric device fabrication, according to one or more embodiments of the present disclosure.
Figure 37:
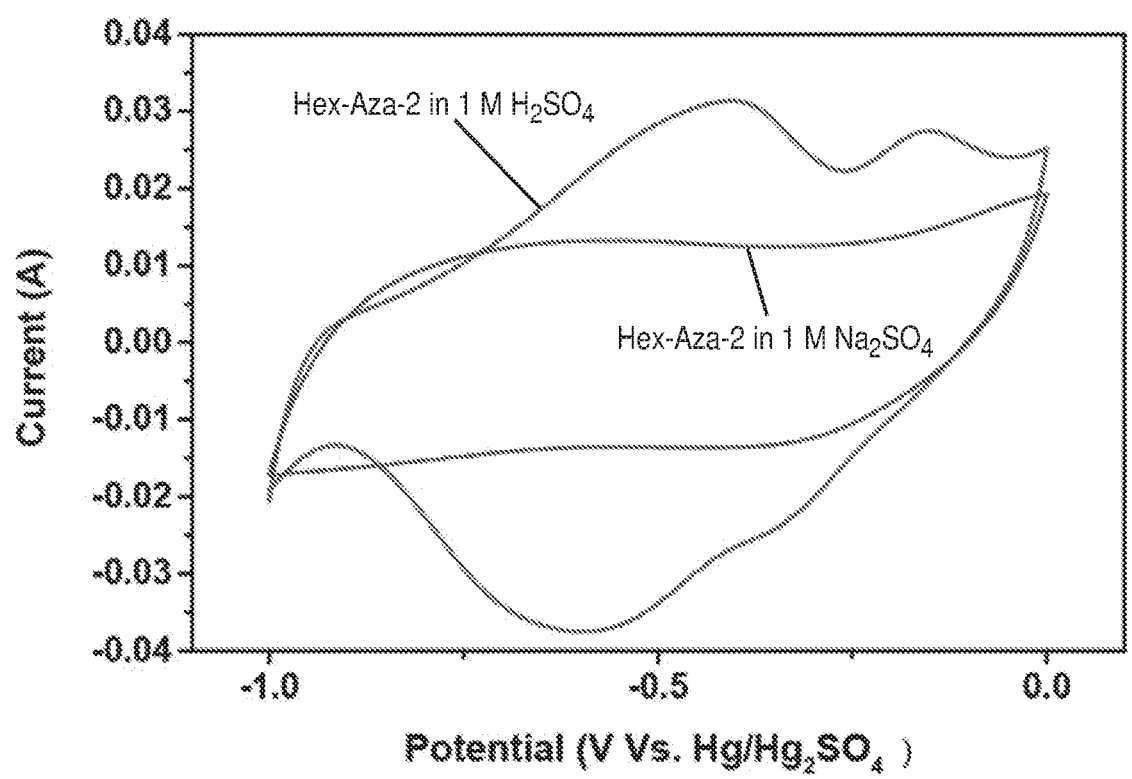
FIG. 37 is a graphical view of a comparison of the CV curves of Hex-Aza-2 in 1.0 M $H_2SO_4$ and $Na_2SO_4$ using three-electrode configuration at a scan rate of 50 mV/s. The redox peaks appearing in the CV of Hex-Aza-2 in 1.0 M $H_2SO_4$ clearly indicate the capacitive contribution, according to one or more embodiments of the present disclosure.
Figure 38A:
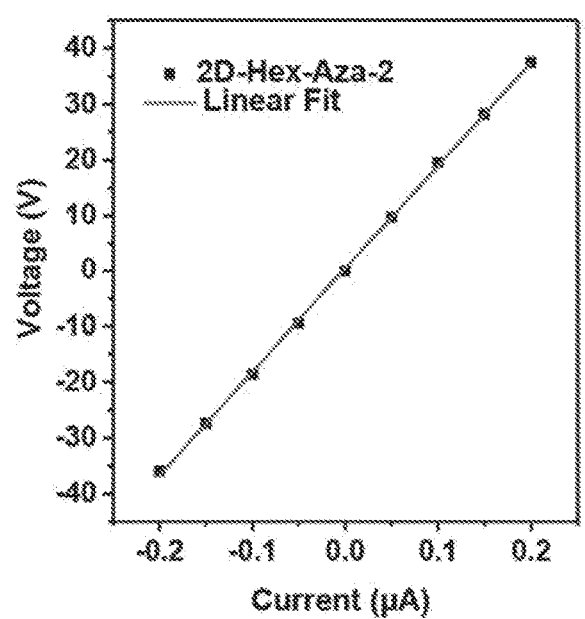
FIGS. 38A-38B is a graphical view of (A) I-V curve of pure Hex-Aza-2 COF powder; and (B) After doping with triflic acid Hex-Aza-2 COF showed improved conductivity, according to one or more embodiments of the present disclosure.
Figure 38B:
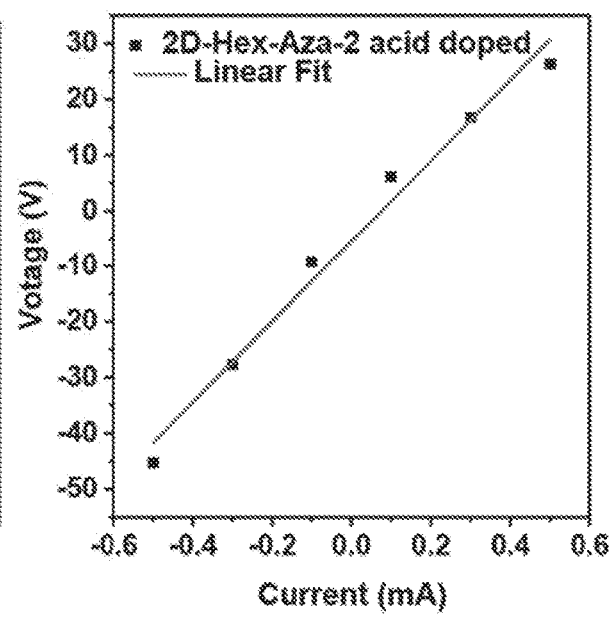
Figure 39:
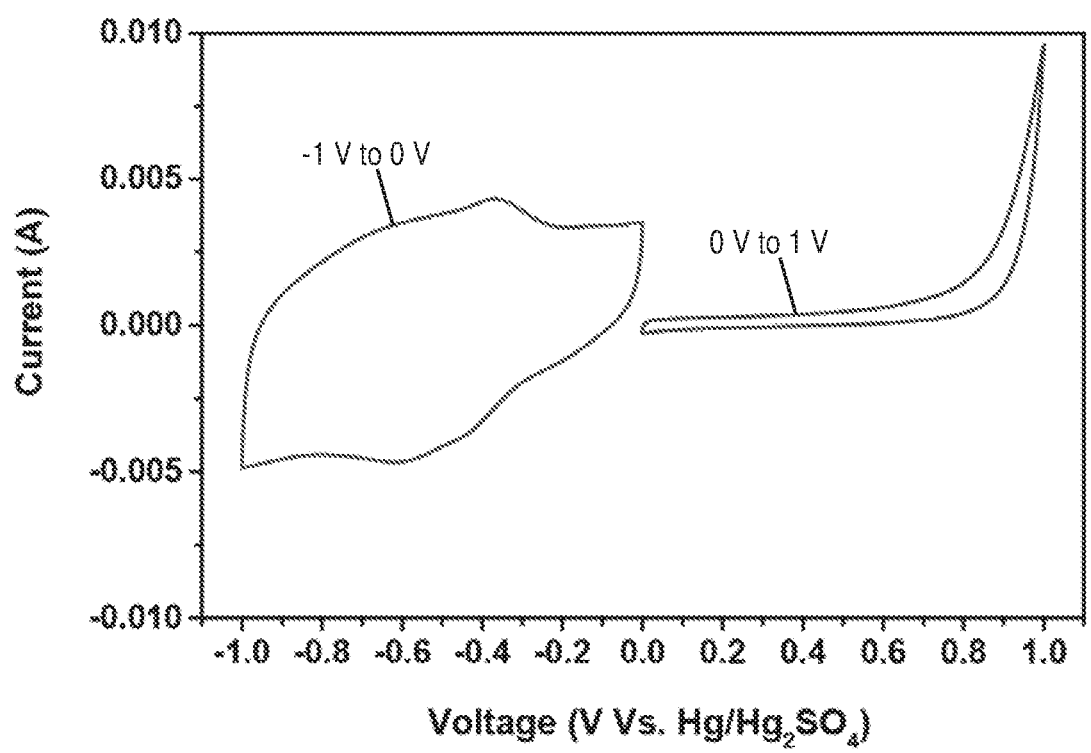
FIG. 39 is a graphical view of CV curves of Hex-Aza-3 in 1.0 M $Na_2SO_4$ using three-electrode configuration at a scan rate of 50 mV/s, which shows the majority of the capacitive contribution is in the negative potential range, according to one or more embodiments of the present disclosure.
Figure 40:
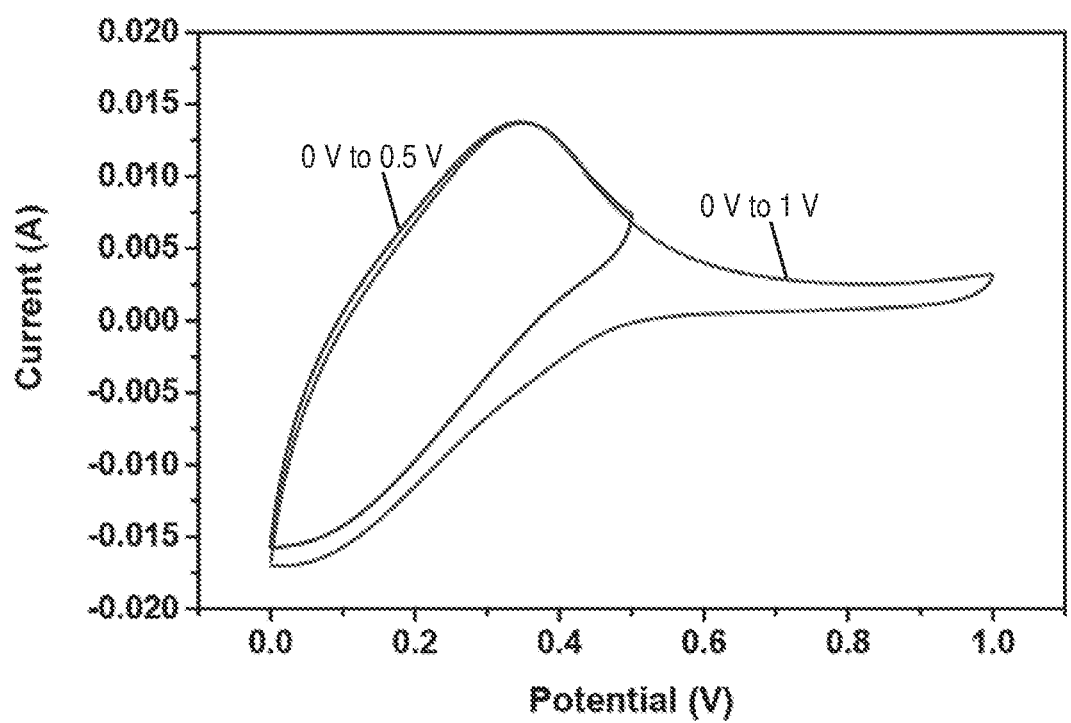
FIG. 40 is a graphical view of CV curves of Hex-Aza-2 symmetric two-electrode device at 50 mV/s, which shows the majority of the capacitive contribution is up to 0.5 V, according to one or more embodiments of the present disclosure.
Figure 41:
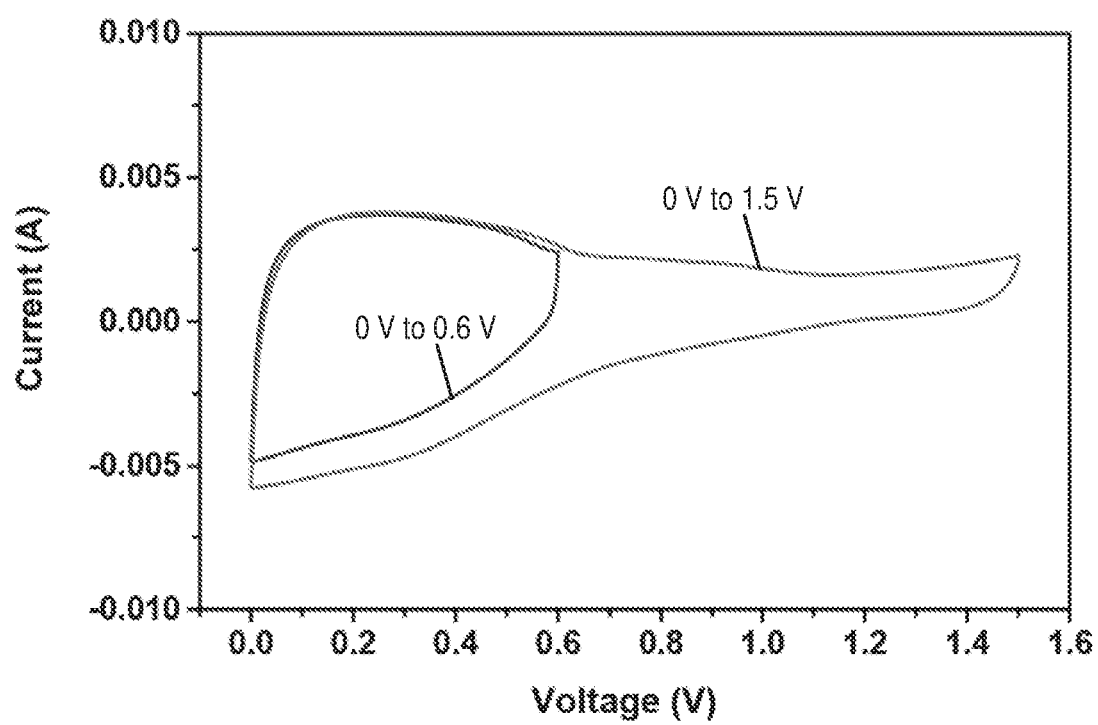
FIG. 41 is a graphical view of CV curves of Hex-Aza-3 symmetric two-electrode device at 50 mV/s, which shows the majority of the capacitive contribution is up to 0.6 V, according to one or more embodiments of the present disclosure.

As a result of the reversible interconversion reaction between Ru$_2$O$_3$ and RuO$_2$, protons and electrons were generated at the cathode during the oxidation process of Ru (III) to Ru (IV). The scan rate dependent CV analysis showed the majority of the capacitance of RuO$_2$ was arising from pseudocapacitive contribution. The GCD curve of RuO$_2$ showed symmetric triangular charge-discharge curves (FIG. 34B) from which the C was calculated as 490 Fg$^{-1}$ at a current density 1 Ag$^{-1}$ using the integration method. A decrease in capacitance was observed for the RuO$_2$ electrode with increasing current density (1 Ag$^{-1}$ to 50 Ag$^{-1}$) (FIG. 34C). The self-complementary potential windows of Hex-Aza-3 and RuO$_2$ were ideal for the construction of ASC device with high cell voltage. The RuO$_2$//Hex-Aza-3 ASC device was constructed by sandwiching PVA-H$_2$SO$_4$ gel electrolyte in between Hex-Aza-3 and RuO$_2$ electrodes (FIG. 35A and FIG. 36). For the ASC device construction, mass balancing of the electrodes was achieved such that the amount of charge (q) stored on two electrodes was equal. The charge stored on individual electrode was expressed as q=C·ΔV·m, where ΔV is the potential window of cathode and anode and m is the active mass of the material on each electrode. After the optimization, it was observed that the mass ratio between the electrodes ideally should be close to 1 ($m_+/m_-$=1.18). The CV of the RuO$_2$//Hex-Aza-3 ASC showed a quasi-rectangular shape with a broad voltage window of 1.7 V (FIG. 35C). The potential window was almost three times higher than the voltage window of the symmetric Hex-Aza COF device (0.6V). The CV of RuO$_2$//Hex-Aza-3 ASC showed mainly two pairs of oxidation peaks appearing at positions 0.4 V and 1 V respectively, which indicated that charge storage was mainly pseudocapacitive mechanism (FIG. 35F). In order to optimize the voltage window best suited for the capacitive charge storage, the CV and GCD of RuO$_2$//Hex-Aza-3 were recorded. The CV (at 50 mVs$^{-1}$) and GCD analysis (at 5 Ag$^{-1}$) showed that the specific capacitance of RuO$_2$//Hex-Aza-3 ASC increased almost linearly upon moving from 1 V to 1.7 V (FIGS. 35D-35E). A maximum C value of 55 Fg$^{-1}$ was achieved at 1.7 V at a current density of 5 Ag$^{-1}$ (FIG. 35E). After crossing 1.7 V, bubble formation on the cathode due to the OER activity of RuO$_2$ electrode was observed (in open cell). The broad potential window (1.7 V) was a result of the complimentary potential windows of RuO$_2$ and Hex-Aza-3 COF electrodes (FIG. 35F). GCD analysis at 1.7 V showed RuO$_2$//Hex-Aza-3 ASC device can deliver a maximum specific capacitance of 98 Fg$^{-1}$ at a current density of 1 Ag$^{-1}$ (FIGS. 35H, 35I). This value is the highest among COFs and MOFs-based SCs and also comparable to the best performing metal oxide-based pseudocapacitive materials. Nyquist plot showed RuO$_2$//Hex-Aza-3 two electrode device possessed an equivalent series resistance (ESR) value of 5.4Ω (FIG. 35K). The high C value and broad voltage window made the RuO$_2$//Hex-Aza-3 two-electrode asymmetric device an ideal candidate for high energy density energy storage device. The energy density of the RuO$_2$//Hex-Aza-3 device was calculated as 39.6 Wh kg$^{-1}$ with a power density of 1124 W kg$^{-1}$. This value was around 40 times higher than symmetric Hex-Aza-2 and Hex-Aza-3 devices and also comparable to the reported RuO$_2$ or COF-based two-electrode supercapacitor devices such as RuO$_2$//RuO$_2$ (18.77 Wh kg$^{-1}$, 500 W kg$^{-1}$), RuO$_2$//PANI (7.25 Wh kg$^{-1}$, 82.6 W kg$^{-1}$), RuO$_2$-rGO//PANI-rGO (6.8 Wh kg$^{-1}$, 49800 W kg$^{-1}$), RuO$_2$//Ti$_3$C$_2$T$_x$-MXene (29 Wh kg$^{-1}$, 3800 W kg$^{-1}$), RuO$_2$//anthraquinone-modified carbon (AQ-C) (26.7 Wh kg$^{-1}$, 200 W kg$^{-1}$), TpOMe-DAQ COF//TpOMe-DAQ COF (4.4 Wh kg$^{-1}$, 0.55 W kg$^{-1}$), CT-Dq$_1$Da$_1$Tp//CT-Dq1Da1Tp (2 Wh kg$^{-1}$, 1 W kg$^{-1}$) (FIG. 35H). The RuO$_2$//Hex-Aza-3 ASC device also showed excellent cyclic stability, retaining 89% of its initial capacitance after 7500 GCD cycles. See FIGS. 37, 38A-38B, 39, 40, 41.

The electrochemical measurements were performed on a Bio-Logic VMP3 potentiostat in both 3-electrode and 2-electrode configurations using 1.0 M H$_2$SO$_4$/1.0 M Na$_2$SO$_4$ as electrolyte at room temperature. In 3-electrode measurements Hex Aza COF: carbon: PVDF (7:2:1) served as working electrode, Hg/Hg$_2$SO$_4$ was used as reference electrode and a graphite rode was used as the counter electrode, respectively.

Specific capacitance calculations were made as follows: Gravimetric-specific capacitance Cm(Fg$^{-1}$) of electrode materials was calculated from the CV curves by integrating the discharge portion using the following equation:

$$Cm = \frac{1}{Vm\upsilon} \int idV$$

where, 'i' is the current (mA), 'V' is the potential window (V), 'U' is the scan rate (mV s$^{-1}$), and 'm' is the mass of the active material (mg).

Two-Electrode Configuration (Device Measurements):

$$Cg = \frac{1}{VM\upsilon} \int idV$$

where, 'i' is the current (mA), 'V' is the voltage window of the device (V), 'U' is the potential scan rate (mV s$^{-1}$), and 'M' is the mass of the active electrode materials in both electrodes (mg).

Gravimetric energy density, $$Eg = \frac{1}{M} \int iVdt$$

Gravimetric power density, $$Pg = \frac{Eg}{\Delta t}$$

Electrochemical Impedance Spectroscopy: The real (C') and imaginary (C") parts of capacitances were calculated using the following equations.

$$C' = -Z''/(2\pi f A|Z|)^2$$

$$C'' = Z'/(2\pi f A|Z|)^2$$

where |Z| is the absolute value of impedance (Q), Z' and Z" are the real and imaginary components of impedance; f is the frequency (Hz).

TABLE 1

Fractional atomic coordinates for the unit cell
of Hex-Aza-1 with AA eclipse packing.
Hex Aza-1 (AA eclipsed)
Space group: P6/m, Hexagonal
a = b = 16 Å, c = 3.4 Å
α = β = 90°, γ = 120°

| Atom | x | Y | z |
|---|---|---|---|
| C1 | 0.33304 | 0.58257 | 0 |
| C2 | 0.41632 | 0.66542 | 0 |
| N1 | 0.33304 | 0.49954 | 0 |
| C3 | 0.41632 | 0.49997 | 0 |
| C4 | 0.4989 | 0.58247 | 0 |
| N2 | 0.4989 | 0.6655 | 0 |
| C5 | 0.41847 | 0.41829 | 0 |

TABLE 2

Fractional atomic coordinates for the unit cell of
Hex-Aza-2 with inclined packing.
Hex Aza-2 (Inclined)
Space group: P1
a = b = 16 Å, c = 6.9 Å
α = 40°, β = 140°, γ = 120°

| C1 | 0.2552 | 0.6605 | 0 |
|---|---|---|---|
| C2 | 0.2552 | 0.5775 | 0 |
| C3 | 0.3378 | 0.5776 | 0 |
| C4 | 0.4211 | 0.6604 | 0 |
| C5 | 0.4211 | 0.7435 | 0 |
| C6 | 0.3378 | 0.7437 | 0 |
| N1 | 0.5037 | 0.8266 | 0 |
| C7 | 0.5037 | 0.909 | 0 |
| C8 | 0.4211 | 0.9095 | 0 |
| N2 | 0.3378 | 0.8261 | 0 |
| N3 | 0.172 | 0.6607 | 0 |
| C9 | 0.0894 | 0.5776 | 0 |
| C10 | 0.0894 | 0.4946 | 0 |
| N4 | 0.172 | 0.4947 | 0 |
| N5 | 0.3378 | 0.4946 | 0 |
| C11 | 0.4211 | 0.495 | 0 |
| C12 | 0.5037 | 0.5775 | 0 |
| N6 | 0.5037 | 0.6605 | 0 |
| C13 | 0.0061 | 0.5778 | 0 |
| C14 | 0.0061 | 0.4117 | 0 |
| C15 | 0.5869 | 0.9925 | 0 |
| C16 | 0.4211 | 0.9926 | 0 |
| O1 | 0.3371 | 0.9912 | 0 |
| O2 | 0.6695 | 0.9919 | 0 |
| C17 | 0.5869 | 0.25 | 0 |
| C18 | 0.6695 | 0.2501 | 0 |
| C19 | 0.7528 | 0.333 | 0 |
| C20 | 0.7528 | 0.416 | 0 |
| C21 | 0.6695 | 0.4156 | 0 |
| C22 | 0.5869 | 0.3331 | 0 |
| N7 | 0.6695 | 0.4986 | 0 |
| C23 | 0.5869 | 0.4991 | 0 |
| C24 | 0.5044 | 0.416 | 0 |
| N8 | 0.5044 | 0.333 | 0 |
| N9 | 0.5044 | 0.1675 | 0 |
| C25 | 0.5044 | 0.0845 | 0 |
| C26 | 0.5869 | 0.0846 | 0 |
| N10 | 0.6695 | 0.1671 | 0 |
| N11 | 0.8354 | 0.333 | 0 |
| C27 | 0.9187 | 0.4159 | 0 |
| C28 | 0.9187 | 0.4989 | 0 |
| N12 | 0.8354 | 0.4985 | 0 |
| C29 | 0.4211 | 0.4162 | 0 |
| O3 | 0.3378 | 0.3327 | 0 |
| C30 | 0.5869 | 0.5779 | 0 |
| O4 | 0.6695 | 0.6604 | 0 |

TABLE 3

Fractional atomic coordinates for the unit cell of Hex-Aza-3 with ABC staggered packing.
Hex Aza-3 (ABC staggered)
Space group: R3, Trigonal
a = b = 24.9 Å, c = 6.6 Å
α = β = 90°, γ = 120°

| | | | |
|---|---|---|---|
| C1 | 0.33321 | 0.60996 | 0.01887 |
| C2 | 0.39004 | 0.66678 | 0.01886 |
| N1 | 0.33406 | 0.55572 | 0.02901 |
| C3 | 0.38827 | 0.55502 | 0.04066 |
| C4 | 0.44496 | 0.6117 | 0.04065 |
| N2 | 0.44427 | 0.66592 | 0.02899 |
| C5 | 0.66677 | 0.39003 | 0.17802 |
| C6 | 0.60995 | 0.3332 | 0.17802 |
| N3 | 0.66591 | 0.44426 | 0.16787 |
| C7 | 0.61169 | 0.44495 | 0.1562 |
| C8 | 0.55501 | 0.38826 | 0.15618 |
| N4 | 0.55572 | 0.33405 | 0.16786 |
| C9 | 0.50102 | 0.55569 | 0.07775 |
| C10 | 0.44427 | 0.49895 | 0.07772 |
| N5 | 0.44482 | 0.44481 | 0.09835 |
| C11 | 0.49895 | 0.44426 | 0.11902 |
| C12 | 0.55569 | 0.50101 | 0.11908 |
| N6 | 0.55515 | 0.55515 | 0.09844 |
| C13 | 0.50118 | 0.61187 | 0.05798 |
| C14 | 0.38809 | 0.49879 | 0.05797 |
| C15 | 0.49878 | 0.38808 | 0.1388 |
| C16 | 0.61187 | 0.50117 | 0.13886 |

TABLE 4

Comparison of specific capacitance of Hex-Aza-COFs with reported COF based supercapacitors in literature.

| COF material | Specific Capacitance (at Current Density/Scan rate) | Electrolyte | Voltage Window (Vs. reference electrode) | References |
|---|---|---|---|---|
| Hex-Aza-2 | 585 F g$^{-1}$ (1 A g$^{-1}$) | 1.0M H$_2$SO$_4$ (3 electrode) | −1.0 V to 0.0 V (Vs. Hg—Hg$_2$SO$_4$) | This Work |
| Hex-Aza-3 | 536 F g$^{-1}$ (1 A g$^{-1}$) | 1.0M H$_2$SO$_4$ (3 electrode) | −1.1 V to 0.1 V (Vs. Hg—Hg$_2$SO$_4$) | This Work |
| Hex-Aza-1 | 220 F g$^{-1}$ (1 A g$^{-1}$) | 1.0M H$_2$SO$_4$ (3 electrode) | −1.0 V to 0.0 V (Vs. Hg—Hg$_2$SO$_4$) | This Work. |
| [TEMPO]100%-NiP-COF | 167 F g$^{-1}$(0.1 A g$^{-1}$) | 0.1 M(C$_4$H$_9$)$_4$NClO$_4$ (3 electrode) | 0.0 V to 0.8 V (Vs. AgCl/Ag) | Angew. Chem. Int. Ed.2015, 54, 6814 |
| DAAQ-TEP-COF | 3.0 mF cm$^{-2}$ (150 μA cm$^{-2}$) | 0.1M TBAPF$_6$ in MeCN (3 electrode) | −2.0 V to −0.5 V (Vs. Ag/AgClO$_4$) | ACS Nano2015, 9, 3178 |
| DAAQ-TFP-COF | 48 ± 10 F g$^{-1}$ (10 mV s$^{-1}$) | 1.0M H$_2$SO$_4$ (3 electrode) | −0.3 V to 0.3 V (Vs. Ag/AgCl) | J. Am. Chem. Soc.2013, 135, 16821 |
| DAAQ-TFP/PEDOT | 350 F cm$^{-3}$ (20 mV s$^{-1}$) | 0.5M H$_2$SO$_4$ (3 electrode) | −0.4 V to 0.6 V (Vs. Ag/AgCl) | ACS Cent. Sci.2016, 2, 667 |
| TpPa-(OH)-COF | 344 F g$^{-1}$ (1 A g$^{-1}$) | 1.0M Phosphate buffer (pH = 7.2) (3 electrode) | −0.2 V to 0.5 V (Vs. SCE) | Chem. Mater.2017, 29, 2074 |
| TpOMe-DAQ | 135 F g$^{-1}$ (0.35 A g$^{-1}$) | 2.0M H$_2$SO$_4$ (3 electrode) | −0.5 V to 0.5 V (Vs. Hg—Hg$_2$SO$_4$) | J. Am. Chem. Soc.2018, 140, 10941 |
| Dq$_1$Da$_1$TpCOF | 111 F g$^{-1}$ (1.56 mA cm$^{-2}$) | 1.0M H$_2$SO$_4$ (3 electrode) | −0.5 V to 0.3 V (Vs. Ag/AgCl) | ACS Appl. Mater. Interfaces2018, 10. 28139 |

TABLE 5

Comparison of specific capacitance of Hex-Aza COFs with various anode (-Ve electrode) materials reported in literature.

| Name | Specific Capacitance (at Current Density/ Scan rate) | Electrolyte | Voltage Window (Vs. reference electrode) | References |
|---|---|---|---|---|
| Hex-Aza-2 | 585 F g$^{-1}$ (1 A g$^{-1}$) | 1.0M H$_2$SO$_4$ (3 electrode) | −1.0 V to 0.0 V (Vs. Hg—Hg$_2$SO$_4$) | This Work |
| Hex-Aza-3 | 536 F g$^{-1}$ (1 A g$^{-1}$) | 1.0M H$_2$SO$_4$ (3 electrode) | −1.1 V to 0.1 V (Vs. Hg—Hg$_2$SO$_4$) | This Work |
| Hex-Aza-1 | 220 F g$^{-1}$ (1 A g$^{-1}$) | 1.0M H$_2$SO$_4$ (3 electrode) | 1.0 V to 0.0 V (Vs. Hg—Hg$_2$SO$_4$) | This Work |

TABLE 5-continued

Comparison of specific capacitance of Hex-Aza COFs with various anode (-Ve electrode) materials reported in literature.

| Name | Specific Capacitance (at Current Density/ Scan rate) | Electrolyte | Voltage Window (Vs. reference electrode) | References |
| --- | --- | --- | --- | --- |
| Ppy-65 wt % carbon | 433 F g$^{-1}$ (1 mV s$^{-1}$) | 6.0M KOH(3 electrode) | −1.0 V to 0.0 V (Vs. Hg—HgO) | J. Power Sources, 2010, 195, 6964 |
| H-TiO$_2$@C | 253.4 F g$^{-1}$ (10 mV s$^{-1}$) | 5.0M LiCl(3 electrode) | −1.0 V to 0.0 V (Vs. Ag/AgCl) | Adv. Mater. 2013, 25, 267 |
| Fe$_2$O$_3$ Nano rodes | 64.5 F g$^{-1}$ (1 A g$^{-1}$) | 1.0M KOH(3 electrode) | −0.8 V to 0.0 V (Vs. SCE) | Adv. Mater. 2014, 26, 3148 |
| RGO/cMWCNT films | 193 F g$^{-1}$ (1 A g$^{-1}$) | 1.0M potassium polyacrylate (PAAK)/KCl (3 electrode) | −0.9 V to −0.1 V (Vs. SCE) | J. Mater, Chem. A 2014, 2, 1458 |
| PEDOT@Au@PEN | 175 Fg$^{-1}$ (1 mA cm$^{-2}$) | 1.0M H$_2$SO$_4$ (3 electrode) | −0.5 V to 0.3 V (Vs. Ag/AgCl) | J. Mater. Chem. A 2015, 3, 7368 |
| PANi-20 wt % MWNTs | 670 F g$^{-1}$ (2 mV s$^{-1}$) | 1.0M H$_2$SO$_4$ (3 electrode) | −0.8 V to 0.4 V (Vs. Hg—Hg$_2$SO$_4$) | Electrochim. Acta, 2005. 50, 2499 |

What is claimed is:

1. An electrode material comprising:

a plurality of cores fused to a plurality of redox active linkers via Aza units to form a layered two-dimensional Aza-fused π-conjugated covalent organic framework (COF), wherein the layered two-dimensional Aza-fused π-conjugated COF has the following chemical structure:

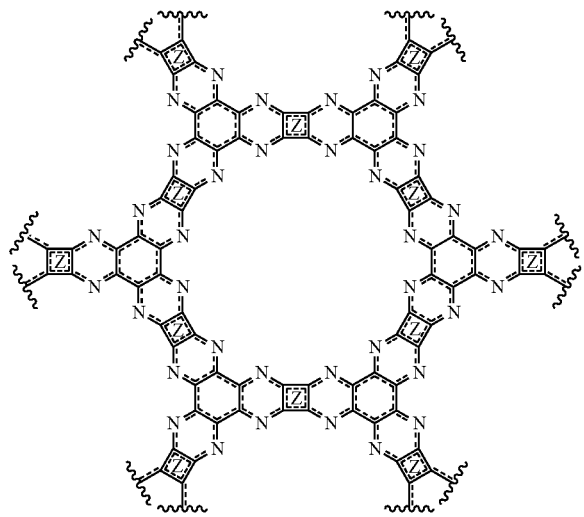

where:

* - - - * is at least one of an optional bond; and

Z is a redox active linker.

2. The electrode material of claim 1, wherein the plurality of cores has at least one of the following chemical structures:

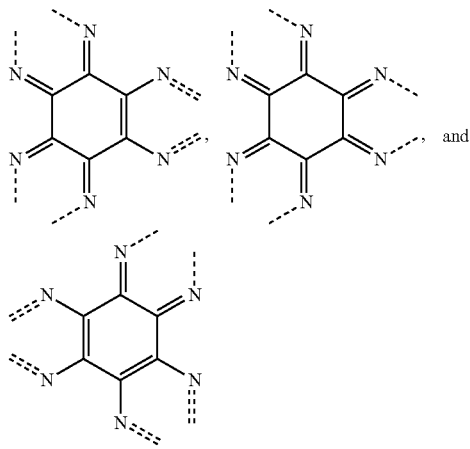

where:

* - - - * is at least one of an optional bond and a point of attachment.

3. The electrode material of claim 1, wherein the plurality of redox active linkers includes at least one aromatic ring, with the proviso that when the redox active linker is a single aromatic ring, the single aromatic ring is not unsubstituted carbocyclic benzene.

4. The electrode material of claim 1, wherein the plurality of redox active linkers includes at least one aromatic ring having at least one of a heteroatom and a substituent, optionally the substituent is selected from the group consisting of halogens, carbonyl groups, carboxylic acid groups, alkoxy groups, a hydroxyl group, amino groups, a nitrile group, a nitro group, optionally substituted linear alkyl groups, optionally substituted branched alkyl groups, a trichloromethyl group, and combinations thereof.

5. The electrode material according to claim 4, wherein the heteroatom is selected from the group consisting of a nitrogen heteroatom, an oxygen heteroatom, a sulfur heteroatom, and combinations thereof.

6. The electrode material of claim 1, wherein the plurality of redox active linkers has the following chemical structure:

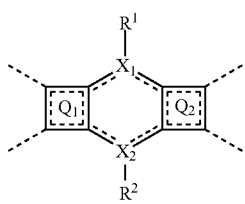

wherein:
* - - - * is at least one of an optional bond and a point of attachment;

$X_1$ and $X_2$ are independently a carbon atom, a nitrogen atom, an oxygen atom, or a sulfur atom;

$R^1$ and $R^2$ are independently a hydrogen, a halogen, carbonyl group, a hydroxyl group, an amino group, an alkoxyl group, an optionally substituted linear alkyl group, an optionally substituted branched alkyl group, or a nitrile group, provided that, when $X_1$ and $X_2$ are carbon atoms, at least one of $R^1$ and $R^2$ is not a hydrogen, or is a trichloromethyl group, a nitrile group, a nitro group, a carboxylic acid group, or a sulfonyl group; and $Q_1$ and $Q_2$ are independently nothing, an optionally substituted aryl group, or an optionally substituted heteroaryl group.

7. The electrode material of claim 1, wherein the plurality of redox active linkers is selected from the group consisting of:

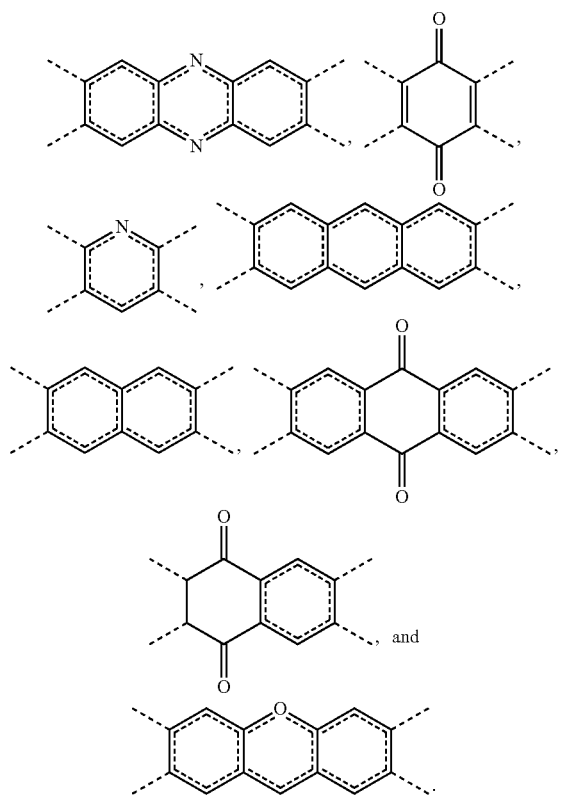

8. The electrode material of claim 1, wherein the two dimensional Aza-fused n-conjugated COF has a BET surface area of at least 70 m²/g.

9. A supercapacitor device comprising: an electrode material of claim 1.

10. The supercapacitor device according to claim 9, wherein the supercapacitor device is a symmetric supercapacitor device in which the positive electrode and the negative electrode include the same electrode material.

11. The supercapacitor device according to claim 9, wherein the supercapacitor device is an asymmetric supercapacitor device.

12. The supercapacitor device according to claim 11, wherein the asymmetric supercapacitor device further includes a positive electrode, and a polymer gel electrolyte between the positive electrode and the negative electrode.

13. A method of making an electrode material of claim 1, the method comprising:
combining a hexaketocyclohexane compound and an aromatic tetraamine compound in a solution;
mixing the solution including the hexaketocyclohexane compound and the aromatic tetraamine compound; and
heating the mixed solution to form a layered two-dimensional Aza-fused π-conjugated COF.

14. The method according to claim 13, wherein the heating step includes heating the mixed solution to a first temperature and subsequently heating the heated solution to a second temperature.

15. The method according to claim 14, wherein the first temperature is less than the second temperature.

16. The method according to claim 14, wherein the first temperature is in a range of about 20° C. to about 99° C.

17. The method according to claim 14, wherein the second temperature is in a range of about 100° C. to about 150° C.

18. The method of claim 13, wherein the solution further includes one or more of ethylene glycol, acetic acid, pyridine, mesitylene, and 1,4-dioxane.

19. The method of claim 13, wherein the aromatic tetraamine compound is selected from the group consisting of 1,2,4,5-tetraamino-benzoquinone; 2,3,6,7-tetraaminophenazine hydrochloride; 2,3,5,6-tetraaminocyclohexa-2,5-diene-1,4-dione;

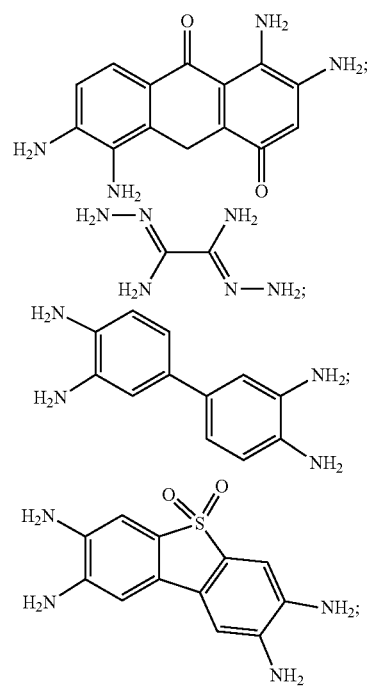

-continued
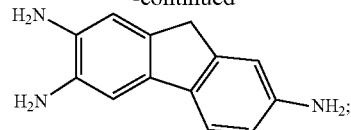
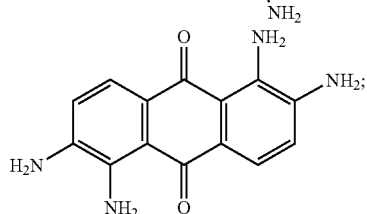
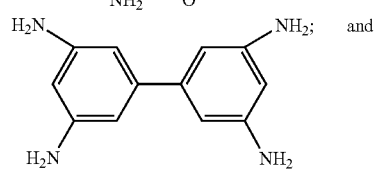
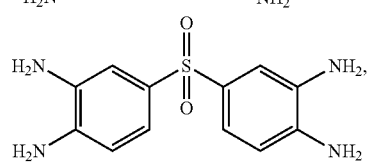
or a salt, a hydrate or a combination thereof.
* * * * *